United States Patent [19]
Wanger et al.

[11] Patent Number: 5,010,536
[45] Date of Patent: Apr. 23, 1991

[54] CARTRIDGE HANDLING SYSTEM

[75] Inventors: Mark E. Wanger; Jennifer L. Methlie, both of Fort Collins; Leslie G. Christie, Greeley; Daniel R. Dauner, Fort Collins, all of Colo.; Douglas R. Domel, Carlsbad, Calif.; David P. Jones, Fort Collins, Colo.; Thomas C. Oliver, Fort Collins, Colo.; Donald J. Stavely, Fort Collins, Colo.

[73] Assignee: Hewlett-Packard Company, Palo Alto, Calif.

[21] Appl. No.: 314,012

[22] Filed: Feb. 22, 1989

[51] Int. Cl.[5] ........................................... G11B 17/22
[52] U.S. Cl. ..................................... 369/36; 369/38; 360/98.06; 360/99.06
[58] Field of Search ..................... 369/36, 38, 35, 34, 369/37, 39

[56] References Cited

U.S. PATENT DOCUMENTS

| | | |
|---|---|---|
| 4,135,245 | 1/1979 | Kemplin et al. . |
| 4,170,030 | 10/1979 | Castrodale et al. . |
| 4,417,258 | 11/1983 | Tribolet et al. . |
| 4,573,129 | 2/1986 | Tribolet et al. . |
| 4,608,679 | 8/1986 | Rudy et al. . |
| 4,675,856 | 6/1987 | Rudy et al. . |
| 4,685,095 | 8/1987 | Rudy et al. .................... 369/36 |
| 4,786,995 | 11/1988 | Stupeck et al. .................. 360/105 |
| 4,787,074 | 11/1988 | Deck et al. .......................... 369/36 |
| 4,797,865 | 1/1989 | Imai et al. . |
| 4,817,070 | 3/1989 | Hug et al. . |
| 4,817,071 | 3/1989 | Carlson et al. .................... 369/36 |
| 4,827,463 | 5/1989 | Motoyoshi et al. . |
| 4,839,758 | 6/1989 | Honjoh . |
| 4,853,916 | 8/1989 | Tomita . |
| 4,879,615 | 11/1989 | Teranishi et al. . |
| 4,912,575 | 3/1990 | Shiosaki . |
| 4,918,548 | 4/1990 | O'Donnell et al. . |

FOREIGN PATENT DOCUMENTS

| | | |
|---|---|---|
| 0067449 | 6/1982 | European Pat. Off. . |
| 2449944 | 9/1989 | France . |
| 2106696 | 4/1983 | United Kingdom . |

Primary Examiner—Stuart S. Levy
Assistant Examiner—Kenneth B. Wells

[57] ABSTRACT

A cartridge handling system comprising: a cartridge engaging assembly for engaging an exposed end portion of a cartridge positioned in an aligned holding unit; a longitudinal displacement assembly for longitudinally displacing a cartridge engaged by the engaging assembly; a flipping assembly for invertingly rotating a cartridge engaged by the engaging assembly about a longitudinally extending flip axis; a lateral displacement assembly for laterally displacing a cartridge engaged by the engaging assembly; and a unitary, rotatable drive motor drivingly linked to the longitudinal displacement assembly, the flipping assembly, and the lateral displacement assembly for providing driving force thereto. The cartridge handling system is constructed and arranged such that neither sensors nor motors need be mounted on any moving system components.

21 Claims, 21 Drawing Sheets

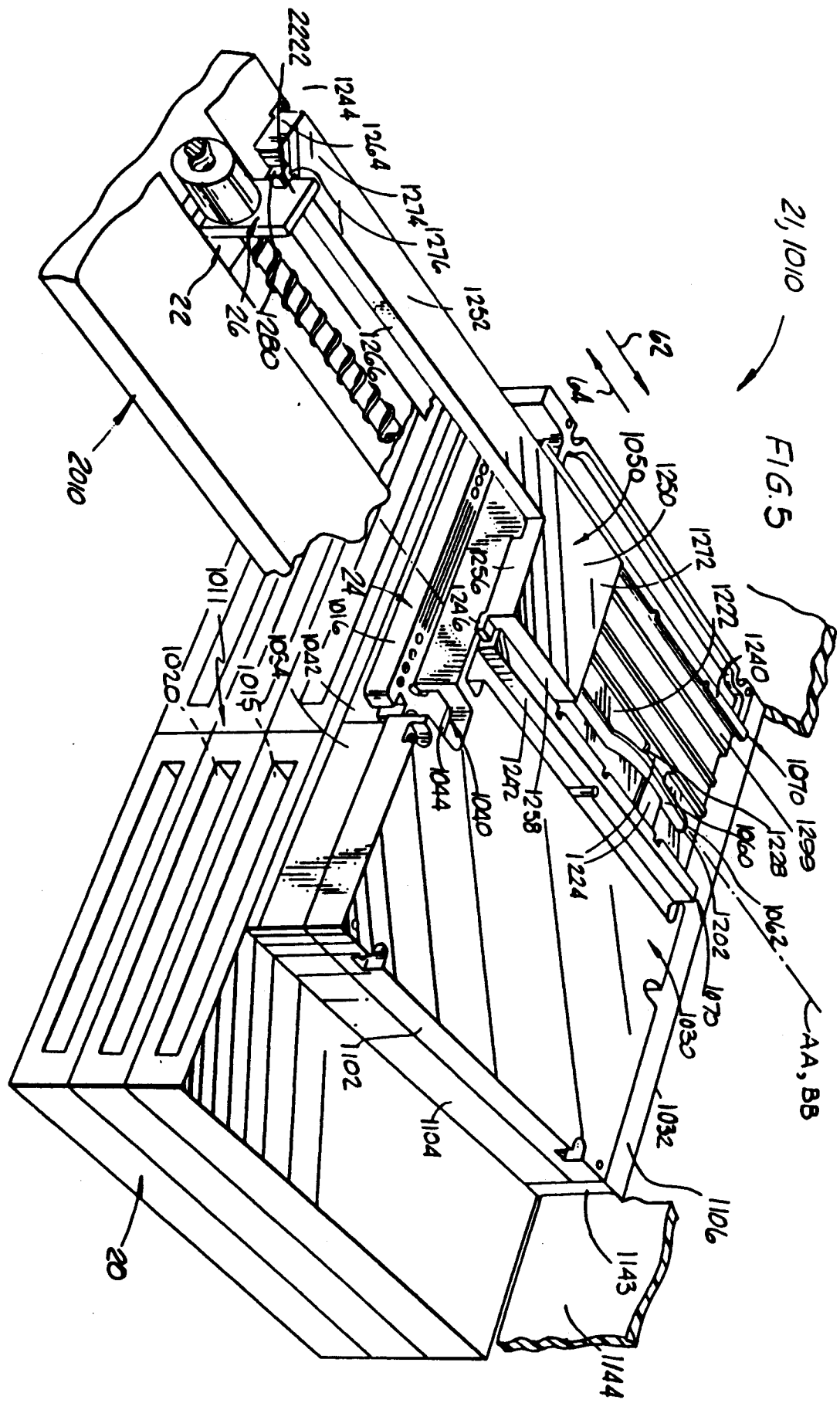

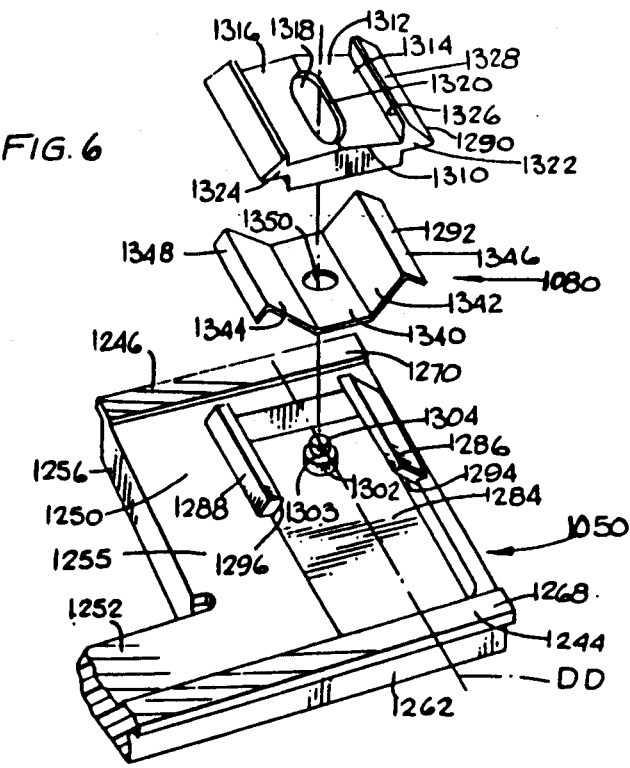
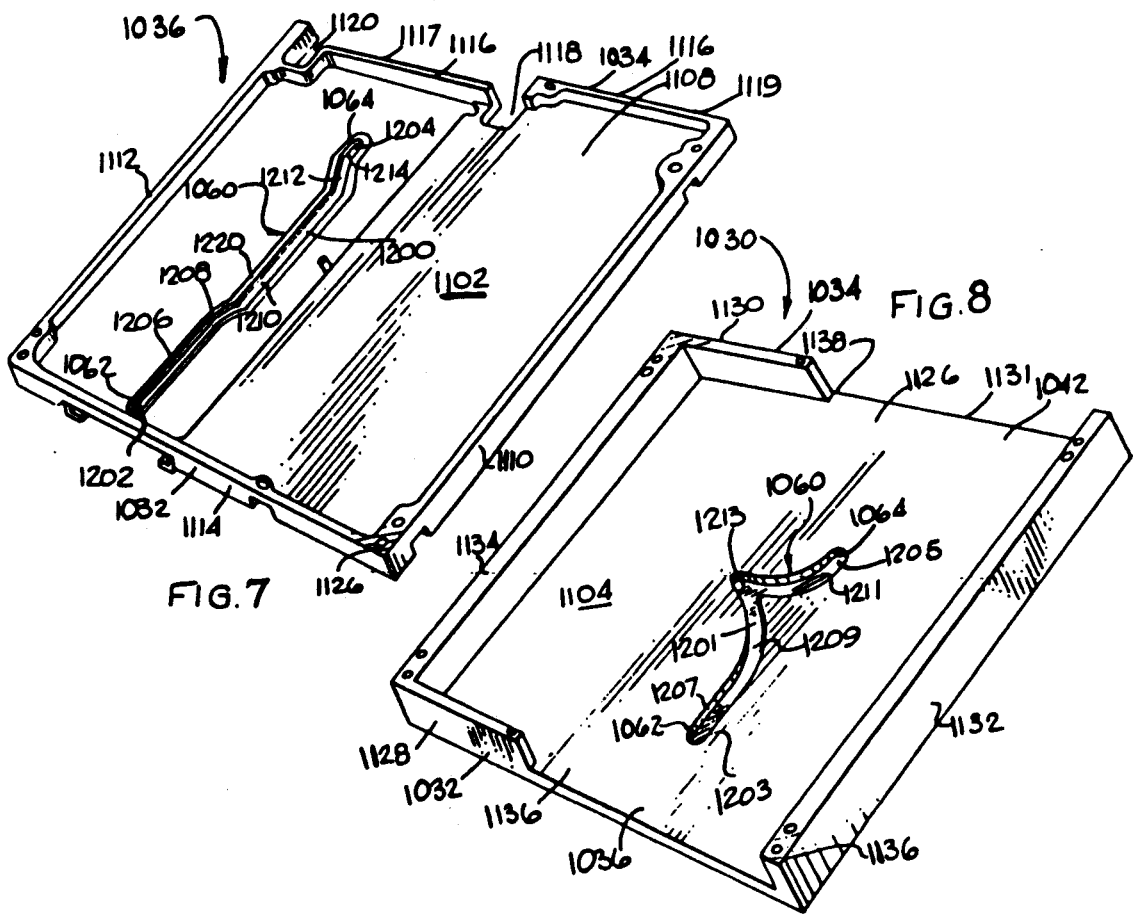

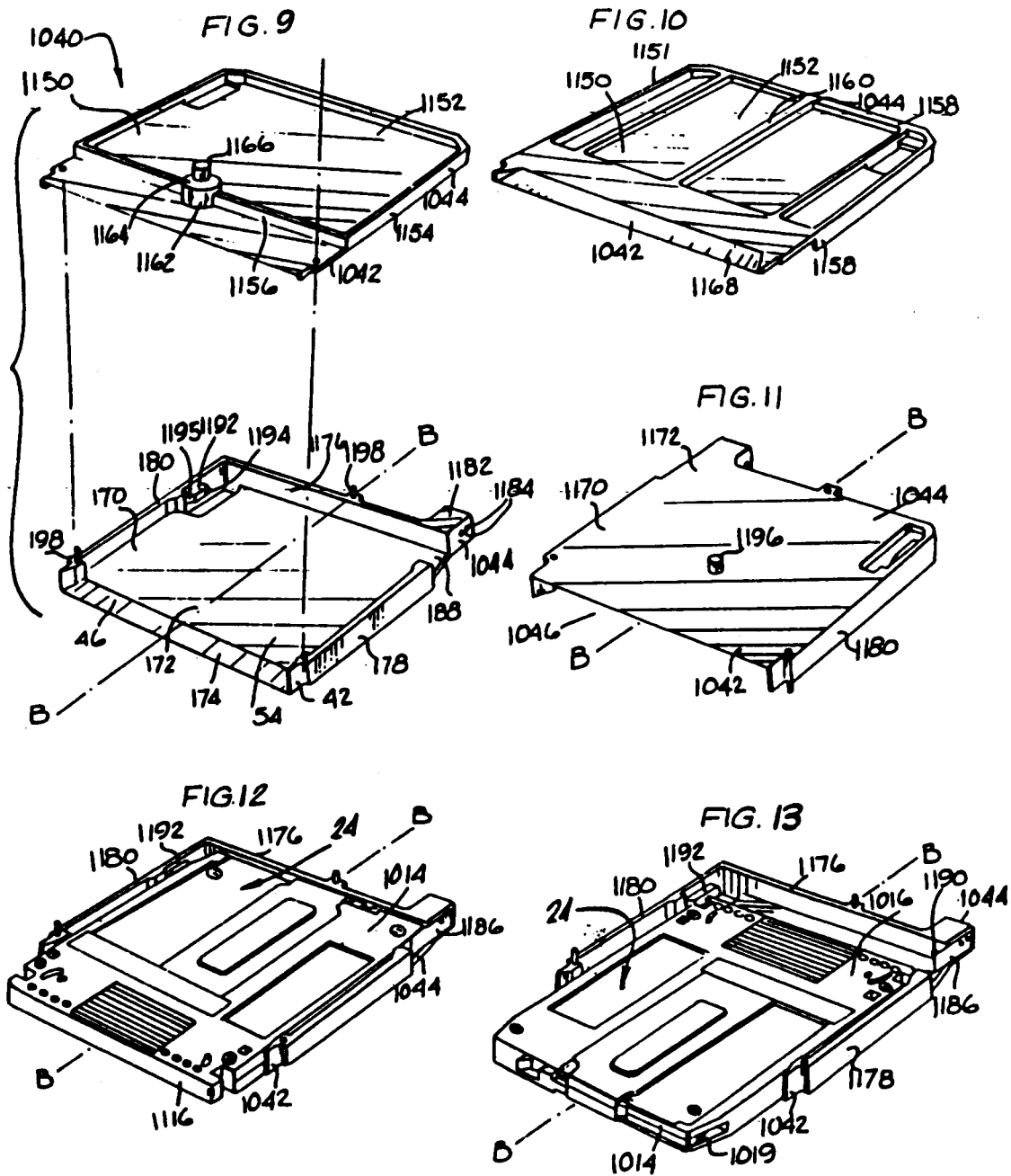

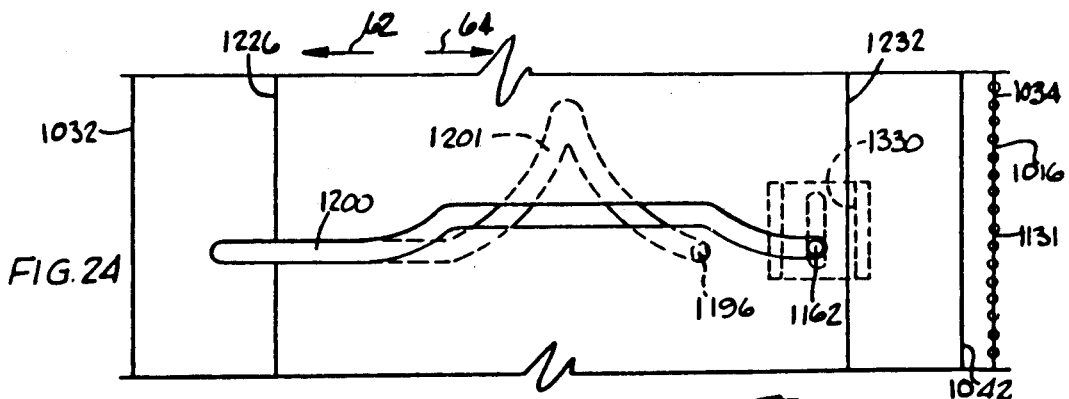
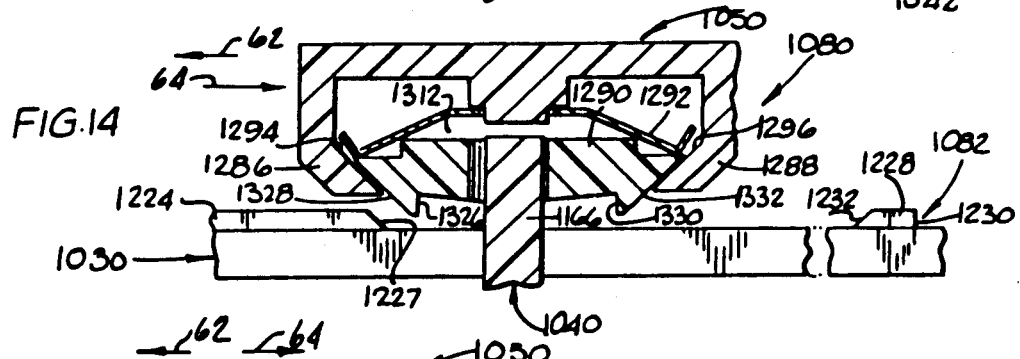
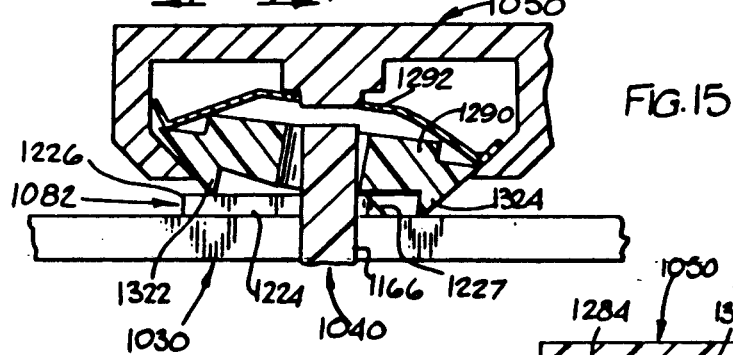
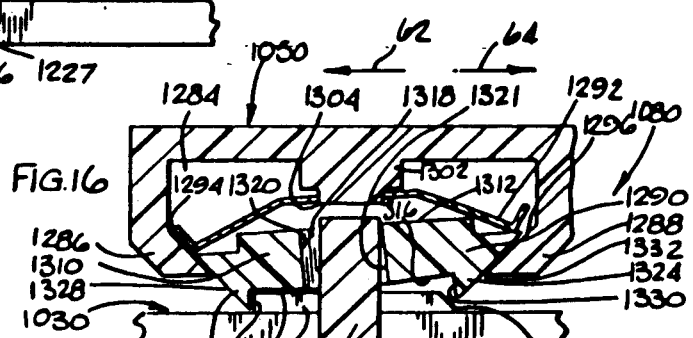
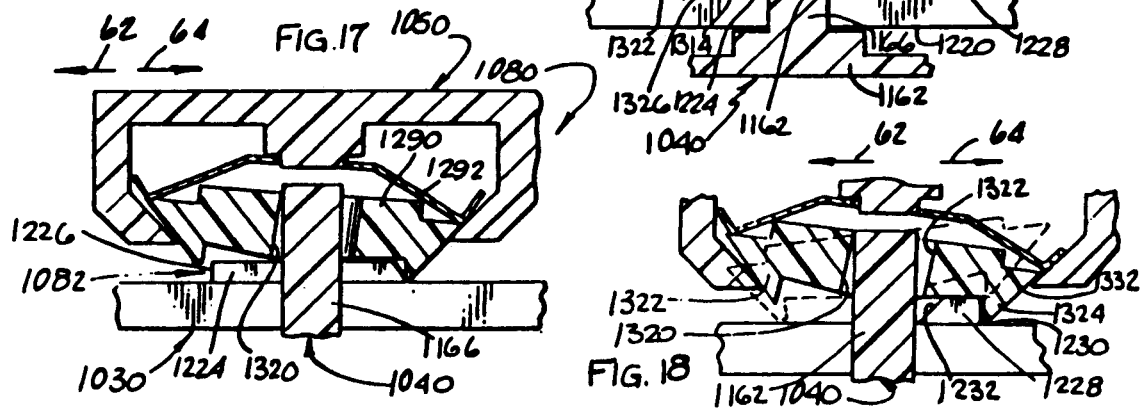

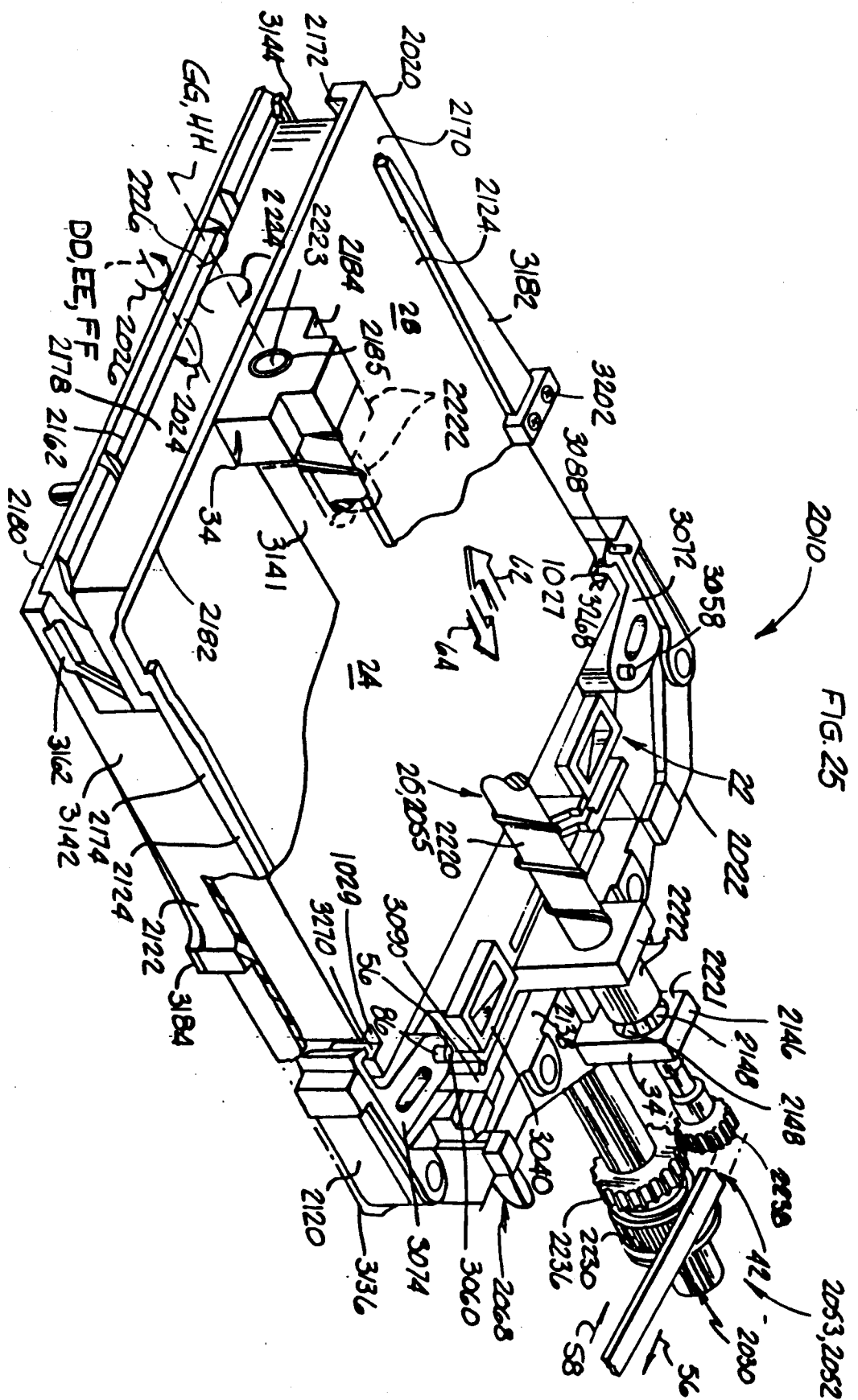

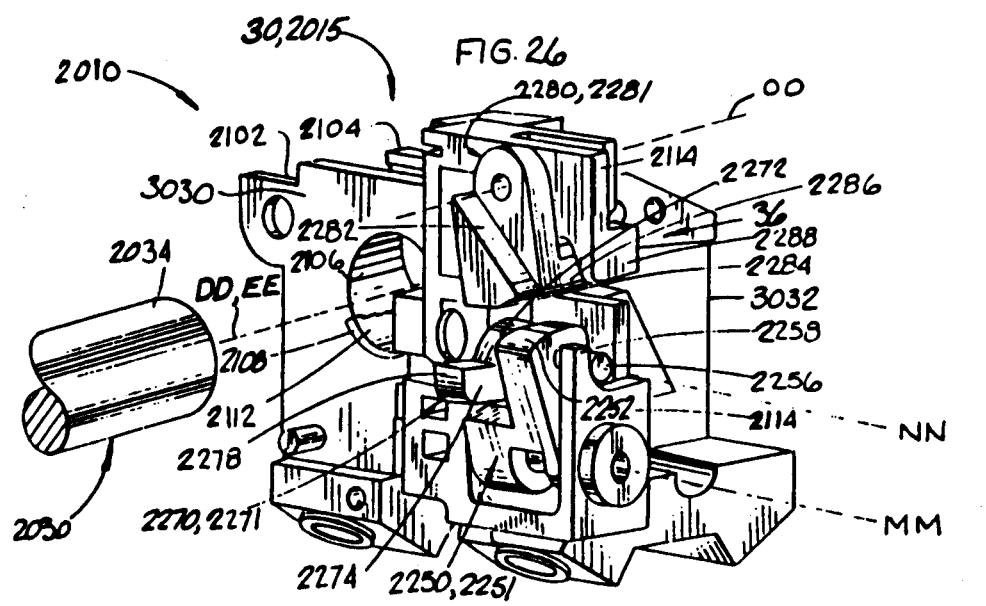
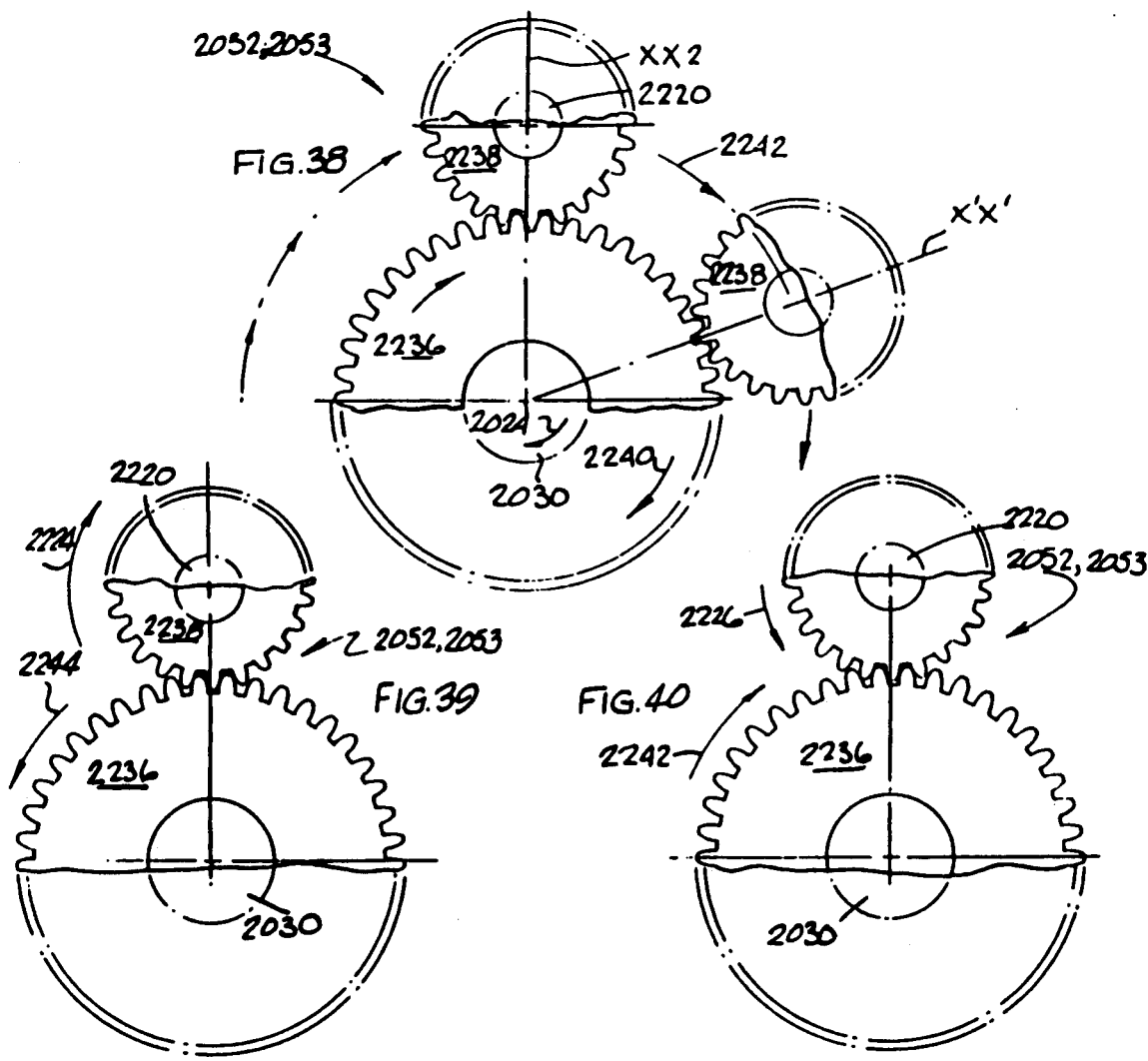

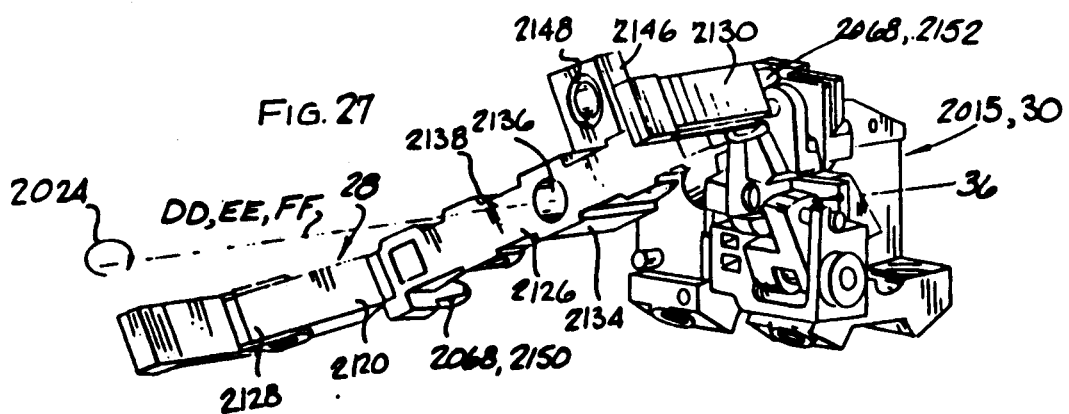
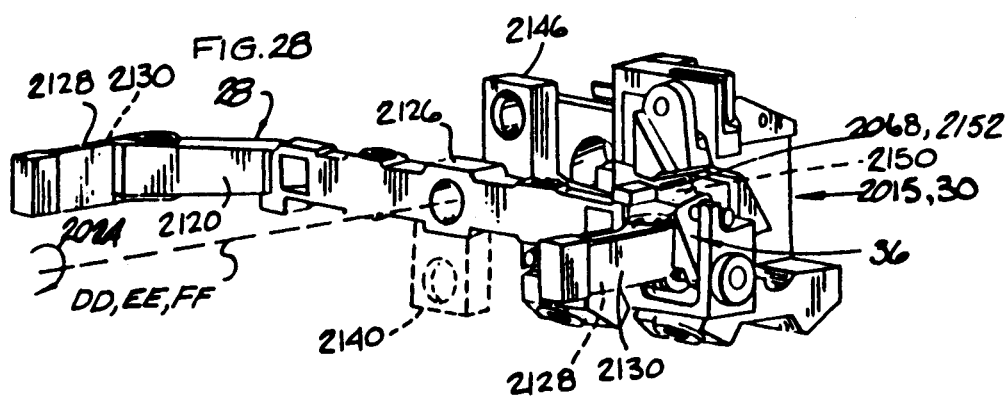
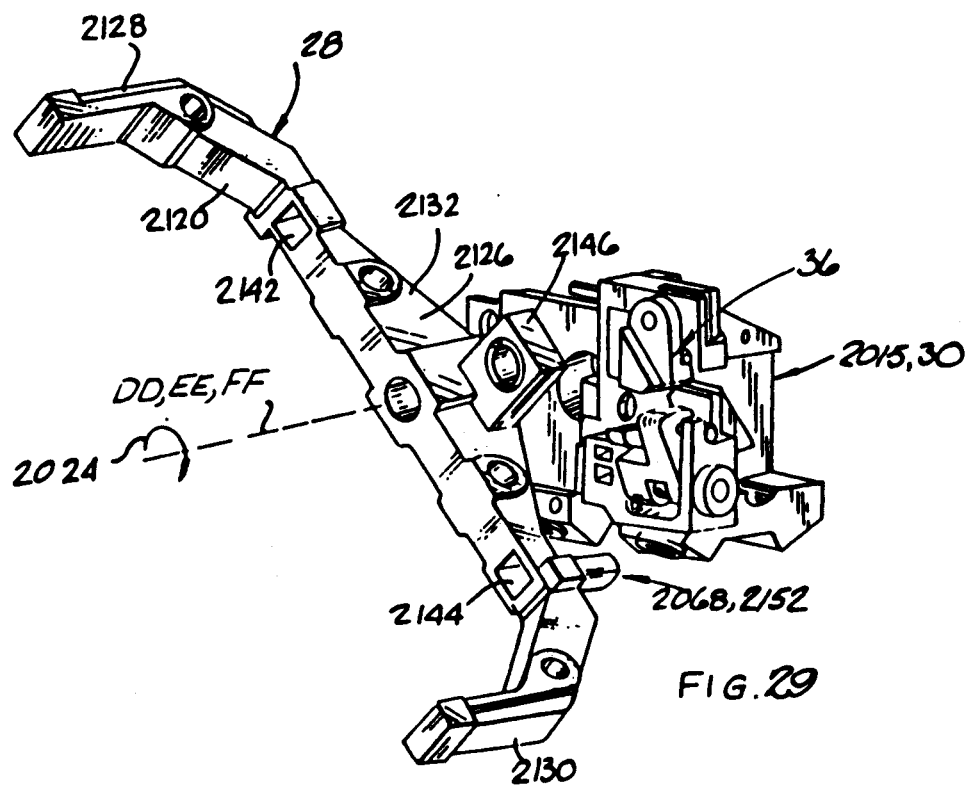

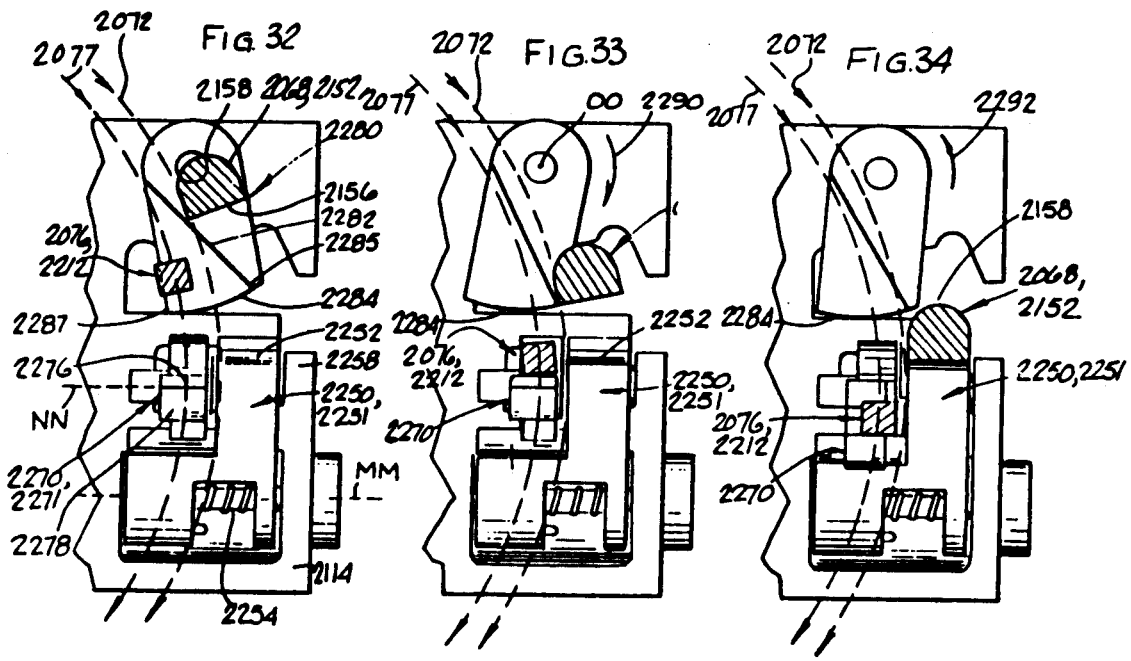
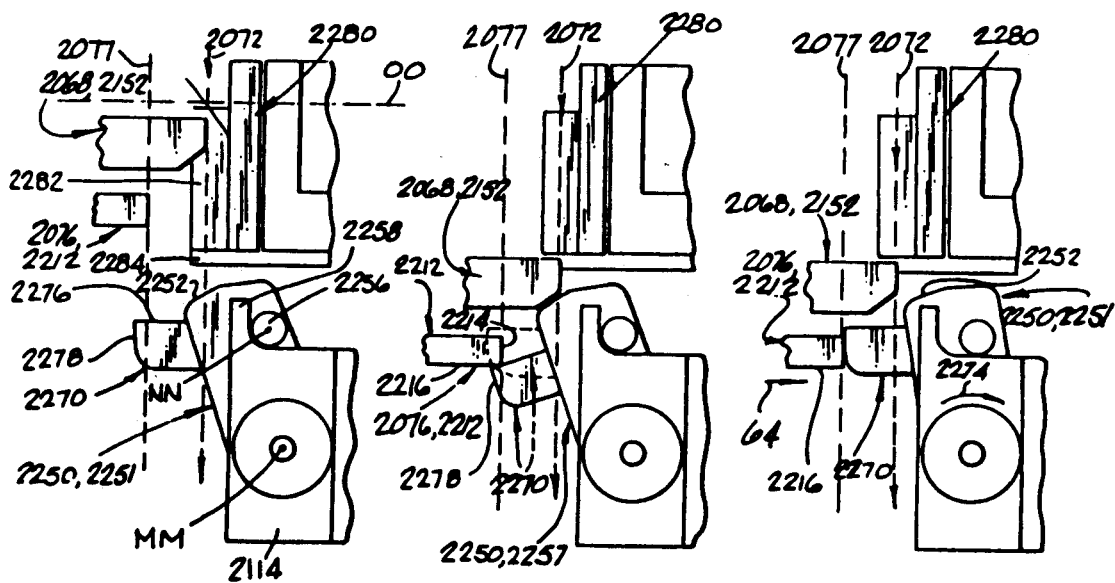

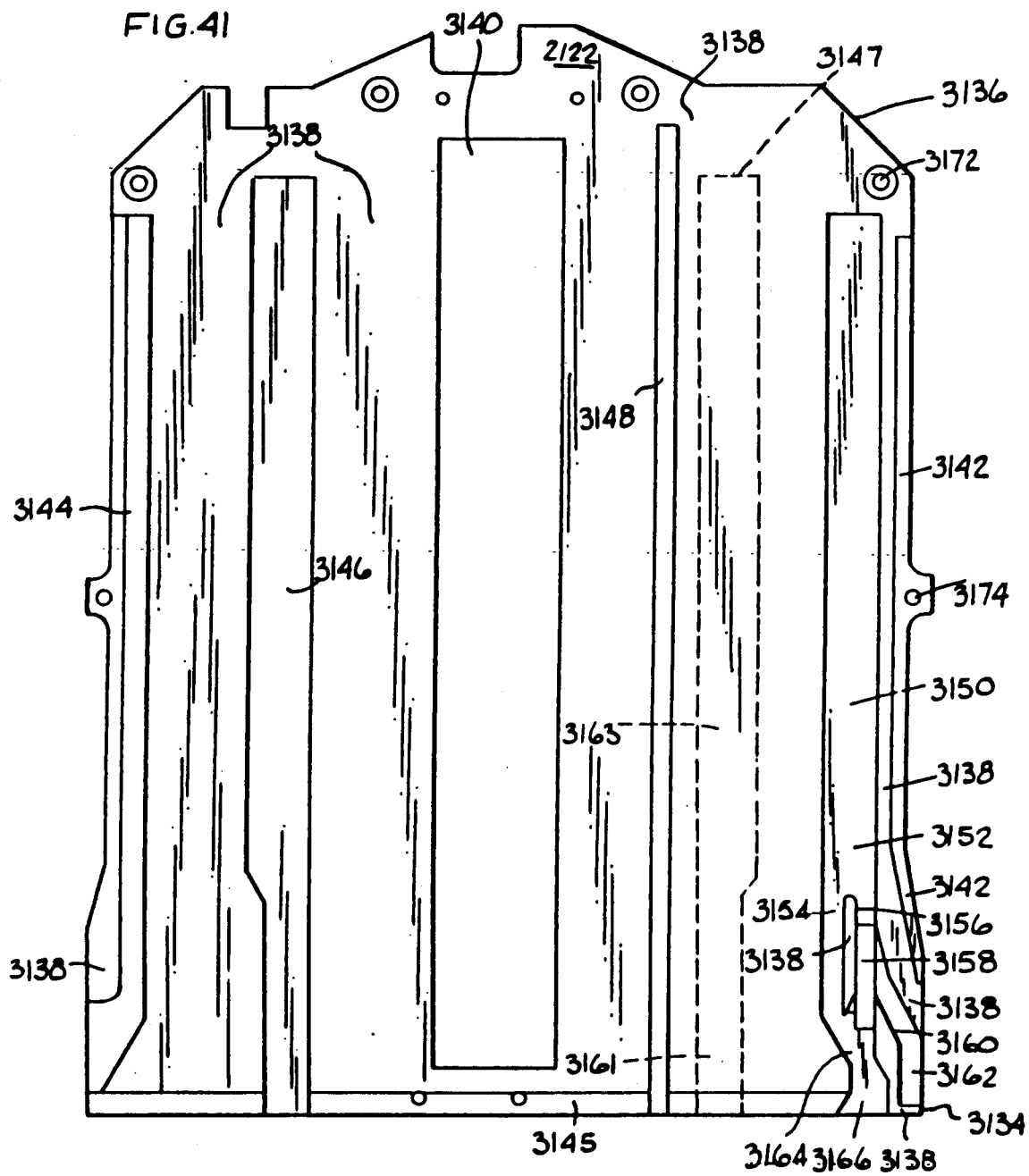
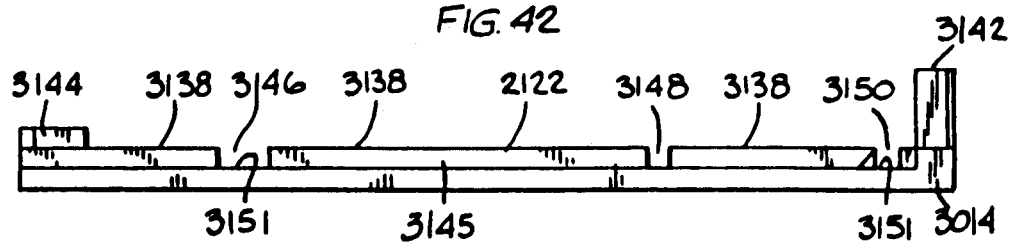

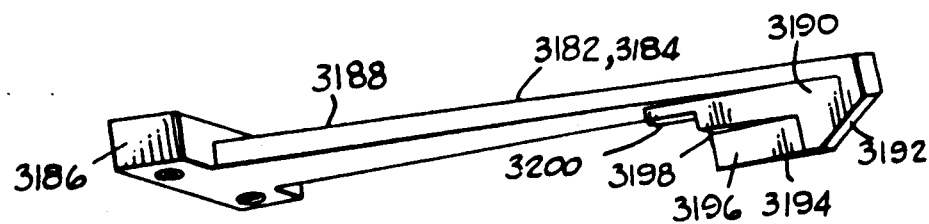
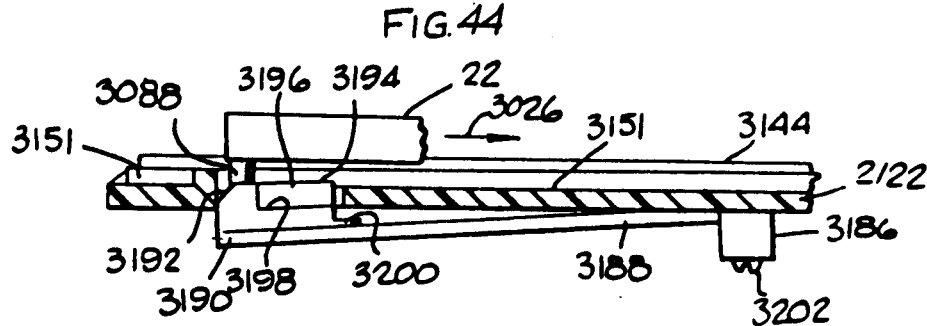
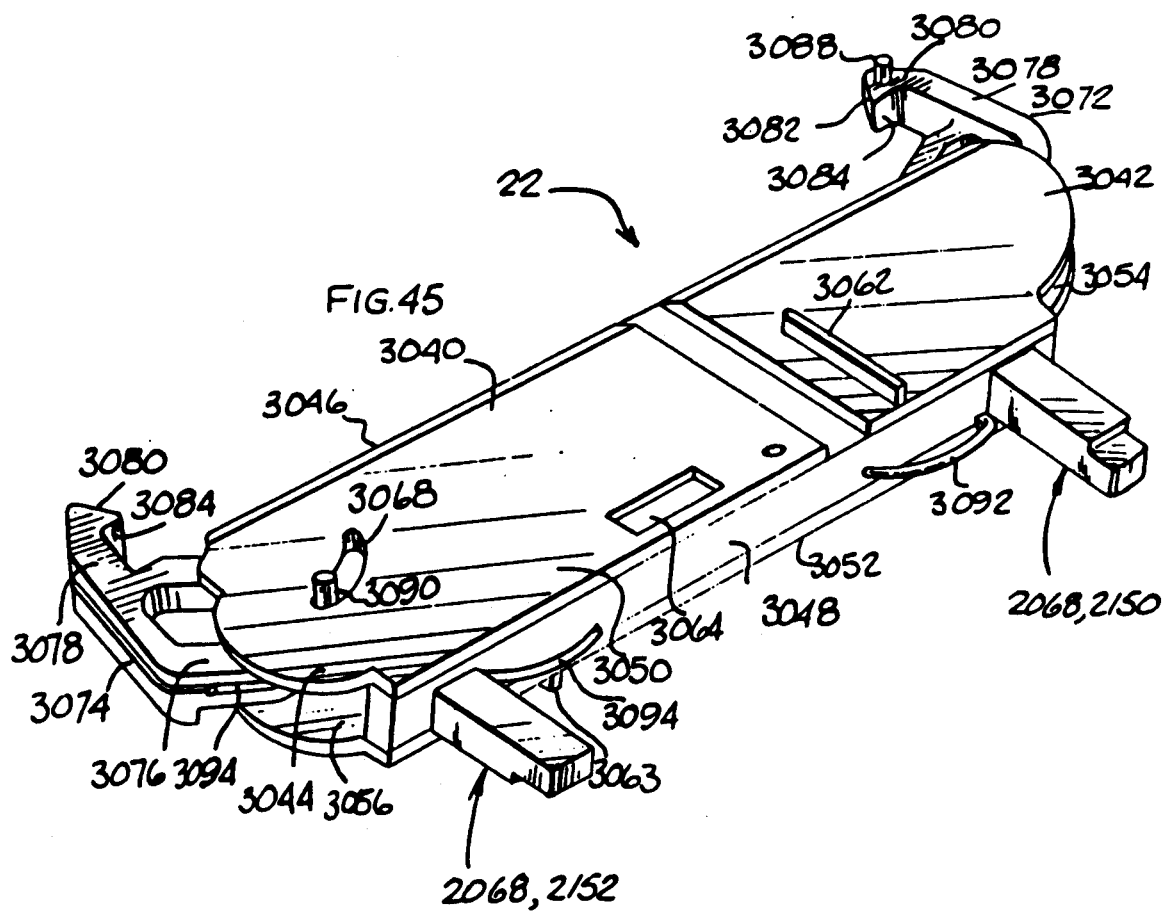

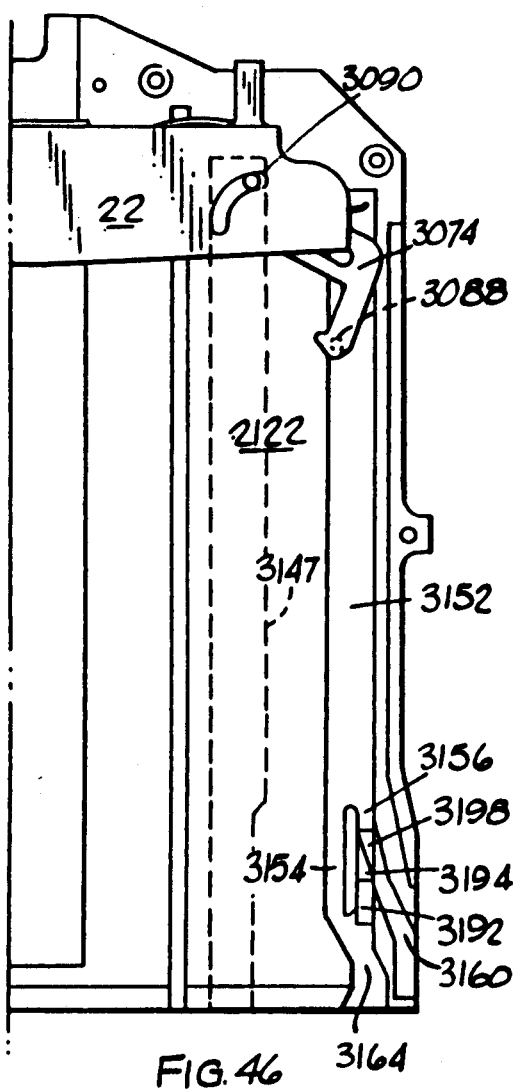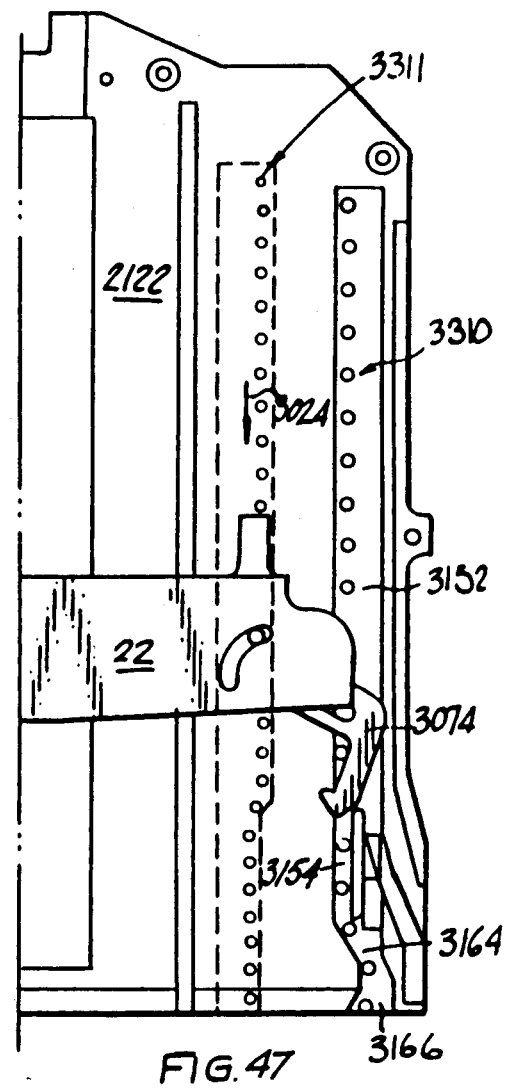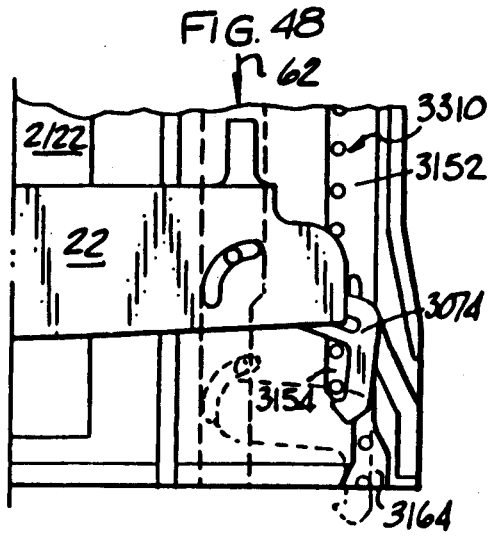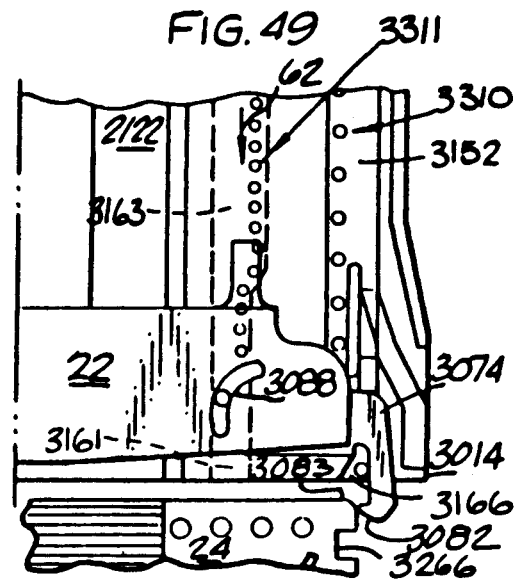

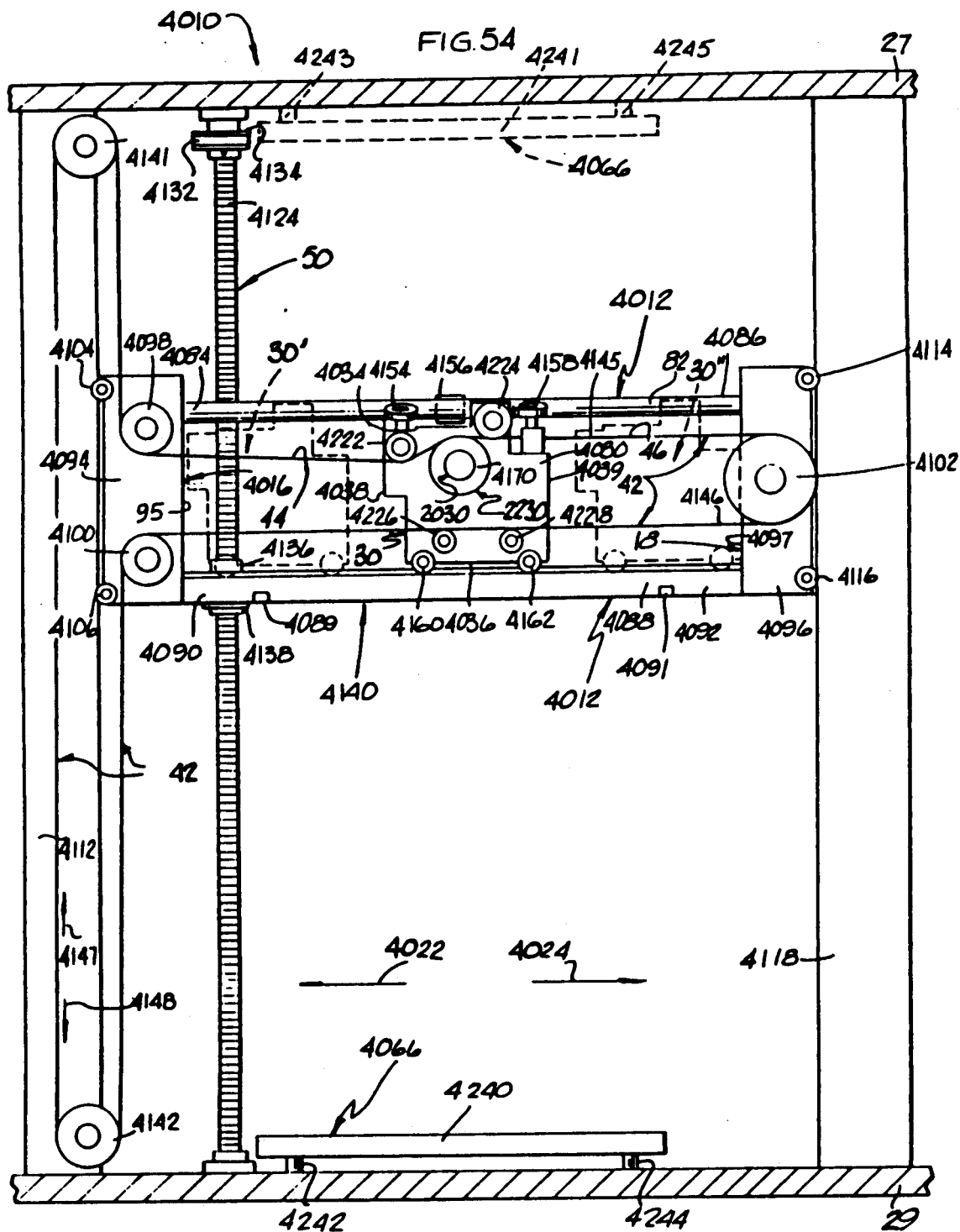

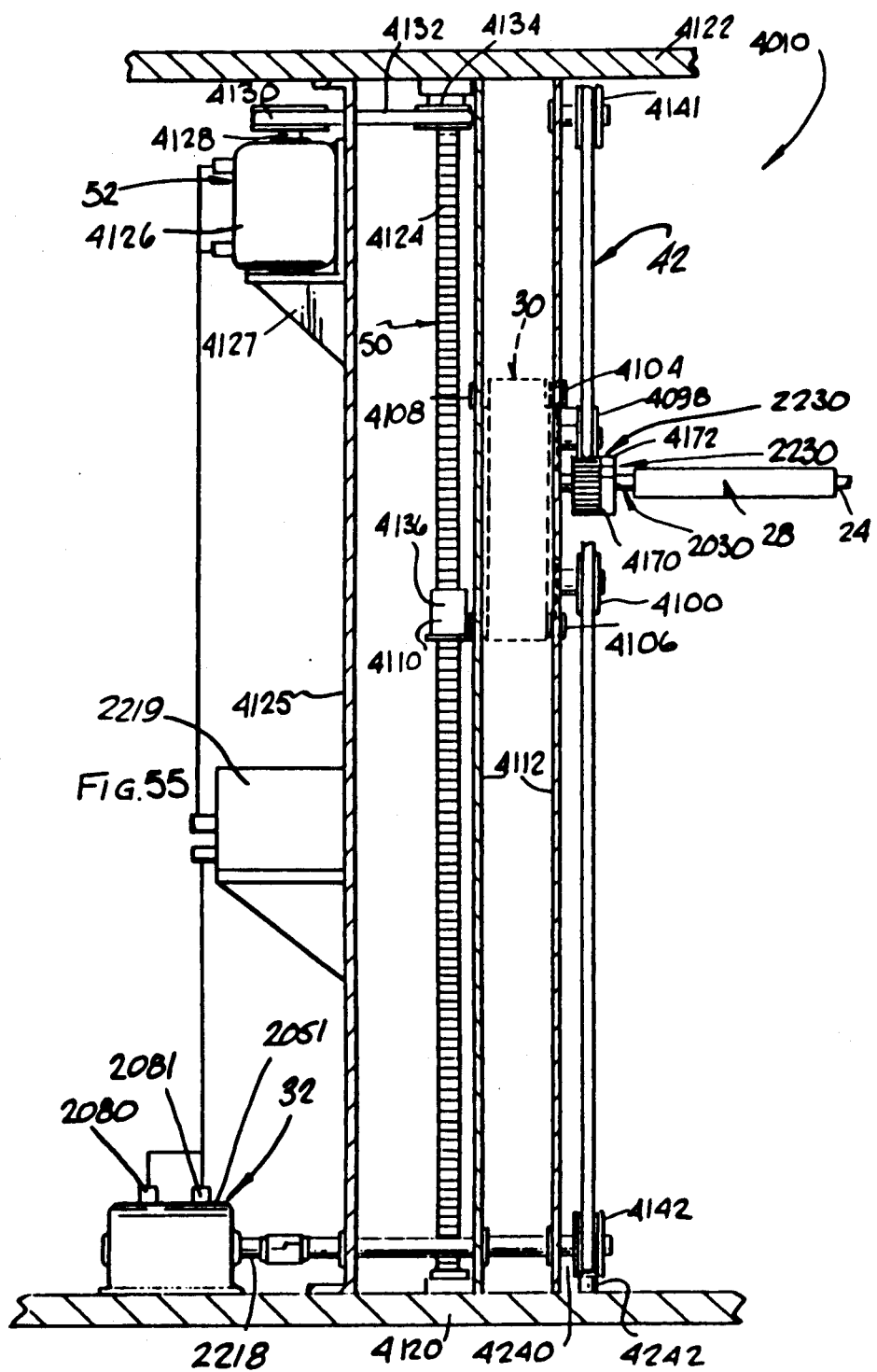

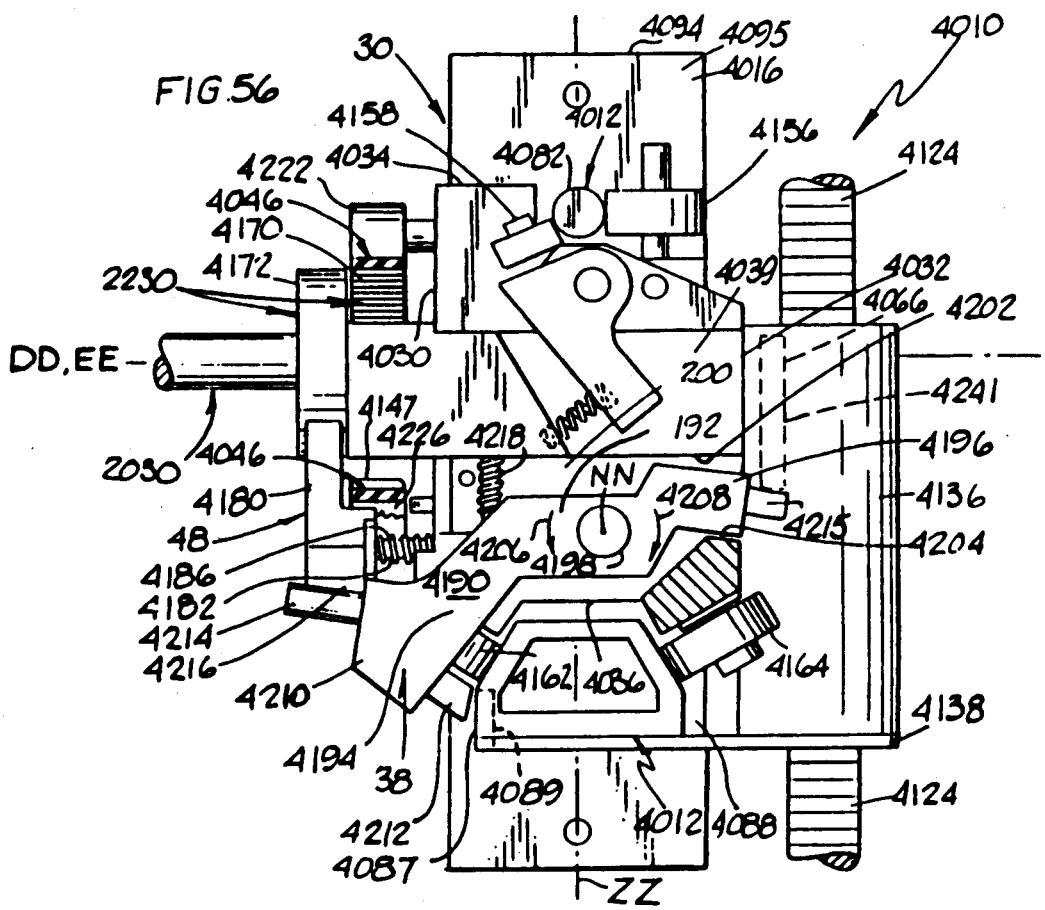
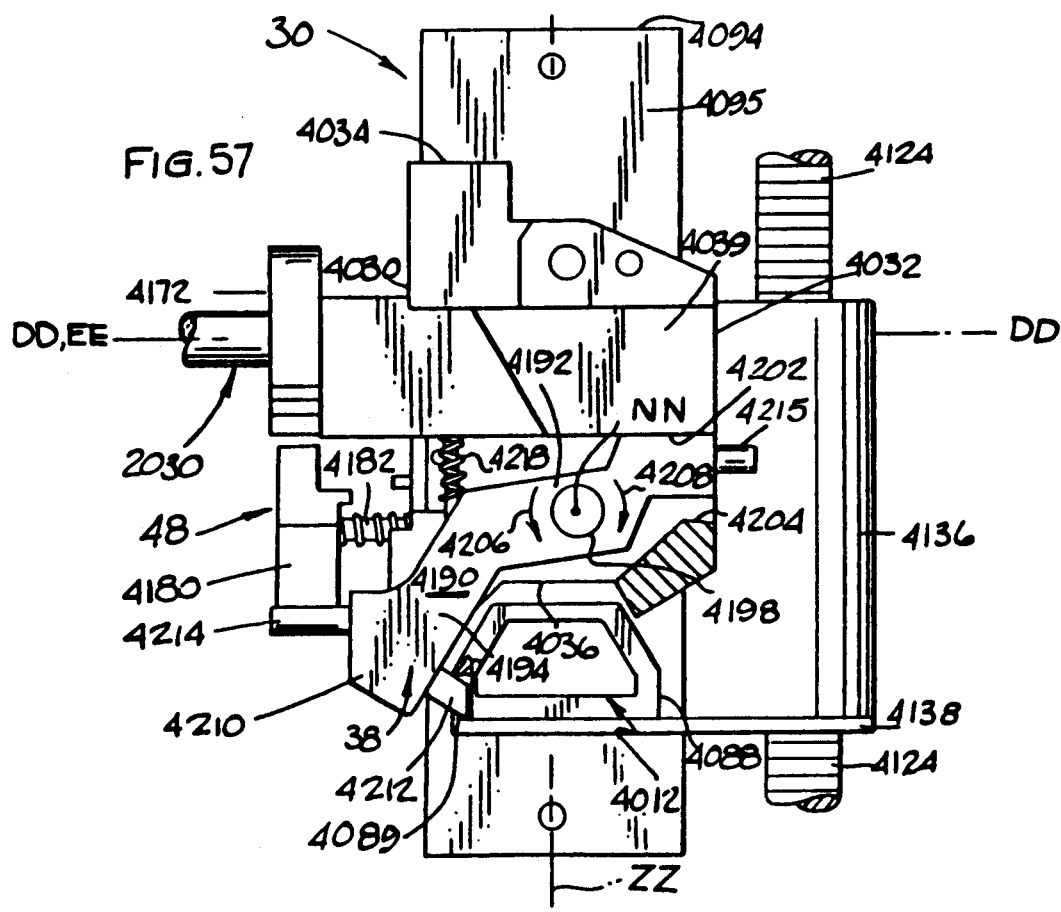

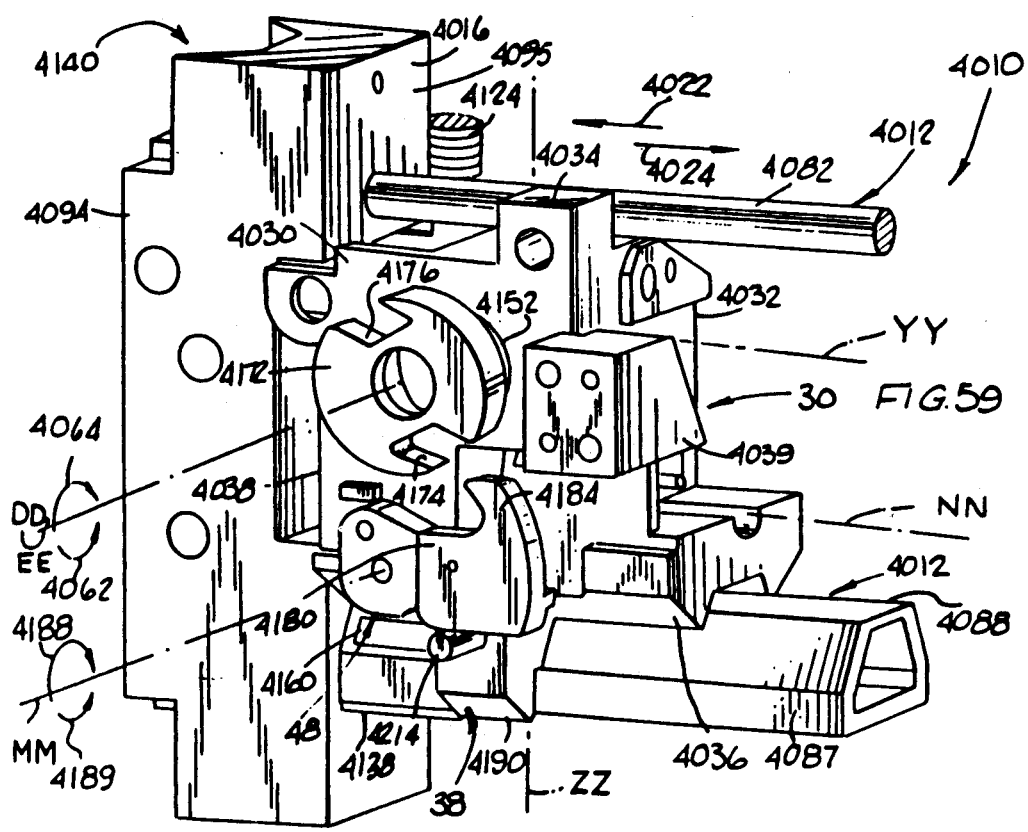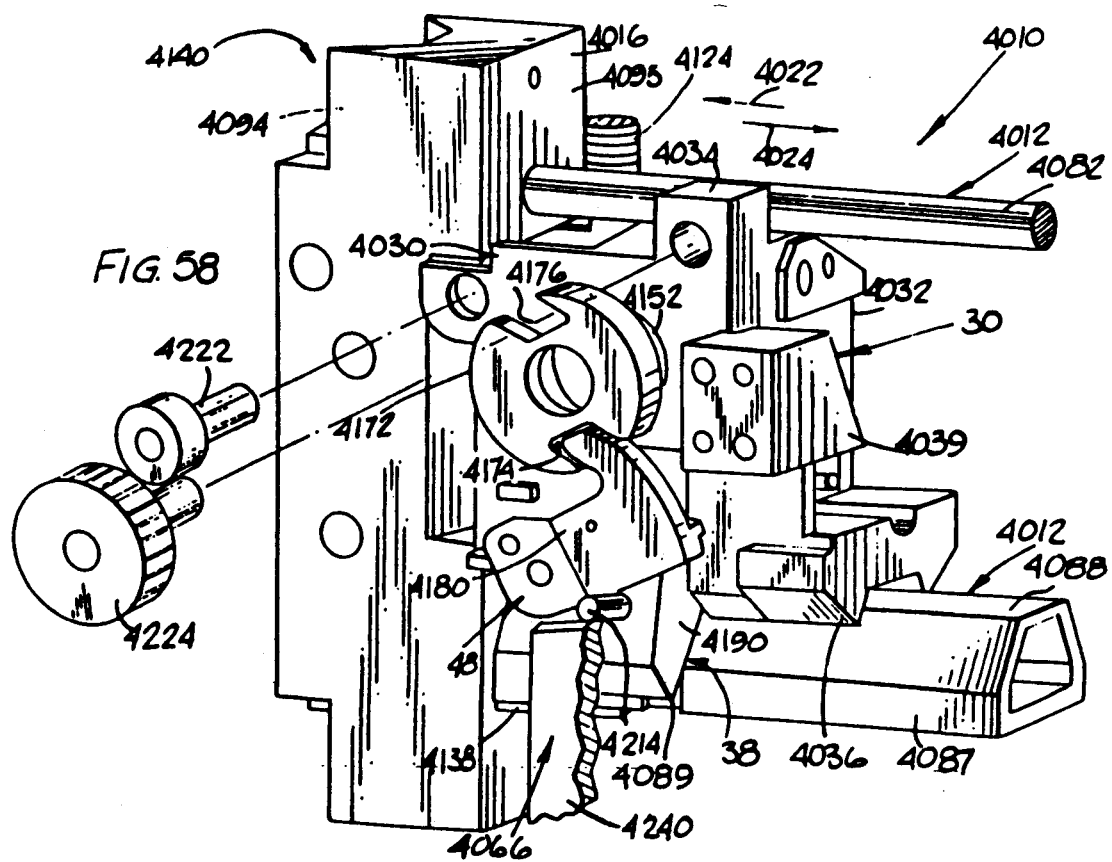

CARTRIDGE HANDLING SYSTEM

BACKGROUND OF THE INVENTION

The present invention relates generally to an apparatus for handling and storing optical disk cartridges and, more particularly, to an apparatus capable of engaging and releasing a cartridge; longitudinally, laterally and vertically displacing a cartridge; and angularly displacing a cartridge about two different rotation axes using only two drive units.

An optical disk is a data storage medium which is readable by a laser-based reading device. Optical disks known as "compact disks" or "CDs" have become increasing popular during the past few years for recording music and audio-video works. Due to the huge storage capacity of optical disks as compared to conventional magnetic storage media, optical disks known as "ROM disks" have become popular for storing computer readable information. However, until very recently, optical disks were of somewhat limited use in the computer industry due to the fact that optical disks could not be "erased" and "written" with new information, i.e. ROM disks are "read only" memory devices. However, recent technology has produced optical disks which are both computer readable and computer writable. Thus, in the future, optical disks are expected to become increasingly more important in the computer industry and may eventually replace magnetically readable and writable storage media such as "floppy disks" and "hard disks." Another recent development, the ability to provide data storage on both surfaces of an optical disk, has effectively doubled the optical disk storage capacity.

Optical disks of the type used in computer applications are generally mounted in parallelepiped-shaped cartridges. Optical disk reading devices generally receive a disk which is to be read through a narrow slot provided on the front surface of the device. Currently, most optical disks are hand-inserted into disk readers. However, for large databases consisting of many optical disks, it is preferable, and perhaps essential, to provide an optical disk storage system for storing the disks at known locations, and an optical disk handling system which is capable of retrieving a desired disk from a storage location and inserting the disk into an optical disk reader. In a disk storage system wherein the stored disks and an associated disk reader are arranged in a longitudinally extending, two-dimensional array consisting of vertically extending columns and laterally extending rows, it is necessary for a disk handling system to be capable of engaging a disk, moving it vertically, laterally, and longitudinally and then releasing it in order to remove it from storage, move it into aligned relationship with the disk reader, and insert it into the disk reader. It may further be necessary for the disk handling system to flip the disk to reverse the side thereof which will be positioned in readable relationship with a reader. It may also be necessary to reorient a disk at the time it is initially inserted into the system by an operator.

In order to decrease production and maintenance costs and to increase reliability of such a disk handling system, it is generally desirable to reduce the number of separate drive units to a minimum. It is also desirable to minimize or eliminate the type of mechanical systems such as, for example, clutch assemblies, which are particularly subject to malfunction under frequent use conditions. It is also desirable to minimize the use of sensing devices which are particularly subject to malfunction such as, for example, photoelectric or magnetic proximity sensors. It is also desirable to minimize the mounting of sensors or motors on moving system components to eliminate problems associated with moving lead wires, etc.

Various features and components of such a cartridge handling system are disclosed in U.S. patent applications: U.S. Ser. No. 278,102 filed 11/30/88 for OPTICAL DISK HANDLING APPARATUS WITH FLIP LATCH of Methlie, Oliver, Stavely and Wanger; U.S. Ser. No. 305,898 filed 2/2/89 for OPTICAL DISK CARTRIDGE HANDLING APPARATUS WITH PASSIVE CARTRIDGE ENGAGEMENT ASSEMBLY of Wanger, Methlie, Jones and Stavely; U.S. Ser. No. 288,608 filed 12/22/88 for OPTICAL DISK INSERTION APPARATUS of Christie, Wanger, Dauner, Jones and Domel; and U.S. Ser. No. 298,388 filed 1/18/89 for LATERAL DISPLACEMENT CONTROL ASSEMBLY FOR AN OPTICAL DISK HANDLING SYSTEM of Wanger, Methlie, Stavely and Oliver; which are each hereby specifically incorporated by reference for all that is disclosed therein.

SUMMARY OF THE INVENTION

The present invention is directed to an optical disk handling system which is adapted to receive an optical disk cartridge inserted by a human operator and place the cartridge in a selected one of a plurality of longitudinally extending holding units which are arranged in a laterally and longitudinally extending holding unit array. The apparatus is also adapted to retrieve a cartridge from an assigned holding unit, insert the cartridge in an optical disk reading device which is located in the holding unit array, and later return the cartridge to its assigned holding unit. The apparatus is also adapted to flip a cartridge, if necessary, prior to inserting it into a reading device so as to orient a selected side of the optical disk in readable relationship with the disk reading device. The apparatus is adapted to perform the above-described functions using only two drive units and using a transmission assembly having a plurality of positively engaging latches which obviates the need for clutch assemblies.

Thus, the invention may comprise a cartridge handling system for use in association with a plurality of longitudinally extending rearwardly opening cartridge holding units arranged in a laterally and vertically extending array. The handling system may include an insertion assembly for receiving a hand-inserted cartridge from a human operator with a first end of the cartridge positioned forwardly and for longitudinally and rotationally displacing the cartridge for presenting the cartridge to a cartridge engaging assembly with the first end of the cartridge positioned rearwardly. The system may include a cartridge engaging assembly for engaging an exposed end portion of a cartridge positioned in an aligned holding unit. A longitudinal displacement assembly may be provided which is operatively associated with the engaging assembly for longitudinally displacing a cartridge engaged by the engaging assembly. The longitudinal displacement assembly may also be used for actuating the insertion assembly. A flipping assembly may be operatively associated with the engaging assembly for invertingly rotating a cartridge engaged by the engaging assembly about a longitudinally extending flip axis. The system may include a lateral displacement assembly operatively associated with the engaging assembly for laterally displacing a cartridge engaged by the engaging assembly. A unitary, rotatable drive unit may be drivingly linked to the longitudinal displacement assembly, the flipping assembly, and the lateral displacement assembly for providing driving force thereto.

The cartridge handling system may further comprise a stop structure engageable with the longitudinal displacement assembly for limiting longitudinal displacement thereof; a flip latch, having a latched state and an unlatched state, operatively associated with the flipping assembly for preventing rotation thereof during the flip latch latched state; and a translation latch, having a latched state and an unlatched state, operatively associated with the lateral displacement assembly for preventing lateral displacement thereof during the translation latch latched state.

The invention may also comprise a motion transmitting apparatus for alternately providing linear displacement and rotational displacement of a carriage member in response to torque applied from a single rotatable drive shaft. The apparatus may include a base member and a rotatable member, having a central axis of rotation, rotatably mounted on the base member for supporting the carriage member thereon in linearly displaceable relationship therewith. A linear displacement assembly is provided for linearly displacing the carriage member with respect to the rotatable member. A first gear is rotatably mounted on the rotatable member and has a central axis of rotation positioned coaxially with the rotatable member central axis of rotation. The first gear is drivingly coupled to the rotatable drive shaft. A second gear is provided which is rotatably mounted on the rotatable member which has a central axis of rotation positioned in parallel radially offset relationship with the rotatable member central axis of rotation. The second gear is drivingly connected to the linear displacement assembly. The second gear has a circumferential portion which is engaged with a circumferential portion of the first gear. A latch is provided which is operatively associated with the rotatable member for selectively preventing rotation of the rotatable member. A stop device is provided which is operatively associated with the linear displacement assembly for selectively preventing movement of the linear displacement assembly.

BRIEF DESCRIPTION OF THE DRAWINGS

An illustrative and presently preferred embodiment of, the invention is shown in the accompanying drawings in which:

FIG. 5 is rear perspective view of an optical disk insertion apparatus and portions of an associated optical disk cartridge storage and handling system.

FIG. 6 is a detail exploded perspective view of an insertion apparatus actuator and actuator latch assembly.

FIG. 7 is a bottom perspective view of an insertion apparatus upper housing member.

FIG. 8 is a top perspective view of an insertion apparatus lower housing member.

FIG. 9 is an exploded top perspective view of an optical disk receiving assembly.

FIG. 10 is a bottom perspective view of a receiving assembly upper member.

FIG. 11 is a bottom perspective view of a receiving assembly lower member.

FIG. 12 is a top perspective view of a receiving assembly lower member with a cartridge properly inserted therein.

FIG. 13 is a top perspective view of a receiving assembly lower, member with a cartridge improperly inserted therein.

FIGS. 14–18 are detail, partially cross-sectional, elevation views of an insertion apparatus latch assembly and associated catch surfaces in various operating states.

FIGS. 19–24 are schematic top plan views or the insertion apparatus illustrating the location of various components thereof during an operating cycle.

FIG. 25 is a perspective view of a forward portion of a cartridge engaging flipping and longitudinally displacing (e.f.l.) apparatus.

FIG. 26 is a perspective view of a rear portion of a laterally displaceable carriage assembly and a flip latch assembly mounted thereon.

FIGS. 27–29 are partial views of an e.f.l. assembly illustrating relative rotated positions thereof.

FIGS. 32–34 are rearwardly-facing elevation views of a flip latch assembly illustrating various operating positions thereof.

FIGS. 35–37 are side elevations views of a flip latch assembly showing various operating positions thereof.

FIGS. 38–40 are schematic, rearwardly-facing elevation views of an e.f.l. apparatus transmission assembly showing various operating modes thereof.

FIG. 41 is a top plan view of a lower member of a flipping guide sleeve assembly.

FIG. 42 is a front elevation view of the lower guide sleeve member of FIG. 41.

FIG. 43 is a perspective view of a gate member.

FIG. 44 is a detail, partially cross-sectional, side elevation view of a gate member mounted on a lower guide sleeve member.

FIG. 45 is a perspective view of a cartridge engaging assembly.

FIG. 46 is a top plan view of the right half of a cartridge engaging assembly mounted in a guide sleeve assembly with the top guide sleeve member removed for illustrative purposes.

FIG. 47 is a top plan view of the right half of the cartridge engaging assembly and guide sleeve assembly of FIG. 46 showing another operating position of the cartridge engaging assembly.

FIGS. 44–53 are top plan views of the front right portions of a guide sleeve assembly and a portion of a cartridge engaging assembly mounted therein with a top guide sleeve/member removed, showing various operating positions of the cartridge engaging assembly.

FIG. 54 is a front elevation view of portions of an assembly which provides controlled lateral and vertical displacement of an optical disk cartridge.

FIG. 55 is a left side elevation view of the assembly of FIG. 54, eliminating certain structure and also showing some further structural detail.

FIG. 56 is a partially cut-away, right side elevation view of a laterally displaceable carriage assembly and associated rotation locking and translation latching assemblies in one operating state.

FIG. 57 is a right side elevation view of the carriage, locking, and latching assemblies of FIG. 56 in another operating state thereof.

FIG. 58 is a perspective view of a carriage, locking, and latching assembly in the same operating state as FIG. 56.

FIG. 59 is a perspective view of a carriage, locking, and latching assembly in the same operating state as FIG. 57.

DETAILED DESCRIPTION OF THE PREFERRED EMBODIMENTS OF THE INVENTION

I. Cartridge Handling System In General

Figure 1:
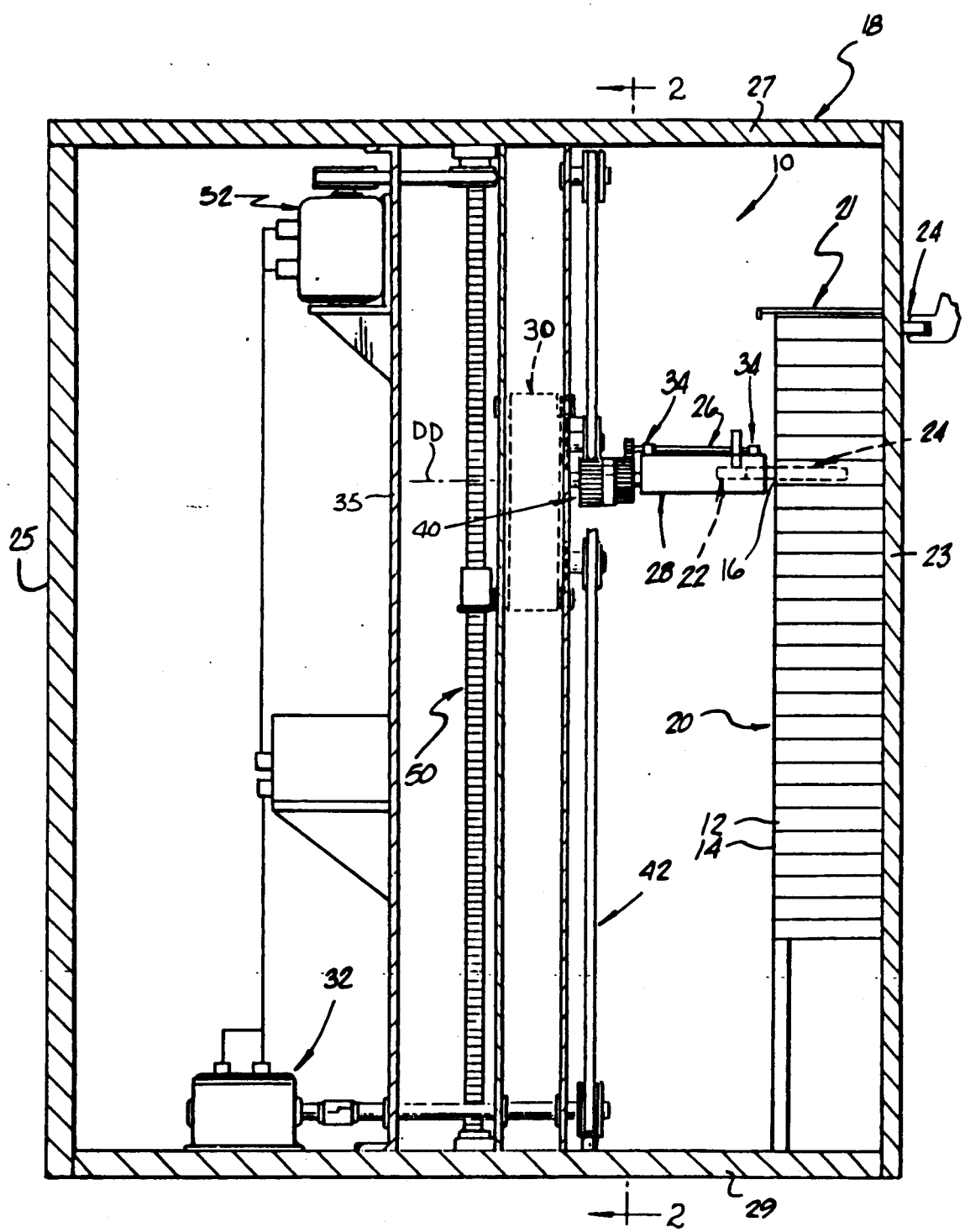
FIG. 1 is a schematic side elevation view of an optical disk cartridge handling system.
Figure 2:
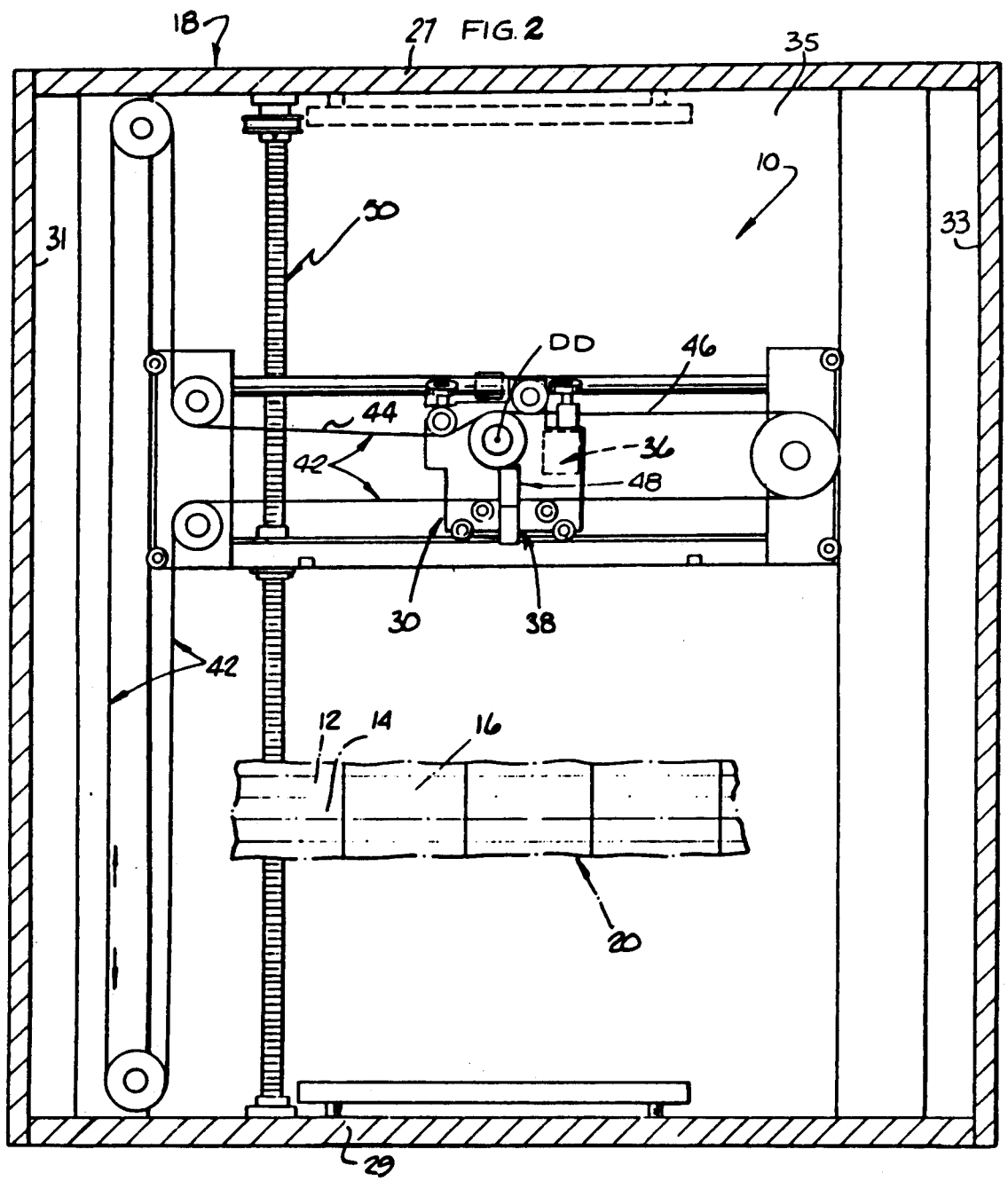
FIG. 2 is a schematic front elevation view of an optical disk cartridge handling system.

FIGS. 1 and 2 illustrate an optical disk cartridge handling system 10 for use in association with a plurality of longitudinally extending, rearwardly opening, cartridge holding units 12, 14, 16, etc., arranged in a laterally and vertically extending holding unit array 20. The handling system 10 and holding unit array 20 is contained within a closed housing 18 having a front wall 23, a back wall 25, a top wall 27, a bottom wall 29, a left lateral side wall 31, and a right lateral side wall 33. An intermediate housing wall 35 may be positioned between the front and back walls for separating electronic and motor components from other components of the apparatus.

The handling system 10 may comprise an insertion means 21 for receiving a cartridge 24 which is hand-inserted by a human operator with a first end of the cartridge positioned forwardly. The insertion means longitudinally and rotationally displaces the cartridge so as to present the cartridge to a cartridge engaging means with the first end of the cartridge positioned towards the rear of the housing.

A cartridge engaging means 22 is provided for engaging an exposed end portion of a cartridge positioned in the insertion means 21 or in another aligned holding unit, e.g. 12, 14, 16.

A longitudinal displacement means 26 is operatively associated with the engaging means for longitudinally displacing a cartridge 24 engaged by the engaging means 22.

A flipping means 28 is operatively associated with the engaging means 22 and is used for invertingly rotating a cartridge engaged by the engaging means about a longitudinally extending flip axis DD.

A lateral displacement means 30 is operatively associated with the engaging means 22 for laterally displacing a cartridge 24 engaged by the engaging means.

A rotatable first drive means 32 is drivingly linked to the longitudinal displacement means 26, the flipping means 28, and the lateral displacement means 30 for providing driving force thereto.

Stop means 34 may be provided which limit the movement of the longitudinal displacement means 26.

A flip latch means 36 is provided which has a latched state and an unlatched state and which is operatively associated with the flipping means 28 for preventing rotation thereof when the flip latch means 36 is in the latched state.

A translation latch means 38 is provided which has a latched state and an unlatched state. The translation latch means is operatively associated with the lateral displacement means 30 for preventing lateral displacement thereof when the translation latch means is in the latched state.

The cartridge handling system 10 has a longitudinally displacing operating state wherein the stop means 34 is in disengaged relationship with the longitudinal displacement means 26; the flip latch means 36 is in its latched state; and the translation latch means 38 is in its latched state. The cartridge handling system 10 comprises a rotatably flipping operating state wherein the stop means 34 is in engaged relationship with the longitudinal displacement means 26; the flip latch means 36 is in its unlatched state; and the translation latch means 38 is in its latched state. The cartridge handling system 10 also comprises a laterally displacing operating state wherein the translation latch means 38 is in its unlatched state.

A first gear means 40 (22, 36, 4170, 4172) is provided which is mounted in rotationally displaceable relationship with the lateral displacement means 30 and which is drivingly linked to the longitudinal displacement means 26 and the flipping means 28.

A continuous drive belt means 42 is provided which is continuously nonslippingly engaged with the first gear means 40 for drivingly linking the first gear means 40 with the first drive means 32. The continuous belt means may comprise a first portion 44 extending in a first lateral direction from the first gear means 40 and a second portion 46 extending in a second lateral direction from the first gear means. The lateral displacement means 30 is laterally displaceable through movement of the continuous belt means 42 when the first gear means 40 is locked against rotation.

A gear lock means 48 having a locked state and an unlocked state is provided which is operatively associated with the first gear means 40. The gear lock means 48 prevents rotation of the first gear means 40 when the gear lock means is in its locked state. The cartridge handling system 10 is constructed and arranged such that the gear lock means 48 is in its locked state when the translation latch means 38 is in its unlatched state, and such that the gear lock means 48 is in its unlocked state when the translation latch means 38 is in its latched state.

The optical disk cartridge handling system 10 also comprises a vertical displacement means 50 for vertically displacing a cartridge 24 engaged by the cartridge engaging means 22. A second drive means 52 is operatively associated with the vertical displacement means 50 for providing driving force thereto.

Having thus described the cartridge handling system in general, the various working assemblies of the invention will now be described in detail.

II. Insertion Apparatus

Figure 3:
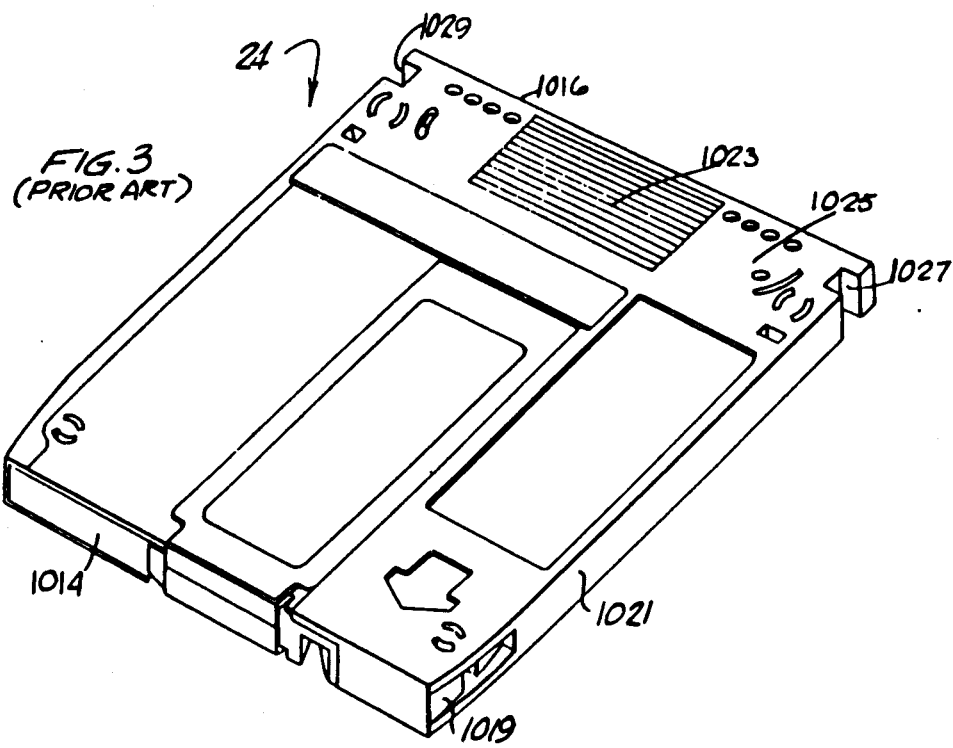
FIG. 3 is a perspective view of a conventional optical disk cartridge.
Figure 4:
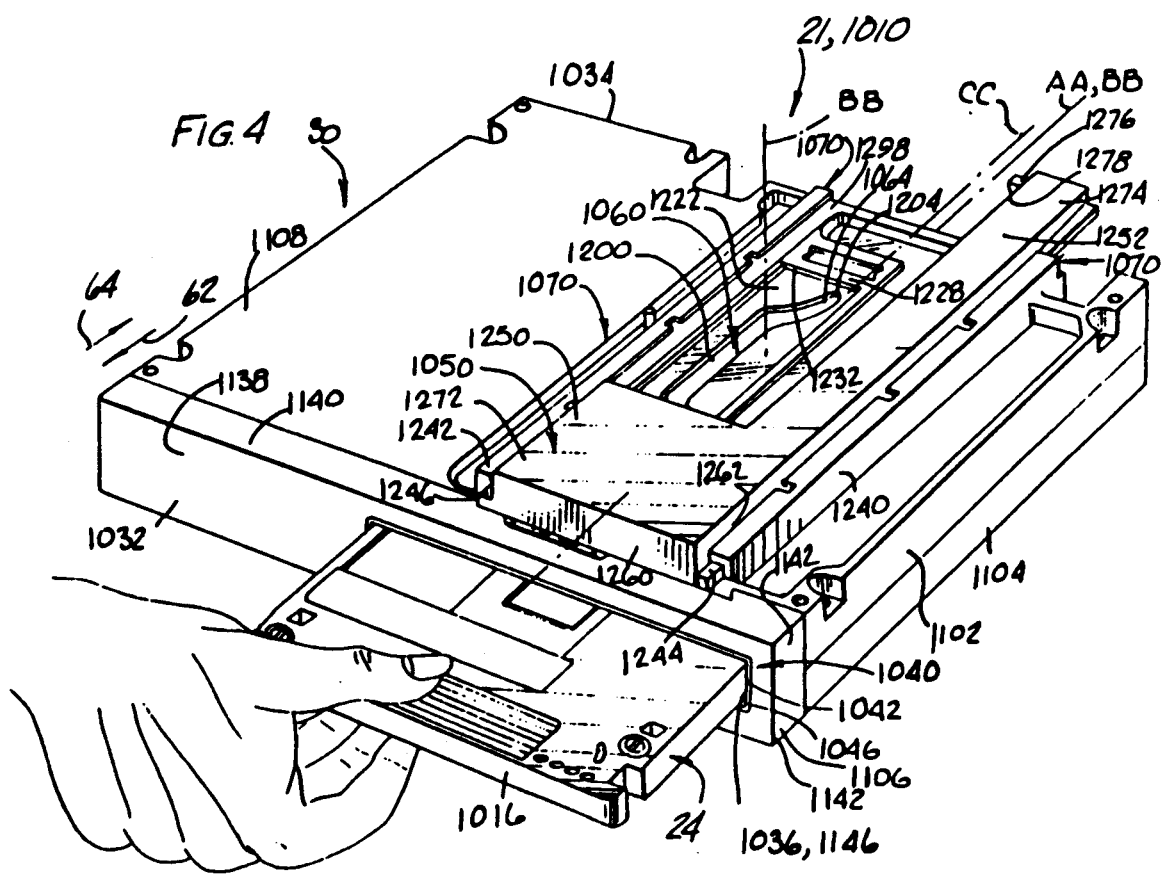
FIG. 4 is front perspective view of an optical disk insertion apparatus.

As illustrated in FIGS. 4 and 5, the insertion means 21 may comprise an optical disk cartridge insertion apparatus 1010. The apparatus 1010 is designed to be used in association with a conventional optical disk cartridge 24, FIG. 3. Cartridge 24 has a rear end portion 1014 which is adapted to be inserted into an optical disk reading device 1015 and has a forward end portion 1016 which is adapted to ordinarily be grasped by a human operator for inserting and removing the cartridge from an optical disk reading device. The cartridge insertion apparatus 1010 enables a human operator to grasp and insert an optical disk cartridge 24 into a forward end 1032 of the insertion apparatus in the same manner in which a cartridge is ordinarily inserted into an optical disk reading device. The insertion apparatus 1010 angularly reorients the hand-inserted cartridge to enable a cartridge engaging means 22 which is positionable at a rear end 1034 of the insertion apparatus to engage the forward end portion 1016 of the optical disk cartridge. In the illustrated embodiment, the cartridge engaging means 22 is provided in an "e.f.l." apparatus 2010 which is adapted for engaging, flipping, and longitudinally displacing a cartridge as described in detail below with reference to FIG. 25. The e.f.l. apparatus 2010 may thereafter remove the cartridge from the insertion apparatus 1010 and insert it into a selected holding unit, e.g. 1020, FIG. 5, or into an optical disk reading device 1015 provided in holding unit array 20 without angularly reorienting the cartridge. When a cartridge is to be removed from the storage and handling system, the insertion apparatus 1010 performs the above described function in reverse, i.e. it receives a cartridge at its rear end 1034 from the e.f.l. apparatus 2010, reorients it, and presents it forward-end-first for removal by a human operator at its forward end 1032. The only sources of power required for operating the insertion apparatus are the human operator and the e.f.l. apparatus 2010.

The insertion apparatus 1010 comprises an insertion housing means 1030 having a forward end portion 1032, a rear end portion 1034, and a housing longitudinal axis AA extending therebetween. The housing has a forward opening 1036 which is adapted for enabling hand-insertion and hand-removal of optical disk cartridges 24 by a human operator. The housing means has a rear opening 1042 for enabling machine-insertion and machine-removal of cartridges by e.f.l. apparatus 2010. The housing means forward and rear end portions 1032, 1034 define forWard and rear movement directions 62, 64.

The insertion apparatus 1010 also comprises a cartridge receiving means 1040, FIGS. 9-13, which is supported by the housing means 1030 in angularly and longitudinally displaceable relationship with the housing means. The cartridge receiving means is adapted for receiving a cartridge 24 therein and for holding the cartridge in stationary relationship therewith, FIG. 12. The cartridge receiving means has a central longitudinal axis BB extending between a forward end portion 1042 and a rear end portion 1044 thereof which is positionable in coaxial relationship with housing longitudinal axis AA. As illustrated in FIG. 12, the cartridge receiving means 1040 is adapted to have the forward end portion 1016 of the cartridge 24 positioned proximate its forward end portion 1042 and to have the rear end portion 1014 of the cartridge positioned proximate its rear end portion 1044 when a cartridge is properly received therein. The receiving means has a forward end opening 1046 which is adapted to enable insertion and removal of cartridges 26. The cartridge receiving means has a first operating position, FIGS. 4 and 19, in which is it located during hand-insertion and hand-removal of cartridges wherein the forward end portion 1042 of the receiving means is positioned proximal the forward end portion 1032 of the housing means 1030. The receiving means has a second operating position, FIGS. 5 and 24, in which it is located during machine-insertion and machine-removal of cartridges. In the second operating position, the forward end portion 1042 of the receiving means is positioned proximal the rear end portion 1034 of the housing means. In the illustrated embodiment, the receiving means second operating position is rotated 180° from the first operating position.

Figure 19:
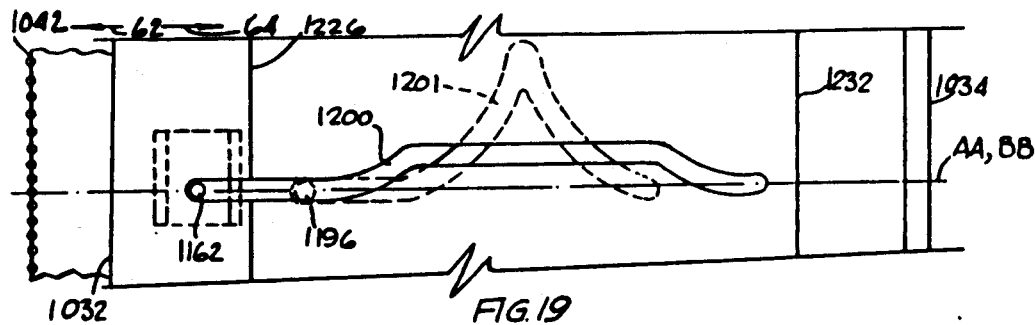

The insertion apparatus 1010 further comprises an actuator means 1050 which is operably connected to the cartridge receiving means 1040 for moving the cartridge receiving means between the first operating position, FIG. 19, and the second operating position, FIG. 24, thereof.

The apparatus 1010 also includes a track means 1060 having a forward end portion 1062 and a rear end portion 1064, FIGS. 7 and 8. The track means is fixedly associated with the housing means 1030 and is operably associated with the cartridge receiving means 1040 for guiding the movement of the receiving means 1040 relative the housing means 1030.

An actuator guide means 1070 is provided for limiting the movement of the actuator means 1050 relative to the housing means 1030 to an actuator path having a central longitudinal axis CC extending parallel to the housing means longitudinal axis AA.

Figure 20:
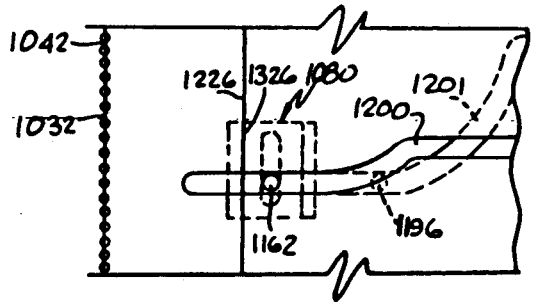

The apparatus also comprises latching assembly means 1080, 1082, FIGS. 6 and 14–18, operably associated with the actuator means 1050 and the track means 1060 for releasably maintaining the receiving means 1040 in a first latching location, FIGS. 16 and 20, associated with hand-insertion of cartridges and a second latching location, FIGS. 18 and 24, associated with machine-removal and machine-insertion of cartridges.

Having thus described the insertion apparatus 1010 in general, various features of the apparatus will now be described in further detail.

OPTICAL DISK CARTRIDGE

A conventional optical disk cartridge 24 is illustrated in FIG. 3. The optical disk cartridge has a rear end portion 1014 which is adapted to be inserted into an optical disk reading device and a forward end portion 1016 which is adapted to be grasped by a human operator for handling the cartridge. Conventional optical disk cartridges in use in the United States for computer applications, such as for example an ISO (International Standards Organization) standard five-and-one-quarter-inch optical cartridge, have a generally parallelepiped shape with a thickness (height) of approximately 0.4 inches, a length of approximately 6 inches, and a maximum width of approximately 5.3 inches. The rear end portion 1014 of an optical disk cartridge tapers in width somewhat in approximately the last 0.5 inch of axial length thereof from a maximum lateral dimension of 5.3 inches to a minimum lateral dimension of approximately 5.1 inches at the terminal end thereof. Each optical disk has symmetrically positioned recesses 1019 in the lateral sidewalls 1021 thereof which are adapted for engaging a portion of a reading device. The forward end of a conventional optical disk cartridge has a centrally positioned ribbed surface 1023 on both a top 1025 and bottom surface thereof. Each optical disk also comprises a first rectangular groove 1027 and a second rectangular groove 1029 in a forward portion of the lateral sidewalls which are adapted to be engaged by portions of conventional reading devices for locating and holding the cartridge in the reading device.

The optical disk cartridge 24 may be of the type containing an optical disk which has information encoded on both surfaces thereof. Thus, the top surface and bottom surface of the cartridge are each adapted to be positioned adjacent to a reading head for reading the information contained on the associated disk.

HOUSING MEANS

Housing means 1030 may comprise an upper housing member 1102, a lower housing member 1104, and a front housing member 1106. The upper housing member 1102 has a top panel portion 1108, first and second lateral sidewalls 1110, 1112, a front wall 1114, and a rear wall 1116, FIG. 7. The rear wall has a forward portion 1117 and a rear portion 1119 which may be positioned 0.43 inches rearwardly of portion 1117. The top panel has forwardly extending recesses 1118, 1120, in the rear wall portion 1117 which are adapted to accommodate cartridge engaging latch portions 3072, 3074 of e.f.l. apparatus 2010. The peripheral walls 1110, 1112, 1114, 1116 may comprise vertically extending bores 1126 which are adapted to receive screws for attaching the upper housing member 1102 to the lower housing member 1104. The upper housing member 1102 has a groove 1200 therein, as described in further detail below, which provides a portion of the track means 1060.

The lower housing member 1104, as best illustrated in FIG. 8, comprises a bottom panel 1126, a front wall 1128, a rear wall 1130, and first and second lateral sidewalls 1132, 1134. The front wall 1128 comprises a laterally extending opening 1136 therein which may have a lateral dimension of, e.g. 6.02 inches. The rear wall 1130 comprises a rear opening 1138 therein, positioned in longitudinal alignment with the forward opening 1136, which may be, e.g., 6.30 inches wide. Lower panel 1126 has a recessed groove 1201 therein which forms a portion of the track means 1060, as described in further detail below. The peripheral sidewalls 1128, 1130, 1132, 1134 of the lower housing member may comprise bores 1136 therein adapted to threadingly accept screws or the like for attaching the upper housing member 1102 to the lower housing member 1104. The upper and lower housing members, when attached, define a generally parallelpiped-shaped cavity which may have a lateral dimension of 12.18 inches, longitudinal dimension of 8.68 inches, and a height of 2.18 inches.

As best illustrated in FIG. 4, the front housing member 1106 comprises a generally parallelepiped-shaped member having a front surface 1138, a rear surface (not shown), a top surface 1140, first lateral side surface 1142, and a second lateral side surface 1143, FIG. 5. The front housing member 1106 provides a cosmetic panel for the apparatus which is adapted to be positioned with its front surface 1138 in parallel alignment with the front surface of a forward housing wall 1144 of the associated storage and handling system 1011, FIG. 5. The front member has a height equal to the combined heights of the upper and lower housing members 1102, 1104, e.g. 1.57 inches. The front member has an opening 1146 extending therethrough which is identical in shape to the opening 1136 in the lower member forward wall and which is adapted to be positioned opposite thereto. This opening may be 6.02 inches by 0.72 inches. The front member 1138 may be secured to the front surfaces of the upper and lower members 1102, 1104 by conventional attachment means such as adhesive, screws or the like. The members 1102, 1104, 1106 may be constructed from a durable, high-strength plastic such as polycarbonate with 10% fiberglass and 10% PTFE fillers.

CARTRIDGE RECEIVING MEANS

As illustrated in FIG. 9, the insertion apparatus cartridge receiving means comprises an upper member 1150 and a lower member 1170 which are adapted to be attached to one another to define a cartridge receiving cavity 1154. The upper member 1150 comprises a generally flat, horizontal panel 1152 with a plurality of upstanding rib portions 1154, 1156, etc., and a plurality of downwardly extending rib portions 1158, 1160, etc., which are adapted to strengthen the central panel 1152. The upper member 1150 also comprises an upstanding stud member 1162 having an upper circular surface 1164 which is adapted to ride on a portion of track means 1060, as described in further detail below. The stud member 1162, in turn, has a post member 1166 centrally mounted thereon and extending upwardly therefrom which is adapted to extend through a groove 1200 in the upper housing member and which is also adapted to extend through an opening 1318 in latch means 1080, as described in further detail hereinafter. Stud 1162 may have a diameter of 0.49 inches and an axial length of 0.39 inches. Post 1166 may have a diameter of 0.24 inches and an axial length of 0.32 inches. Stud 1162 and post 1166 are laterally centrally positioned on the top member 1152 and are located at a longitudinal distance 1.15 inches rearwardly of the forward edge portion of member 1152. The upper member has a tapering forward edge surface 1168 which is adapted to facilitate the insertion of cartridges into the cartridge receiving means 1040. The receiving means lower member 1170 has a flat, generally rectangularly-shaped bottom panel 1172 having a tapered forward edge surface 1174 which is adapted to be positioned immediately below upper member tapered surface 1168. The lower member has an upstanding rear wall 1176 and two upstanding lateral sidewalls 1178, 1180. Rear wall 1176 has a mounting block 1182 integrally formed therewith which may have a pair of screw holes 1184 therein which are adapted to accept screws for enabling the attachment of a leaf spring 1186, FIGS. 12 and 14, thereto. The leaf spring 1186 projects into a cutout portion 1188 in sidewall 1178 and has a laterally projecting portion 1190, FIG. 13, thereon which is adapted to engage the rear sidewall recess 1019 of an optical disk 24 which is received in the receiving means 1040. The maximum spacing between the two sidewalls 1178, 1180, which may be, e.g., 5.33 inches, allows a cartridge 24 to be received in close-fitting, sliding relationship therebetween. A laterally outwardly projecting beveled portion 1192 comprises an outer surface 1194 which is positioned sufficiently close to wall 1180 to allow a cartridge to be urged into engagement with rear wall 1176 when the cartridge is positioned within the receiving means (tapered) rear-end-first. However, the surface 1194 is positioned sufficiently far away from wall 1180, e.g. 0.10 inches away, so as to prevent the cartridge 24 from moving past beveled portion 1192 if the cartridge is inserted improperly, i.e. (untapered) forward-end-first, into the receiving means, see FIG. 13. The forwardmost edge 1195 of portion 1192 may be located, e.g., 0.88 inches forwardly of rear wall 1176.

The lower member 1170 has a lower stud 1196, FIG. 11, projecting from the bottom thereof. The stud 1196 may have a diameter of 0.24 and an axial length of 0.15 and may be centrally laterally located on the lower member 1170 at a longitudinal distance of 2.33 inches from the forward edge of the lower member. Stud 1196 is adapted to be received in groove 1201 in the lower housing member, as described in further detail hereinafter.

The upper member 1150 is adapted to be attached to the lower member 1170 as by post members 1198, FIG. 9, or other conventional attachment means. In one preferred embodiment, the upper and lower members of the receiving means are constructed from material identical to that from which the housing means is constructed.

TRACK MEANS AND CATCH MEANS

As best illustrated in FIGS. 4, 5 and 7, the upper housing member 1102 top panel 1108 has a generally longitudinally extending groove 1200 which extends vertically entirely through the upper member 1102. The groove 1200 has a constant width, e.g. 0.25 inches, and is adapted to receive the receiving means top post member 1166 therethrough. The groove 1200 has a forward end 1202 and a rear end 1204. The forward end 1202 is laterally centered with respect to openings 1136, 1138 in the housing and is positioned approximately 0.31 inches rearwardly of the forwardmost edge of upper housing member 1102. The rear end 1204 is also laterally centered with respect to housing openings 1136, 1138 and is located 1.95 inches forwardly of an oppositely positioned portion of the rear edge of member 1102. The groove 1200 comprises a first straight portion 1206 which is positioned parallel housing axis AA. The groove 1200 comprises an arcuate second portion 1208 which begins approximately 1.63 inches rearwardly of the groove forward end 1202 and which has a radius of 1.58 inches. The groove has a straight third portion 1210 beginning approximately 2.39 inches rearwardly of front end point 1202 and which extends parallel to groove portion 1206. The centerline of groove 1206 may be positioned 0.39 inches laterally from the centerline of groove portion 1210. Groove 1200 comprises an arcuate fourth portion 1212 having a radius of 1.58 inches which begins 5.34 inches rearwardly of point 1202. Groove 1200 has a straight fifth portion 1214 which extends from a point approximately 6.09 inches rearwardly of point 1202 to rear end point 1204. Portion 1214 is aligned with portion 1206. As illustrated in FIG. 7, a recess 1220 is provided in the rear housing wall which circumscribes groove 1200 and which extends approximately 0.25 inches laterally outwardly from the outermost edges of the groove. The recess 1220 may be approximately 0.040 inches deep and is adapted to closely slidingly receive the receiving means stud member 1162 therewithin, FIGS. 7 and 16.

As best illustrated in FIGS. 4 and 5, the groove 1200 also lies within a recessed portion 1222 provided on the upper surface of upper housing member 1102. The upper recess 1222 is a generally rectangularly shaped recess extending from the forward end 1202 to the rear end 1204 of the groove. A raised portion 1224 which is intersected by the groove 1200 is provided within this upper recess 1222 and may provide a portion of the catch means 1082. A forward edge 1226 of this raised portion 1224 provides a forward catch surface, FIG. 15. The raised portion 1224 is provided with a tapered rear edge 1228 which is adapted to prevent engagement of latch means 1080 therewith. Immediately to the rear of the rearmost point 1204 of groove 1200 is a second raised portion 1228, which may provide a portion of catch means 1082. Raised portion 1228 has a rear edge 1230 which provides a rear catch surface, FIGS. 14 and 18. Second raised surface 1228 has a forward tapered surface 1232 which is adapted to prevent engagement of latch means 1080 therewith. The longitudinal dimension of forward raised portion 1224 may be, e.g., 1.12 inches, and the forward edge 1226 thereof may be positioned, e.g., 0.64 inches rearwardly of the forward end 1202 of groove 1200. Rear raised portion 1228 may have a longitudinal dimension of 0.35 inches. The rear edge 1230 thereof may be positioned approximately 0.25 inches from groove 1200 rear end point 1204. The forward and rear catch surfaces 1226, 1230 may each comprise a lateral dimension of 5.99 inches and may each have a height of 0.079 inches.

As illustrated in FIG. 8, the lower housing member 1104 has a groove 1201 therein which comprises a portion of the track means 1060. Lower groove 1201 has a forward end 1203 and a rear end 1205. Both ends 1201, 1205 are laterally centered relative openings 1136 and 1138. End 1203 is positioned 1.48 inches rearwardly of the forward edge of member 1104. Groove end 1205 is positioned 3.13 inches forwardly of the rear edge of member 1104. Groove 1201 comprises a straight first portion 1207 which extends parallel to axis AA. Groove 1201 has an arcuate second portion 1209 which begins 1.35 inches rearwardly of forward end point 1203 and which has a radius of 1.98 inches. Groove 1201 has an arcuate third portion 1211 which begins 2.63 inches rearwardly of point 1203 and which terminates at point 1205. Portions 1209 and 1211 intersect to form a generally V-shaped configuration having an apex 1213 which is positioned approximately 1.57 inches laterally of a line defined by front and rear end points 1203, 1205. Groove 1213 may have a depth of, e.g., 0.16 inches which is less than the total thickness of member 1104 which may be, e.g., 0.24 inches. Groove 1201 has a constant width of, e.g., 0.25 inches and is adapted to receive receiving means lower stud member 1196 in close sliding relationship therewith. The relative position of the upper groove 1200 with respect to the lower groove 1201 is shown in FIGS. 19-24.

ACTUATOR GUIDE MEANS

As best illustrated in FIGS. 4 and 5, actuator guide means 1070 may be integrally formed with the top surface of housing upper member 1102. The actuator guide means may comprise a first and second inverted-L-shaped longitudinally extending members 1240, 1242 which are adapted to longitudinally slidingly receive actuator follower portions 1244, 1246 therewithin for guiding the actuator means 1050 along a longitudinally extending path. The guide members 1240, 1242 may be integrally formed with the top housing member 1102.

ACTUATOR MEANS

As best illustrated in FIGS. 2-4, the actuator means 1050 may comprise a generally pan-shaped member having a rectangular central body portion 1250 and a longitudinally extending leg portion 1252. The actuator means has a top surface portion 1254, a bottom surface portion 1255 and a plurality of generally vertically extending lateral side surfaces 1256, 1258, 1260, 1264, 1266. Actuator follower members 1244, 1246 extend laterally outwardly, e.g. 0.17 inches, from lateral side surfaces 1258 and 1262, respectively. The follower members 1244, 1246 also extend a small distance downwardly, e.g. 0.039 inches, beyond bottom surface 1250 and provide raised surfaces 1268, 1270 which make sliding contact with the upper surface of the housing means 1030. The actuator means comprises a forward end 1272 and a rear end 1274. A nub member 1276 having a forward surface 1278 and a rear surface 1280 projects laterally outwardly from lateral side surface 1266 a distance of, e.g., 0.31 inches. The nub member 1276 is adapted to engage a vertically and longitudinally movable portion 1282 of a longitudinal displacement means 26. The e.f.l. apparatus 2010 may be constructed and arranged such that a nut portion 2222 thereof may be moved into abutting contact with nub forward surface 1278 for moving the actuator rearwardly. The nut portion 2222 may also be moved into abutting contact with stud rear surface 1280 for moving the actuator forwardly. The actuator means central body 1250 may have a lateral dimension, exclusive of the follower members 1244, 1246, of 2.95 inches and may comprise an axial length of 10.18 inches. The leg portion 1252 may comprise a length extending rearwardly from the central body portion 1250 of 7.71 inches and may comprise a lateral dimension exclusive of follower member 1244 of 0.87 inches. The actuator may have a height of 0.41 inches.

As best illustrated in FIG. 6, the actuator central body 1250 may have a generally rectangularly-shaped recess 1284 in the lower portion thereof having a depth of 0.36 inches, a dimension extending longitudinally of the actuator means of 1.24 inches, and a dimension extending laterally of the actuator means of 1.02 inches. Downwardly and inwardly projecting flange portions 1286, 1288, which are also illustrated in FIGS. 14–18, are positioned at the forward and rear edges of the recess 1284 and are adapted to capture a latch member 1290 and biasing member 1292 within a portion of recess 1284. Each of the flange members 1286, 1288 has a generally downwardly and inwardly extending surface portion 1294, 1296 which is adapted to abuttingly slidingly engage corresponding surfaces of the latch member. The flange portions 1286, 1288 have a downwardly extending dimension which is sufficiently small to enable the flanges to ride above the upper surface of the upper recess 1222 in the housing means upper member 1102 while the actuator follower portions 1244, 1246 ride on relatively raised surface portions 1298, 1299 of the housing means, FIGS. 4 and 5. The flange portion 1286, 1288 may extend, e.g., 0.060 inches downwardly from the bottom surface of actuator means central body portion 1250.

The actuator means may also include a latch attachment means which includes a stud 1302 which may have an axial length of, e.g., 0.10 inches and a diameter of 0.44 inches and a post 1304 which may have an axial length of 0.080 inches and a diameter of 0.24 inches. The stud and post may be integrally formed with the central body portion 1250 and are centrally positioned with respect to the flange portions 1286, 1288.

INSERTION APPARATUS LATCH MEANS

As best illustrated in FIGS. 6 and 16, insertion apparatus latch means 1080 may comprise a latching member 1290 and a biasing member 1292. The latching member may comprise a central body portion 1310 having a generally planar top surface 1312 and a bottom surface including a forward, downwardly and rearwardly beveled surface 1314 and a rear downwardly and forwardly beveled surface 1316. The angle of inclination of each of the beveled surfaces 1314, 1316 relative the planar top surface 1312 may be, e.g., 17.0°. The central body portion 1310 has a central slot 1318 extending vertically therethrough which may comprise a dimension measured longitudinally of the actuator means of 0.25 inches and which may comprise a slot length extending transversely of the actuator means of 0.68 inches. Slot 1318 defines a forward wall surface 1320 and a rear wall surface 1321 which are adapted to alternately engage the receiving means post portion 1162 for producing relative deflecting movement of the latch member, as described in further detail below. The latch member comprises a forward catch portion 1322 and a rear catch portion 1324 which may be integrally formed with the central body portion 1310. The forward latch portion 1322 comprises a forward latching surface 1326 which extends generally perpendicularly to top surface 1312, FIG. 14. The forward latch portion 1322 also comprises a forward beveled surface 1328 which may extend at approximately 45° to top surface 1312. The rear latch portion 1324 may comprise a rear latching surface 1330 and a rear beveled surface 1332 which may be of generally identical size and shape and positioned in mirror-image relationship with the forward latching surface 1326 and forward beveled surface 1328. The forward latch portion 1322 and the rear latch portion 1324 may each project downwardly from the central body portion a distance of, e.g., 0.080 inches from an associated connected portion of the central body beveled surface 1314 or 1316. The overall length of the latch member measured longitudinally of the actuator means may be 1.13 inches, the maximum thickness of the central body portion may be 0.24 inches, the distance between the forward and rear latching surface 1326 and 1330 may be, e.g., 0.76 inches, and the lateral dimension of the latch member may be, e.g., 1.02 inches. The latching member may be constructed from acetel, which is commercially available under the trade name Delrin.

Biasing member 1292 is illustrated in FIGS. 6 and 14–17. The biasing member 1292 may have a laterally dimension approximately equal to that of the latching member 1290 and may comprise a central body portion 1340 which may have a longitudinal dimension of 0.85 inches, a forward wing portion 1342 and a rear wing portion 1344 which each extend downwardly and outwardly from the central body portion at an angle of approximately 40°. Each of the wing portions may have a longitudinally and upwardly extending dimension of 0.32 inches. The biasing means also comprises front and rear flange portions 1346, 1348 extending downwardly and outwardly from associated wing portions 1342, 1344. The front and rear flange portions may each be inclined at approximately 90° from the associated wing portion and may each comprise a longitudinally and downwardly extending dimension of approximately 0.080 inches. Central body portion 1340 may have a centrally positioned bore 1350 extending therethrough which is adapted to receive actuator post member 1304 therethrough. The captured fit of the latch member and biasing member within the actuator means recess 1284 causes the biasing member 1292 to be urged against the annular terminal end surface 1303 of the actuator stud member 1302.

As illustrated in FIG. 14, when the latching member 1290 and biasing member 1292 are assembled within the recess 1284 of the actuator means, the latch means forward and rear beveled surface 1328, 1332 are urged downwardly against the tapered inner surfaces 1294, 1296 of the actuator flange portions 1286, 1288. The flange surfaces 1294, 1296 slope in a direction generally parallel to the slope of the latch member forward and rear beveled surfaces 1328, 1332, respectively, enabling relative shifting, pivotal movement of the latching member 1290. FIG. 14 illustrates the position which the latch member 1290 occupies when no external force is exerted thereon. As illustrated in FIG. 15, when the actuator is moved relative forwardly from the position illustrated in FIG. 14, the latch member forward portion 1322 rides up and over the beveled rear surface 1227 of the forward raised portion 1224, causing the forward latch portion 1322 to be relatively elevated and the rear latch portion 1324 to be moved relatively downwardly. As illustrated in FIG. 16, as forward pressure applied to the actuator causes continued forward 62 movement of the latch assembly, the latch forward portion, after passing the forward latching surface 1226, moves downwardly to a position where the latch bottom surface 1314 is located in abutting relationship with the top surface of raised portion 1224 and the forward latching surface 1326 is located adjacent catch surface 1226. In the latch position shown in FIG. 16, relative rearward pressure applied to the receiving means 1040 causes post portion 1162 thereof to engage the latch slot rear surface 1322, producing relative counterclockwise rotation of the latch member which tends to urge the forward latch portion 1322 downwardly to maintain latching engagement with surface 1226. As further illustrated in FIG. 17, if the actuator 1050, rather than the receiving means 1040, is urged rearwardly 64, the receiving means post member 1162 is urged against the latch member slot forward wall surface 1320 causing the latch to be pivotally displaced and elevating the forward latch portion 1322, enabling it to pass over forward catch surface 1226. As illustrated in FIG. 18, the same general sequence of event occurs in reverse when the rear latch portion 1324 encounters the rear raised portion 1228. The beveled surface 1332 rides up and over beveled surface 1232 as the latch moves rearwardly, enabling the rear latching portion 1324 to move into the latched position illustrated in solid lines in FIG. 18. When forward 62 force is applied to the receiving means, the receiving means post portion 1162 engages the forward wall 1320 of the latch means slot and urges the rear latching portion 1324 downwardly. However, when forward pressure is released upon the receiving means 1040 and forward pressure is applied instead to the actuator means 1050, the receiving means post 1162 is urged against the rear wall 1322 of the latch slot and the latch member is caused to pivot counterclockwise, urging the rear latch portion 1324 upwardly and the forward latch portion 1322 downwardly to the position illustrated in phantom, thus causing the latch means to be placed in disengaged relationship with the catch means and enabling relative forward movement of the actuator means 1050 and receiving means 1040.

INSERTION MEANS OPERATION

The optical disk cartridge insertion apparatus 1010 has a first operating position, FIGS. 3 and 19, for receiving an optical disk from a human operator. In this first operating position, the receiving means 1040 is positioned with post members 1162 and 1196 thereof in the forwardmost positions within their respective grooves 1200, 1201 in the housing means 1030, FIG. 19. In this position, the forward end portion 1042 of the receiving means is positioned in flush relationship with the front surface 1138 of the housing means front member 1106 and the longitudinal axis BB of the receiving means is positioned parallel to the longitudinal axis AA of the housing means 1030. When the cartridge inserted by the operator, FIG. 4, is fully inserted into the receiving means 1030, a forward portion of the cartridge 24, e.g. 0.87 inches, projects outwardly from the forward surface 1032 of the housing means.

Next, as illustrated in FIG. 20, further rearward 64 hand-pressure exerted against the cartridge 24 by the operator causes the cartridge and the cartridge receiving means to move rearwardly until the latch means 1080 forward latching surface 1326 engages forward catch surface 1226. In this position, the receiving means longitudinal axis remains in parallel alignment with the housing means longitudinal axis, and the forward end 1016 of the cartridge is positioned in flush relationship with the forward end 1032 of the housing means. The engagement of catch surface 1226 by the latch means 1080 provides a stopping force which alerts the operator to the fact that hand-insertion of the cartridge is completed.

Figure 21:
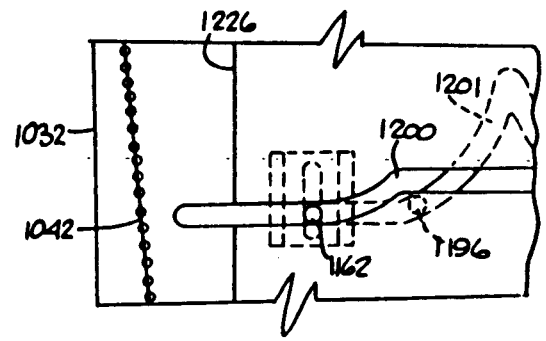

Next, a portion 2222 of longitudinal displacement means 26 in the e.f.l. apparatus 2010 engages a forward surface 1278 of actuator nub 1276 and begins to move the actuator means 1050 rearwardly. The relative movement of the actuator means 1050 relative the receiving means 1040 causes the latch means 1080 to be moved from the latching position illustrated in FIG. 16 to the unlatched position illustrated in FIG. 17. Thereafter, further rearward displacement of the actuator means causes the receiving means post portions 1162 and 1196 to be moved rearwardly in their respective paths 1200, 1201. As post means 1196 enters the arcuate portion of path 1201, the receiving means and cartridge received therein begins to rotate, as illustrated in FIG. 21.

Figure 22:
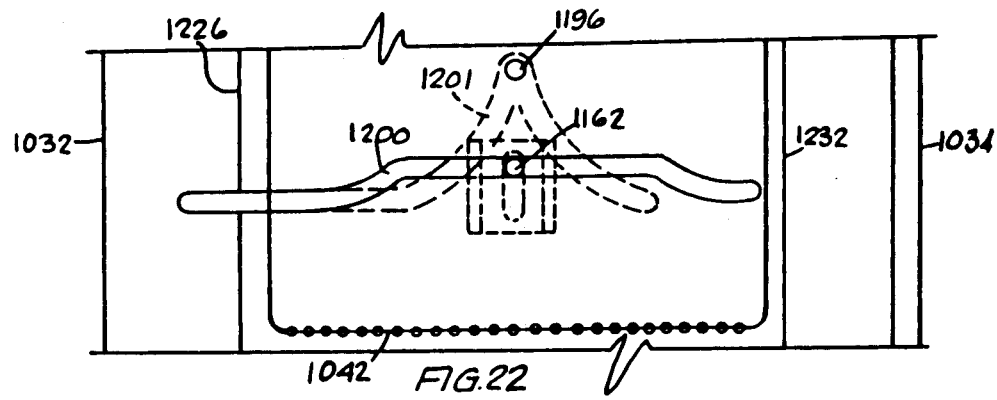
Figure 23:
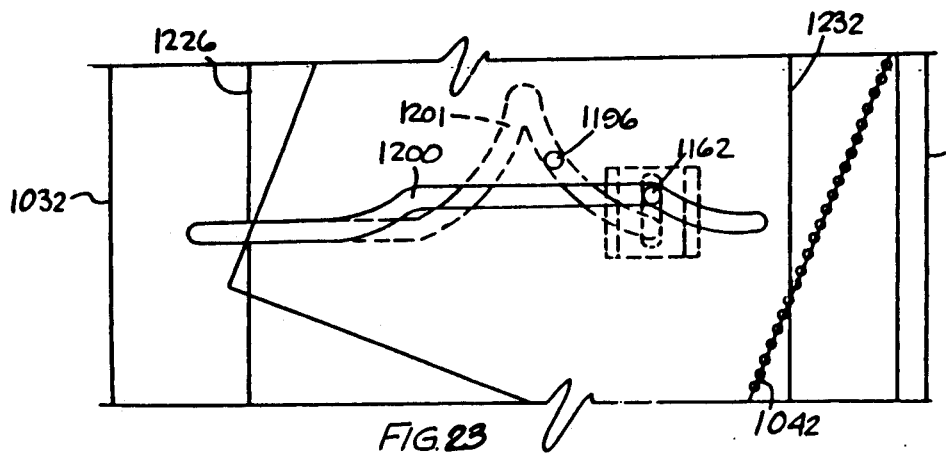

Further rearward displacement of the actuator means 1050 causes the receiving means and cartridge 24 to be further rotated in a counterclockwise direction, as illustrated in FIGS. 22 and 23. Finally, as illustrated in FIG. 24, further rearward displacement of the actuator means causes the receiving means and cartridge received to reach their furthest rearward position within their respective housing grooves 1200, 1201. At this point, the cartridge has been rotated a full 180° from its original insertion orientation.

As also illustrated in FIG. 24 and in solid lines in FIG. 18, when the cartridge receiving means is in its most rearward position, the rear latching surface 1330 is positioned so as to be engaged with the rear catch surface 1232. So long as no forwardly-directed force is applied to the actuator means, the latch means remains in the latched position shown in solid lines in FIG. 18. In this position, the forward end 1016 of the cartridge 24 is positioned in flush relationship with the bottom rear edge surface 1131 of the lower housing member 1104. The recess provided in the upper housing rear wall 1116 immediately above the housing rear opening 1138 and the corner recesses 1120, 1118 provided in the housing upper portion enables the cartridge engaging means 22 to be urged into engagement with the rear end portion 1016 of cartridge 24 for engaging the cartridge. The latching engagement of the latch means 1080 with the rear catch surface 1230 prevents the cartridge 24 from being moved forwardly during this engagement with the cartridge engaging means 22. Engaging means 22 engages the cartridge 24 and it is moved rearwardly until the cartridge 24 is fully removed from the insertion apparatus 1010. Thereafter, the e.f.l. apparatus 2010 is moved longitudinally and/or laterally to position the cartridge in alignment with a storage location 1020 or reading device 1015 as described in detail below. Thereafter, the engaging means 22 moves forwardly to insert the cartridge into the selected storage location or reading device as described in detail below.

In order to return the receiving means 1040 to a position for receiving the next hand-inserted cartridge, the e.f.l. apparatus 2010 is moved to a position whereat nut portion 2222 of the longitudinal displacement means 26 is in engagement with the rear surface 1280 of actuator nub 1276. The longitudinal displacement means 26 is then moved forwardly, causing the latch means 1080 to be moved from the position illustrated in solid lines to the position illustrated in phantom lines in FIG. 18, producing disengagement of the latch means with rear latch surface 1230. Thereafter, forward movement of the actuator means 1050 causes the receiving means to rotate back through the positions illustrated in FIGS. 23, 22, 21 and 20 until finally returning to the full forward position illustrated in FIG. 19, where it is again ready to receive a hand-inserted cartridge 24. It will also be appreciated that this same return sequence of operations may be used for removing a cartridge 24 from the optical disk storage and handling system 1010, in which case e.f.l. apparatus 2010 inserts a cartridge into the receiving means when it is in its rearwardmost position prior to urging the actuator means 1050 forwardly.

III. THE e.f.l. APPARATUS

FIGS. 25 and 26 illustrate an optical disk cartridge handling system subassembly used for engaging an optical disk cartridge 24 and for producing controlled linear and rotational displacement of an optical disk cartridge 24 which is received in the apparatus. The subassembly 2010 may be referred to herein as the engaging, flipping and longitudinally displacing apparatus or e.f.l. apparatus 2010.

The apparatus 2010 comprises a laterally displaceable carriage means 30, such as base block 2015, FIG. 26, for supporting various components of the apparatus 2010. Structure which enables lateral displacement of carriage means 30 is described in detail in Section V below.

A flipping means 28, such as sleeve assembly 2017, FIG. 25, is provided which guides the longitudinal movement of an optical disk cartridge engaging means 22 and which produces flipping rotation of a cartridge engaged by the engaging means. The flipping means has a forward end 2020, a rear end 2022 and a central longitudinal axis DD extending between the forward end and rear end. The flipping means 28 is rotatable in a first direction 2024 and a second direction 2026 about central longitudinal axis DD.

A shaft means 2030 rotatably mounts the flipping means 28 on the base means 2014, FIG. 26. The shaft means, which may comprise a cylindrical steel shaft 2031, has a forward end 2032 fixedly attached to the rear end 2022 of the flipping means 28, FIG. 30. The shaft means has a second end 2034, FIG. 26, which is rotatably received in the base block 2015. The shaft means 2030 has a central longitudinal axis EE which extends in coaxial relationship with the central longitudinal axis DD of the flipping means 28. Thus, the flipping means 28 is rotatable about the central longitudinal axis DD thereof through the rotation of the shaft means 2030 about its central longitudinal axis EE.

The optical disk handling apparatus 2010 includes an optical disk engaging means 22 for engaging an optical disk cartridge 24 and holding the cartridge in relatively stationary relationship therewith. The optical disk engaging means 22 is received in the flipping means 28 in linearly displaceable, rotationally nondisplaceable relationship therewith. The optical disk engaging means 22 is linearly displaceable in a forward direction 62 and in a rearward direction 64 with respect to the flipping means 28.

A first rotatable drive means 32, such as electric motor 2051, FIG. 55, provides reversible driving torque to a transmission means 2052, FIG. 25.

A longitudinal displacement means 26, such as worm drive assembly 55, is provided for producing relative longitudinal displacement between the flipping means 28 and the engaging means 22 in response to torque applied thereto.

The apparatus 2010 includes a transmission means 2052, such as gear assembly 2053, for transmitting torque from the drive means 32 for producing rotational displacement of the flipping means 28 and linear displacement of the holding means 22. The transmission means has a first operating mode, FIG. 38, wherein torque applied thereto by the drive means 32 in a first torque direction 2056, FIG. 25, is transmitted to the flipping means for rotating the flipping means 28 and the holding means 22 in the first direction of rotation 2024 about the central longitudinal axis DD of the flipping means. The transmission means 2052 has a second operating mode, FIG. 39, wherein torque applied thereto by the drive means 32 in a second torque direction 2058, FIG. 25, is transmitted to the longitudinal displacement means 26 for producing forward 62 linear displacement of the engaging means 22 relative the flipping means 28. The transmission means 2052 has a third operating mode, FIG. 40, wherein torque applied thereto by the drive means in the first torque direction 2056 is transmitted to the longitudinal displacement means 26 for producing rearward 64 linear displacement of the engaging means 22 relative the flipping means 28.

Projection means 68, FIGS. 25 and 27, 30 and 31, are provided which project rearwardly from the flipping means rear end 2022 for coacting with a flip latch means 36.

The projection means 2068 are moved through a circular travel path 2072, FIGS. 32–34, by rotation of the flipping means 28.

Figure 30:
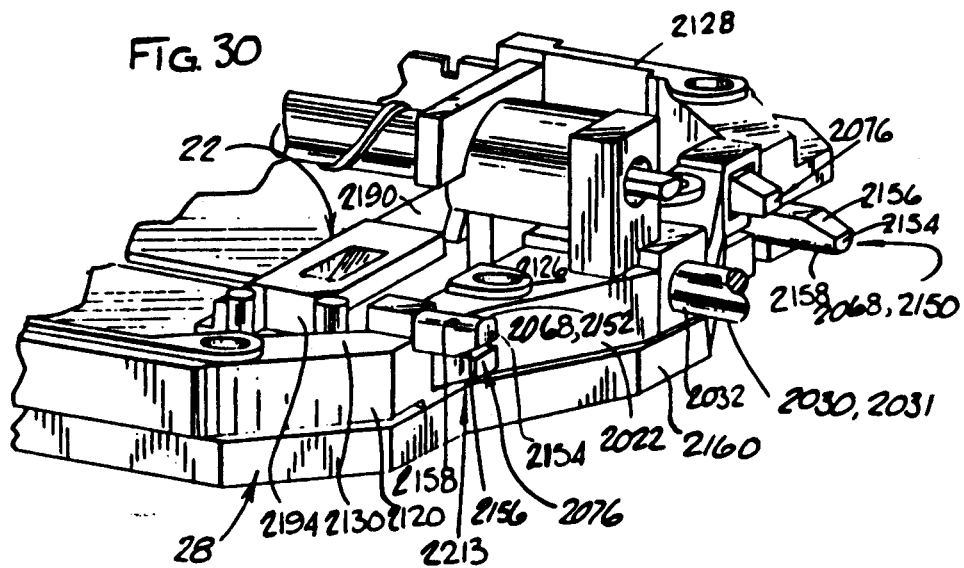
FIG. 30 is a detail view of a portion of an e.f.l. apparatus showing an optical disk cartridge engaging assembly in a rearwardmost position.
Figure 31:
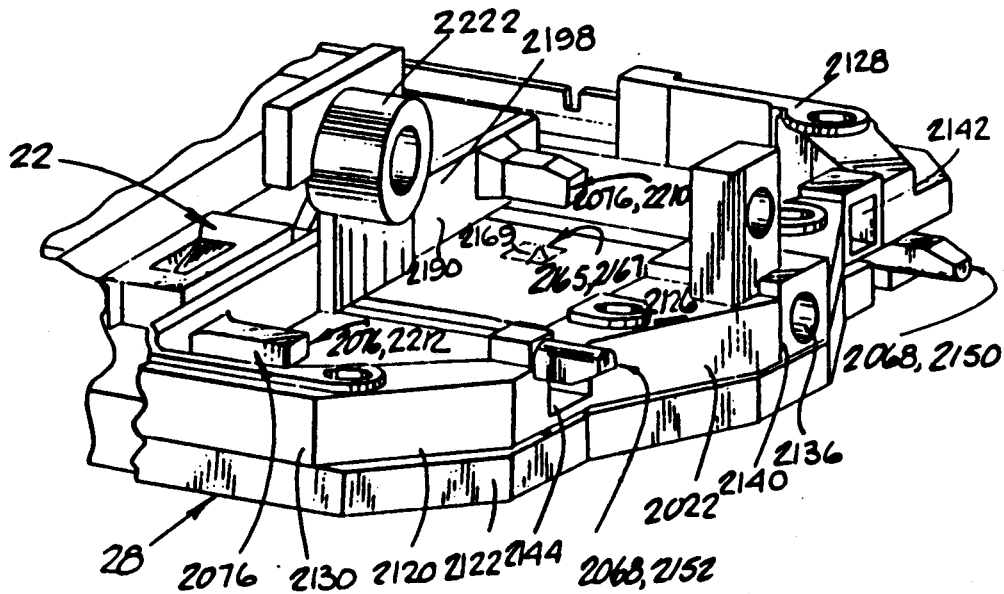
FIG. 31 is a detail view of a portion of an e.f.l. apparatus showing an optical disk cartridge engaging assembly in a forwardly displaced position.

The apparatus 2010 comprises plunger means 2076, FIGS. 30 and 31, which are operatively associated with the optical disk engaging means 22 and which are projectable relative the rear end 2022 of the flipping means 28 for coacting with the flip latch means 36. Plunger means 2076 are located in a rearwardmost extended position and move along a circular travel path 2077, FIGS. 32–34, during rotation of the flipping means. The plunger means 2076 have a rearwardly extended position, FIG. 30, and a forwardly retracted position, FIG. 31.

The apparatus comprises a flip latch means 36, FIG. 26, mounted on the base block 2015 for engaging the projection means 2068 during rotation of the flipping means 28 in the first direction of rotation 2024 for terminating rotation of the flipping means and for restraining the flipping means from further rotation in the first direction 2024 and the second direction 2026, FIGS. 32–34. The flip latch means 36 also is adapted to coact with the plunger means 2076 for disengaging the projection means 2072 from the flip latch means 36, FIG. 37, for enabling rotation of the flipping means 28 in the first direction of rotation 2024.

The apparatus 2010 also includes stop means 34 operatively associated with the engaging means 22 for restraining linear displacement of the engaging means 22 relative to the flipping means 28.

The e.f.l. apparatus 2010 may also comprise displacement-sensitive control means 2080 for terminating driving torque and for reversing the direction of driving torque provided by the drive means 32 in response to the drive means completing a predetermined angular displacement associated with a predetermined amount of angular displacement of the flipping means and/or linear displacement of the engaging means. This predetermined displacement, which causes termination and reversal of the direction of driving torque, may be programmed to coincide with the engagement of the projection means 2068 with the flip latch means 36 and also with the engagement of the engaging means 22 with the stop means 34.

Having thus described the e.f.l. apparatus 2010 in general, various features thereof will now be more full described.

BASE BLOCK

As illustrated in FIG. 26, base block 2015, sometimes referred to herein as carriage means 30 or lateral displacement means 30, may comprise a forward portion 3030 and rear portion 3032 and having a central longitudinal bore 2106 extending therethrough. The central bore 2106 may be adapted to accept a bearing assembly 2108 therein for enabling rotatable mounting of shaft means 2030 within bore 2106. Bearing assembly 2108 may be a conventional ball bearing assembly having an outer portion (not shown) which is adapted to engage the surface of central bore 2106 in tight-fitting, non-movable relationship therewith. The bearing assembly has an inner portion 2112 which is rotatably movable with respect to the outer portion. The inner portion is adapted to tightly engage the outer surface of the end portion 2032 of shaft 2030 and hold it in radially and circumferentially non-movable relationship therewith such that the shaft 2030 is freely rotatable relative the block 2015. The base block 2015 may also comprise a bracket assembly 2114 which is mounted on the forward portion 2102 of block 2015 and which is adapted to support various components of the flip latch means 36 as described in further detail hereinafter.

FLIPPING MEANS AND PROJECTION MEANS

Flipping means 28 is adapted for receiving a cartridge engaging means 22 therein and for limiting the direction of movement of the engaging means to a forward direction 62 and a rearward direction 64. The flipping means, in one preferred embodiment, comprises a sleeve assembly 2017 which is constructed from a yoke member 2120, a lower, generally L-shaped member 2122, and an upper, generally L-shaped member 2124 which in one preferred embodiment is identical to member 2122. As illustrated in FIGS. 25 and 27-31, the yoke member 2120 is an elongate generally radially extending member having a radially extending central body portion 2126 and a two radially outwardly and forwardly projecting arm portions 2128, 2130 which are integrally formed with the central body portion 2126. The yoke member has a generally flat top surface 2132, FIG. 29, and a generally flat bottom surface 2134, FIG. 27. The yoke central body portion has a centrally located circular bore 2136 extending between a planar forward wall portion 2138 and a planar rear wall portion 2140 thereof, FIGS. 27 and 31. Circular bore 2136 has a central longitudinal axis FF which is adapted to be positioned coaxially with shaft axis EE. Bore s136 is adapted to receive a forward end portion 2032 of shaft 2030 in fixed relationship therewithin, i.e., shaft 2030 is not rotatable within bore 2136.

The yoke central body portion 2126 has a pair of radially outwardly positioned bores 2142, 2144 extending axially therethrough, FIGS. 29 and 31. The axial dimension of each bore may be, e.g., 0.3 inches. In one preferred embodiment, these bores each have identical square cross-sectional configurations which may be, e.g., 0.3 inches on each side. The bores 2142, 2144 are positioned in diametrically opposite relationship with one another and are each located at the same radial distance, e.g. 1.7 inches, from the center line of bore 2136. Bores 2142, 2144 are adapted to enable plunger means 2076 to move axially therethrough as discussed in further detail below.

The yoke central body portion has a worm drive mounting stud 2146 integrally formed therewith and projecting upwardly from the upper surface 2132 thereof. The worm drive mounting stud has a circular bore 2148 extending therethrough which has a central longitudinal axis GG positioned parallel to the central body circular bore axis FF. Axis GG may be both vertically and laterally displaced from axis FF, e.g. vertically displaced 0.7 inches and axially displaced 0.2 inches.

Projection means 2068 are fixedly mounted at opposite ends of the yoke central body portion 2126 and project axially rearwardly therefrom. The projection means 28 include a first projection member 2150 positioned near bore 2142 and a second projection member 2152 positioned near bore 2144, FIGS. 25 and 27-31. The projection members 2150, 2152 are positioned diametrically oppositely relative central bore axis FF with projection member 2150 being positioned below bore 2142 and projection member 2152 positioned above bore 2144. Each projection member 2150, 2152 extends axially rearwardly the same distance, e.g. 0.4 inches, from the rear surface of the yoke upon which it is mounted. Each of the axially extending members 2150, 2152 may terminate in a flat radially extending surface 2154, FIG. 30. Each projection member 2150, 2152 comprises an axially and transversely extending, planar, tapering surface 2156, FIGS. 30, 32 and 35, which is adapted to make initial contact with the flip latch means 36 during rotation of the flipping means in rotation direction 2024. Each projection member 2150, 2152 also has a rounded surface 2158 which is adapted to be engaged by the flip latch means 36 to prevent rotation of the flipping means in direction 2026. The projection members 2150, 2152 are fixedly attached to the yoke member and may be integrally formed therewith. The projection members are equally radially displaced, e.g., 2.0 inches from the central longitudinal axis DD of the flipping means, and are adapted to make contact with predetermined portions of the flip means as described in further detail below.

As illustrated in FIG. 25, lower L-shaped member 2122 is fixedly attached at a rear portion 2160 thereof to the flat bottom surface 2134, FIG. 27, of the yoke member 2120 by conventional attachment means such as attachment screws (not shown). The lower member 2122 may comprise a generally flat longitudinally and laterally extending main body portion 2162 and upwardly projecting left peripheral lip portion 3144 and an upwardly projecting right side wall portion 3142. As shown by FIG. 31, a detent means 2165 such as an upwardly biased, downwardly deflectable spring metal member 2167 having an upwardly projecting rounded portion 2169 is mounted above a recessed portion on the upper surface of the main body portion. The rounded portion 2169 is adapted to engage a hole (not shown) in a bottom surface of the engaging means to provide a detent force which resist forward movement of the engaging means from its rearwardmost location, as described in further detail below.

Upper L-shaped member 2124 comprises a rear end portion (not shown) which is fixedly attached to the upper surface portion of the yoke member 2120. The upper member 2164 comprises a flat main body portion 2170 which is adapted to be positioned immediately above the lower member main body portion 2162. The lower member 2124 also comprises downwardly extending rib and side wall portions 2172, 2174. The upper and lower members 2122, 2124 may be fixedly attached to one another and to the yoke member as by attachment screws (not shown) to define a longitudinally extending cavity 2178 having a rectangular cross-section which conforms generally to the rectangular cross-sectional shape of an optical disk cartridge 24. The cavity extends from the forward wall portion 2138 of the yoke member to a rear rectangular opening defined by the forward edges 2180, 2182 of the upper and lower channel members. In one preferred embodiment, the distance between yoke forward surface 2134 and the forward edge surfaces 2180, 2182 of the channel members is approximately 0.25 inches greater than the combined axial length of the optical disk holding means 22 and the optical disk 24. The upper L-shaped member 2124 has a worm drive mounting projection 2184 fixedly attached thereto and projecting upwardly from the top surface portion 2186 thereof. The worm drive's support block 2184 has a bore 2185 extending therethrough having a central longitudinal axis HH which is coaxial with axis GG extending through the worm drive mounting stud 2146. The upper member main body portion 2170 has a longitudinally extending opening 2188 therein which enables longitudinal displacement of a worm drive slide member 2222 as discussed in further detail below. The upper and lower members comprise channels therein which are adapted to guide and actuate the engaging means as described in detail below with reference to FIGS. 41-53.

CARTRIDGE ENGAGING MEANS AND PLUNGER MEANS

As illustrated in FIGS. 25, 30 and 31, the optical disk engaging means 22, in general, comprises a transversely extending central body member 3040 and a pair of pivotally movable, latching finger members 3072, 3074 which are mounted at the terminal ends of the central body member 3040. The finger members are adapted to be moved into and out of engagement with notch portions 1027, 1029 of optical disk cartridge 24. When the finger members are engaged with notch portions, the optical disk cartridge is held in fixed relationship with respect to the engaging means 22 such that linear movement of the engaging means 22 will be accompanied by a corresponding linear movement of the optical disk cartridge 24. When the finger members are disengaged from notch portions 1027, 1029, the optical disk cartridge is released from the engaging means. In operation, the engaging means is adapted to move forwardly and rearwardly within the holding means cavity 2178. The engaging means may move to a forwardmost position, indicated by the position of member 2222 shown in phantom in FIG. 25, whereat the finger members thereof project outwardly from the forward opening of the cavity (not shown) to enable the engaging means to engage the rear end portion of a cartridge which is positioned next adjacent to the flipping means 28 forward end portion. After cartridge engagement, the engaging means may move rearwardly in direction 64 to the position illustrated in FIG. 25 whereat 1 rear wall surface 2198 of the engaging means, FIG. 31, in one embodiment is positioned in abutting contact with the yoke member forward wall portion 2138.

The engaging means may comprise a detent engaging hole (not shown) on a lower surface portion thereof which is adapted to releasably engage flipping means detent means 165 as further described below. Further features of the engaging means which enable passive engagement and release of cartridges are described in detail hereinafter.

As illustrated in FIGS. 30 and 31, the engaging means 22 has plunger means 2076 mounted thereon comprising a first plunger member 2210 which may be, e.g., 0.52 inches in length, and a second plunger member 2212 of identical axial length. The plunger members 2210, 2212 are fixedly attached to the rear wall surface 2198 of the optical disk holding means and are adapted to pass through rectangular bores 2142, 2144, respectively, in the flipping means yoke member 2120. As illustrated by FIG. 30, when the engaging means 22 has moved as far rearwardly as the yoke member will allow, the plunger members 2210, 2212 project rearwardly from the rear surface of the yoke member. In one preferred embodiment, the plunger members 2210, 2212 project 0.19 inches rearwardly from the rear face surface of the yoke member which circumscribes an associated bore 2142 or 2144.

The plunger members each comprise an axial end surface 2213, FIGS. 30 and 36, which is adapted to axially engage a portion of the flip latch means so as to trip the flip latch means to cause disengagement of the projection means as described in further detail hereinafter. Each plunger member 2210, 2212 also comprises an axially extending surface 2216, FIGS. 36 and 37, which is adapted to engage an axially extending surface of the flip latch means to produce nontripping, yielding deflection of a portion of the latch means during a period of initial engagement of the latch means and the projection means as described in further detail below.

FIRST DRIVE MEANS AND FORCE-SENSITIVE CONTROL MEANS

First rotational drive means 32 may comprise a conventional, reversible polarity electrical motor 2051 such as, for example, that sold under the model designation Series 14000 DC Servo Motor manufactured by Pittman Corporation of Harleysville, Pa., 19438-0003. The drive motor is preferably mounted on a non-movable support surface 2216 as by bolts or other conventional attachment means. The drive means comprises a rotatable drive shaft 2218 which provides the torque used to both flip and to linearly displace the optical disk cartridge 24 engaged by the engaging means.

The displacement-sensitive control means 2080 may comprise a conventional motor rotation sensing device, referred to in the art, such as that sold under the product designation HEDS-5500 Encoder which is manufactured by Hewlett-Packard Company having a business address of 3003 Scott Blvd., Santa Clara, Calif., 95054. The drive means 32 electrical motor produces a predetermined number of encoder pulses per revolution, e.g. 2000 pulses per revolution. The number of motor revolutions required to produce a predetermined amount of rotation displacement, e.g. 180° of displacement of the guide means are determined experimentally. The number of encoder pulses required to produce this predetermined amount of guide means rotation are thus calculated and used by control software in a microcomputer controller 2219 to determine when the motor operation is to be terminated and reversed. The number of motor rotations associated with a predetermined amount of linear displacement of the holding means is also determined experimentally. From this motor revolution value a corresponding encoder displacement value is calculated which is also used by the control software to terminate and reverse motor operation. Thus, after the counting of a predetermined number of encoder pulses associated with a particular operating phase of the apparatus, the control means 2080 sends an appropriate control signal to a conventional motor switching assembly 2081 which terminates operation of the motor and also reverses polarity of the motor such that when the motor is restarted, it will rotate in the direction opposite to that in which it was previously rotating. Another signal may be provided to switching assembly 2081 to start operation of the motor in the new direction. Such a signal may be provided by a human operator or may be provided by a controller unit 2219.

LONGITUDINAL DISPLACEMENT MEANS AND STOP MEANS

As illustrated by FIG. 25, the longitudinal displacement means 26 for producing relative longitudinal displacement between the flipping means 28 and the engaging means 22 may comprise a worm drive screw 2220 having a rear end portion 2221 rotatably mounted in mounting stud 146 and a forward end portion 2223 rotatably mounted in support block 2184. A screwingly driven nut member 2222 is threadably mounted on the worm drive screw 2220 and is relatively forwardly movable therealong through rotation of screw 2220 in a first screw rotation direction 2224 and is rearwardly movable therealong through rotation of the screw 2220 in a second rotation direction 2226. The screwingly driven member 2222 is fixedly attached to an upper portion of the optical disk engaging means 22. Thus, the optical disk engaging means is linearly forwardly displaceable within the flipping means through rotation of worm drive screw 2220 in first screw direction 2224 and is linearly rearwardly displaceable through rotation of screw 2220 in second screw direction 2226.

The stop means 34 which restrains the longitudinal displacement of the engaging means 22 may comprise the mounting stud 2146 and the mounting block 2184 which limits the linear displacement of the screwingly driven member 2222. Alternately, the worm drive unit may be constructed and arranged such that the engaging means comes into contact with the front wall surface 2138 of the yoke member prior to contact of the driven member 2222 with stud member 2146 in which case surface 2138 may act as a stop means 36. Similarly, the construction and arrangement of a storage unit from which an optical disk cartridge 24 is to be retrieved, may be such that the engaging means 28 will be stopped in its forward movement by engagement with an optical disk cartridge 24 before screwingly driven member 2222 comes into contact with block 2184 in which case the optical disk and its storage unit will act as a linear movement stop means.

TRANSMISSION MEANS

As best illustrated in FIGS. 25 and 38–40, the transmission means 2052 comprises a first shaft gear member 2230 which is received on shaft 2030 in coaxial relationship with axis DD thereof and which is freely rotatable with respect to shaft 2030. The first shaft gear member 2230 is drivingly linked as by drive belt 2232 and motor gear 2234 to the drive shaft 2218 of the drive means. The transmission means includes a second shaft gear 2236 which is freely rotatably received on shaft 2030 in coaxial relationship therewith and which is connected to first shaft gear member 2230 as by weldament, or other conventional attachment means, such that rotation of first shaft gear member 2230 produces corresponding rotation of second shaft gear member 2236. Second shaft gear member 2236 may be a toothed gear member. The transmission means also includes a worm drive gear member 2238 which is fixedly mounted on an end portion of worm drive screw 2220 such that rotation of gear member 2236 produces opposite rotation of gear member 2238 and worm screw 2220. Worm drive gear member 2238 may also be a toothed gear member. The gear ratio between gears 2236 and 2238 may be 32 to 15. Second shaft gear member 2236 and worm drive gear member 2238 are constructed and arranged such that the two gear members are continuously engaged with one another. As illustrated in FIG. 38, in a first mode of operation in which torque from the first drive means is provided in first torque direction 2056 and in which the worm drive screw is prevented from rotating in direction 2226, rotation of first shaft gear member 2230 by the drive belt produces corresponding rotation of second shaft gear member 2236 in rotation direction 2240 which causes worm drive gear member 2238 to be orbitally displaced about shaft axis EE in orbital direction 2242. The orbital motion of the worm drive gear member 2238 causes corresponding rotation of the flipping means 28 and shaft 2030 about their central longitudinal axes DD, EE in direction 2024.

As illustrated in FIG. 39, when the worm drive screw 2220 is free to rotate in direction 2224 (with corresponding forward movement of the holding means) and when the flipping means 28 is prevented from rotating about its axis EE, then rotational movement of first shaft gear 2230 produced by a torque in second torque direction 2058 causes corresponding rotation of second shaft gear 2236 in direction 2244 which, in turn, causes worm drive gear member 2238 to rotate in direction 2224 about its central longitudinal axis GG with corresponding rotation of worm drive screw 220 and forward movement of holding means 22.

As illustrated in FIG. 40, when the worm drive screw 2220 is freely rotatable in direction 2226 and when the flipping means is prevented from rotating in direction 2024 and when a drive torque is applied in direction 2056 to first shaft gear member 2230, second shaft gear member 2236 rotates in direction 2242 causing worm drive gear member 2238 to rotate about its central longitudinal axis in rotation direction 2226 with corresponding rotation of worm drive screw 2220 which causes the engaging means to be moved rearwardly.

FLIP LATCH MEANS

As best illustrated by FIG. 26, flip latch means 36 comprise a first deflectable member means 2250. Member means 2250 is adapted for engaging the projection means 2068 during rotation of the flipping means 28 in a first direction 2024 for terminating the rotation in the first direction 2024 and for restraining further rotation of the flipping means in the first rotation direction 2024. The first deflectable member means 2250 comprises a first surface portion 2252 which is adapted to engage the projection means 2068. The first deflectable member means has a first operating position as shown in FIGS. 26 and 32-36 wherein the first surface portion is positioned in intersecting relationship with the circular travel path 2072 of the projection means 2068. As illustrated in FIG. 37, the first deflectable member means has a second operating position wherein the first surface portion 2252 is positioned in displaced relationship with the projection means circular travel path 2072. The first deflectable member means is biased in the first operating position, FIG. 36, and is deflectable into the second operating position, FIG. 37, through application of axial force thereto by the plunger means 2076. As illustrated by FIG. 26, the first deflectable member means 2250 may comprise a pivotal member 2251 having a laterally extending pivot axis MM. The pivotal member 2251 may be biased in the first operating position illustrated in FIG. 26 by a conventional biasing spring 2254, FIG. 32. The member may include a laterally projecting stud portion 2256 which limits its forward displacement through engagement with bracket portion 2258.

As best illustrated in FIG. 26, the flip latch means 36 comprises a force transmission member means 2270, such as pivotal member 2271, for transmitting force from the plunger means to the first deflectable member means 2250 for moving the first deflectable member means from the first operating position thereof to the second operating position thereof. Force transmission member means 2270 comprises a first end 2272 attached to the first deflectable member means and a second end 2274 having a first surface portion 2276 adapted to engage the plunger means 2076 during circular movement thereof and a second surface portion 2278 adapted to engage the plunger means during axial movement thereof. The force transmission member 2270 has a first operating position with respect to the first deflectable member means 2250 as best illustrated in FIGS. 26, 32, 35 and 37. The force transmission member means 2270 is normally biased in this first operating position. The force transmission member means 2270 has a second operating position wherein it is relatively downwardly deflected with respect to the first operating position as illustrated in FIGS. 34 and 36. During rotation of the flipping means, the plunger means 2076 are always positioned in its rearwardmost location as illustrated in FIG. 30. In this position, the circular path 2077 which the projection means travel during rotation of the flipping means, intersects the first surface portion 2276 of the force transmission member means 2270 when the first deflectable member means 2250 is in its normal biased position, and when the force transmission member means 2270 is in its first operating position as illustrated in FIGS. 26 and 35. The plunger means thus engages the first surface portion 2276 of the transmission member means 2270 moving it from its first operating position shown in FIGS. 26 and 35 to its second operating position illustrated in FIGS. 34 and 36. Due to the fact that the projection means exerts little axial force against the force transmission member 2270 during the above-described motion, the force transmission member exerts negligible axial force against the first deflectable member means 2250 and thus, the first deflectable member means 2250 remains in its normal biased position as illustrated in FIG. 36. Relative forward motion of the plunger means from the position illustrated in FIG. 36 causes removal of the downward force applied to the force transmission member means thereby enabling the force transmission member means to return to its first operating position illustrated in phantom in FIG. 36. During this forward movement of the plunger means, the projection means remains in engaged relationship with the first deflectable member means 2250. The force transmission member means 2270, after its return to its first operating position, has the second surface portion 2278 thereof, positioned in aligned relationship with the plunger means such that when the plunger means again moves rearwardly 64, as shown in FIG. 37, it engages the second surface 2278 and urges the force transmission member means 2270 rearwardly with corresponding rearward deflection 2279 of the first deflectable member means 2250.

The force transmission member means may be pivotally attached to the first deflectable member means 2250 about a pivot axis NN extending transversely of the plunger means.

The flip latch means 36 comprises a second deflectable member means 2280 for engaging the projection means 2068 during engagement of the projection means by the first deflectable member means 2250 for restraining rotation of the flipping means 28 in the second rotation direction 2026. The second deflectable member means 2280 has a first surface portion 2282, FIG. 26, which is adapted to yieldingly engage the projection means 2068 first surface 2156 prior to engagement of the projection means with the first deflectable member means 2250. The second deflectable member means has a second surface portion 2284 which is adapted to nonyieldingly engage the projection means 2068 second surface 2158 during engagement of the projection means with the first deflectable member means 2250. The second deflectable member means has a first operating position wherein the first surface portion 2282 and the second surface portion 2284 are both intersected by the circular travel path 2072 of the projection means 2068 as illustrated in FIG. 32. The second deflectable member means has a second operating position, FIG. 33, wherein the first surface portion 2282 and the second surface portion 2284 are displaced from the circular travel path of the projection means enabling it to pass. The second deflectable member has a third operating position, FIG. 34, intermediate the first operating position and the second operating position, wherein the second surface portion 2284 is positioned in engaged relationship with the projection means and wherein the projection means is positioned in engaged relationship with the first deflectable member means 2250. The second deflectable member means 2280 is biased in the first operating position and is deflectable from the first operating position to the second operating position, as indicated at 2290, through force applied to the first surface portion by the projection means 2068. The second deflectable member means 2280 is biasingly returnable, as indicated at 2292, from the second operating position, FIG. 33, to the third operating position, FIG. 34, during the period of engagement between the projection means 2068 and the first deflectable member means 2250 and is biasingly returnable from the third operating position, FIG. 34, to the first operating position, FIG. 32, subsequent to the disengagement of the projection means 2068 from the first deflectable member means 2250. The second deflectable member means second surface portion 2284 may comprise a radially tapering surface which is adapted to progressively, wedgingly engage the projection means during movement of the second deflectable member means from the second operating position thereof to the third operating position thereof. This progressive wedging engagement of the projection means by the radially tapering second surface portion 2284 of the second deflectable member means 2280 causes the projection means to be locked in a zero tolerance relationship between the first deflectable member means and the second deflectable member means when the second deflectable member means is in the third operating position. The second deflectable member means may comprise a pivotal member 2281 having a pivot axis OO extending parallel to the central axis of rotation DD of the flipping means 28. The second deflectable member means may be biased in direction 2292 as by a conventional torsion spring (not shown) and may be restrained from movement in its biased direction beyond its biased position as by a projection 2286 of the pivot member which engages a projecting portion 2288 of bracket 2114, FIG. 26. In one preferred embodiment, surface 2284 is positioned at a radial distance from axis OO of 0.55 inches at point 2285, and 0.59 inches at point 2287, tapering uniformly therebetween, FIG. 32.

GENERAL OPERATION OF e.f.l. APPARATUS

The basic sequence of operation of the e.f.l. apparatus 2010 is illustrated in FIGS. 27-29. Certain structural features of the apparatus have been removed to more clearly illustrate the operation of the apparatus. Thus, with respect to the flipping means 28, only the yoke member 2120 is shown.

FIG. 27 illustrates a position occupied by the flipping means 28 during rotation thereof in direction 2024 between the position occupied in FIG. 28, phantom position, and the position occupied in FIG. 28. Although the engaging means 22 is eliminated from this drawing in order to show certain structural details of the yoke member, it will be understood that the holding means is located in its rearwardmost relationship with the flipping means, i.e., the position illustrated in FIG. 30, when the flipping means 28 is in the relatively rotated position illustrated in FIG. 27. Next, as illustrated in FIG. 28, the flipping means 28 is moved into a latched, non-rotating position through engagement of the second projection member 2152 with the flip latch means 36. The sequence of events by which the projection member 2152 becomes lockingly engaged with the flip latch means will be described in further detail below. Next, as illustrated in FIG. 31, the engaging means is linearly displaced forwardly, i.e., in direction 62, with respect to the flipping means. Movement in direction 62 may continue until the engaging means encounters a resistance, e.g., the resistance between worm drive linear displaceable member 2222 and block 2184, FIG. 25-phantom, or the engagement of the optical disk cartridge with a storage unit forward housing portion. Next, the cartridge engaging means 22 moves rearwardly, direction 64, with respect to the engaging means until it reaches its rearmost location relative thereto as illustrated in FIG. 30. During the final portion of this forward movement of the engaging means with respect to the flipping means, the second plunger member 212 actuates the flip latch means 36 to release the second projection member 2152 therefrom. At the same time, or approximately the same time that the second plunger member 2212 causes disengagement of the projection member from the flip latch means, the engaging means 22 reaches its farthest rearward location with respect to the flipping means. Next, as illustrated in FIG. 29, the flipping means 28, in response to the release of projection member 2152 from the flip latch means, begins to again rotate in direction 2024. Next, as illustrated in FIG. 28-phantom, the rotation of the flipping means 28 is terminated when the first projection member 2150 is engaged by the flip latch means 36. Next, the engaging means 22 is again moved linearly forwardly relative to the flipping means and stops movement. The engaging means then again moves linearly rearwardly with respect to the flipping means until reaching its rearwardmost location. At the same time, or approximately the same time that the engaging means reaches its rearwardmost location, the first plunger member 2210 actuates the flip latch means 36 to disengage the first projection member 2150 therefrom. The disengagement of member 2150 enables the flipping means to again rotate from the position illustrated in FIG. 28-phantom, through the position illustrated in FIG. 27 to the position illustrated in FIG. 28. This completes the general description of one operating cycle of the invention and it will be understood that this cyclical sequence of events continually repeats during operation of the apparatus. Having thus described the general operation of the apparatus, certain specifics of operation will now be described in further detail.

OPERATION OF THE FLIP LATCH MEANS

As described above, in the illustrated embodiment of the invention the projection means 2068 comprise two diametrically opposed projection members 2150, 2152 which each travel in the same circular travel path 2072 and which each project rearwardly from the flipping means 28 the same axial distance. As illustrated in FIG. 32, the path 2072 which each of the projection members 2150, 2152 travels during rotation of the flipping means 28 intersects the top surface portion 2252 of the first deflectable member means 2250 when the first deflectable member means 2250 is in its normally biased position, i.e., the position illustrated in FIGS. 26, 32 and 35, in which the top portion thereof projects forwardly from the mounting bracket 2114. Thus, as the flipping means 28 rotates in direction 2024, one of the projection members, e.g., 2152, is moved into engagement with surface 2252. This engagement terminates further movement of the projection member in direction 2072 and thus terminates rotation of the flipping means 28 in direction 2024. Prior to the time that member 2152 makes contact with second deflectable member 2250, it makes initial contact at a lower surface portion 2156 thereof with second deflectable member first surface 2282, FIG. 32. The force applied against surface 2282 by projection member 2152 causes the second deflectable member means 2280 to pivot in direction 2290 about its pivot axis OO until member 2152 is moved out of engagement with surface 2282 as illustrated in FIG. 33. Next, as illustrated in FIG. 34, the engagement of projection member 2152 with surface 2252 of first deflectable member means 2250 prevents further movement of member 2152 along path 2072, and the return pivotal movement 2292 of second deflectable member means 2280 from the position shown in FIG. 33 toward its original biased position illustrated in FIG. 32 causes the tapered second surface 2284 thereof to make engaging contact with the upper surface 2158 of member 2152 as shown in FIG. 34. Due to the direction of bias of member 2280 and the progressive taper of surface 2284, the surface 2284 urges member 2150 against surface 2252 as member 2280 biasingly rotates in direction 2292. Thus, member 2152 is locked in zero tolerance relationship between surface 2284 of the second deflectable member means and surface 2252 of the first deflectable member means. Flipping means 28 is thus prevented from rotating either in its original direction of rotation 2024 or in reverse direction 2026 due to this zero tolerance locking engagement of member 2152 between surfaces 2282 and 2252.

The plunger means 2076, i.e. plunger members 2210 and 2212, always occupy a rearwardlymost projected position, e.g., the position illustrated in FIG. 30, during the rotation of flipping means 28.

During the period of flipping means 28 rotational motion associated with the movement of projection member 2152 from the position of initial contact with the flip latch means illustrated in FIG. 32 to the position of locked engagement therewith illustrated in FIG. 34, the second plunger member 2212 travels along a concentric path 2077 which is positioned slightly radially inwardly, e.g., 0.2 inches inwardly, of path 2072 which is travelled by the projection member 2152. The plunger means rotation path 2077, as illustrated at FIGS. 32 and 35, intersects the top surface 2276 of force-transmission member means 2270. As described above, force-transmission member means 2270 is deflectable from its normal biased position, illustrated in FIGS. 32 and 35, to a downwardly deflected position with respect to the first deflectable member means 2252 as illustrated in FIGS. 34 and 36. Thus, the movement of projection member 2152 along path 2072 from the position illustrated in FIG. 32 to the position illustrated in FIG. 34, is accompanied by the movement of plunger member 2212 along path 2077. FIG. 35 is a side elevation view showing the relationship of the projection member 2152 and the plunger member 2212 at the positions thereof illustrated in FIG. 32, just prior to contact with the flip latch means. FIGS. 34 and 36 show the deflection of the force-transmission member means 2076 produced by downward pressure from the plunger member 2212 after the initial engagement between the projection member 2152 and first deflectable member means 2250. It will be appreciated that this downward deflectable movement of the force-transmission member means 2270 from the position illustrated in FIG. 35 to the position illustrated in FIG. 36 does not produce any corresponding pivotal movement of first deflectable member 2250 and thus, the engaged projection member 2152 remains in locked engagement between surfaces of the first and second deflectable member means.

Subsequent to the engagement of the projection member 2152 by deflectable member means 2250 and 2280 which is illustrated in FIGS. 34 and 36, the associated plunger member 2212 is moved axially forwardly, e.g., FIG. 31, causing it to be removed from engagement with the force-transmission member means 2270 and thereby allowing force-transmission member means 2270 to return to its normal biased position illustrated in FIG. 35. During subsequent rearward movement of the associated plunger member 2212, the axial end surface 2214 thereof is positioned in axial alignment with the axial end surface 2278 of the force-transmission member means 2270. The rearward movement of plunger member 2212 thus causes engagement between surfaces 2214 and 2278. The force-transmission member means 2270 is constructed and arranged such that the axial force transmitted to surface 2278 by the plunger member is normal to pivot axis NN and thus does not cause relative deflection of the force-transmission member means 2270 relative to the first deflectable member means 2250, but rather causes the axial force to be transmitted directly to the second deflectable member means. This force causes the second deflectable member means to be moved rearwardly from the position illustrated in FIG. 35 to the position illustrated in FIG. 37. As may be seen from FIG. 37, the rearward movement of the second deflectable member means 2250 causes surface 2252 thereof to be moved axially rearwardly and out of path 2072 of projection member 2152. This release of projection member 2152 enables rotation of the flipping means in rotation direction 2024 with the accompanying movement of projection member 2152 along path 2072.

OPERATION OF e.f.l. APPARATUS TRANSMISSION MEANS

As previously explained, the construction and arrangement of the transmission means 2052 is such that torque from the first drive means 32 may be provided either to produce rotation of the flipping means 28 as illustrated in FIG. 38 or to produce rotation of the worm drive screw 2220 in direction 2224, FIG. 39, to cause forward movement of the engaging means 22 within the flipping means 28 or to produce rotation of the worm drive screw 2220 in direction 2226 to cause rearward movement of the engaging means 22 within the flipping means 28. The physical events which determine the mode of operation of the transmission means are the engagement and disengagement of the projection means 28 with the flip latch means 36 and the engagement of the optical disk cartridge engaging means 22 with a stop means 78. Each time the control means 2080 senses a motor rotational displacement associated with either the engagement of the projection means with the flip latch means or the encountering of a stop means by the linearly moving cartridge engaging means 22, drive motor operation is terminated and the direction of operation is reversed such that when the motor is re-started, it will transmit torque in the opposite direction. In one preferred embodiment of the invention, the motor is re-started by a signal provided to switching unit 2081 through a computer control unit 2219. In another embodiment the motor is restarted by a human operator.

DETAILED OPERATING CYCLE OF e.f.l. APPARATUS

The combined operation of the various handling apparatus components during an operating cycle will now be described. The rotation of the flipping means 28 in direction 2024 shown in FIG. 27 occurs when the optical disk engaging means 22 is positioned in its rearwardmost location, FIGS. 26 and 30, and with the first drive means 32 providing torque in direction 2056, FIG. 25. The abutting engagement of the engaging means 22 with the forward wall 2138 of the yoke member prevents the worm drive 2220 and thus, worm drive gear 2238, from being rotated in direction 2226. Thus, the torque transmitted to gear 2238 by gear 2236 in response to drive motor torque 2056 causes gear 2238 to be moved orbitally with gear 2236. As illustrated in FIG. 38, this orbital movement of gear 2236 in direction 2242 produces rotation of the flipping means 28 which is physically connected to gear 2236 by the worm drive mounting assembly. The flipping means 28 rotates in direction 2024 until the projection member 2152 engages the flip latch means 36 and is locked into immobile relationship therewith, FIGS. 28, 34 and 36. At the time that projection member 2152 is initially engaged by the flip latch means member 2251, the motor rotational displacement associated with this engagement is sensed by the control means 2080 which terminates operation of first drive means 32 and reverses the direction of first drive means 32.

Next, first drive means 32 is restarted and transmits torque in direction 2058, FIG. 25. Due to the fact that the second projection member 2152 is locked in engagement with the flip latch means 36, rotation of the flipping means 28 is prevented. Drive torque from gear 2236 thus causes rotation of gear 2238 about its central longitudinal axis GG in direction 2224, as illustrated in FIG. 39, causing the cartridge engaging means 22 to move forwardly, direction 62, with respect to the flipping means 28 as illustrated in FIG. 31. In the absence of an overriding command signal, this motion of cartridge engaging means 22 in direction 62 continues until the engaging means encounters a stop means which prevents further motion, such as, for example, the engagement of the driven member 2222 with forward worm drive support block 2184 or the engagement of an optical disk cartridge 24 with a storage unit abutment surface. When the first drive means has been rotatably displaced by a predetermined amount associated with the movement of the engaging means, etc., to the forward stop means 78, the control means 2080 terminates operation thereof and reverses the first drive means direction of rotation.

Next, when the first drive means is re-started, it applies torque in direction 56, FIG. 1, causing worm drive gear 2238 to be rotated in direction 2226, FIG. 40, causing the engaging means 22 to be moved rearwardly, in direction 64, relative the flipping means 28. It will be appreciated that no rotation of the flipping means 28 occurs because the second projection member 2152 remains locked in engagement with the flip latch means during this period of operation. As the engaging means 22 completes its rearward displacement to the position illustrated in FIG. 30, plunger member 2212 axially engages the flip latch means force-transmission member means 2270 causing displacement of member 2270 and associated second deflectable member means 2280, FIG. 37. The rearward movement of member 2280 thus releases projection member 2152 from engagement with the flip latch means enabling flipping means 28 to again rotate in direction 2024. The engaging means 22 moves into engagement with the rear stop means simultaneously, or just after, the release of the projection means from the flip latch means. This engagement of the engaging means 22 with the rear stop means prevents further rotation of worm drive gear 2238 in direction 2226.

Thus, after the cartridge engaging means reaches its rearwardmost position, the torque applied by gear 2236 again, FIG. 38, causes orbital movement of gear 2238 therewith causing corresponding rotation of the flipping means 28. The flipping means thus rotates, as illustrated in FIG. 29, until the first projection member 2150 is engaged by the flip latch means 36 as illustrated in FIG. 28-phantom. Thereafter, the sequence of events described immediately above is repeated, except that projection member 150 is substituted for projection member 2152 and plunger member 2210 is substituted for plunger member 2212. Thus, the engaging means is moved forwardly in direction 62. Next, it is moved rearwardly in direction 64, causing plunger member 2210 to trip the flip latch means and disengage projection 2150 and enabling rotation of the flipping means in direction 2024. The flipping means rotates through the position illustrated in FIG. 27 to the position illustrated in FIG. 28. Thus, a full operating cycle of the apparatus 2010 is completed.

In the above described operating cycle, as an alternative to moving the engaging means 22 in direction 62 until a stop surface is encountered, it is also possible to simply terminate the movement in direction 62 at some selected position, e.g., the position illustrated in FIG. 31, through an overriding control signal provided either by a human operator or a computer-based control system 2219. Thereafter, the direction of rotation of first drive means 32 is reversed and the return motion of optical disk engaging means 22 in direction 64 may be initiated to enable the plunger means to trippingly disengage the flip latch means from the projection means with the resulting flipping rotation of the flipping means in direction 2024.

In a relatively low friction system, a problem may be encountered with respect to the orbital motion of gear 2238 as described with reference to FIG. 38. When a drive motor encounters a resistance, such as that produced by the transition from rearward engaging means movement to rotating flipping means movement, it tends to pulse, i.e. it accelerates rapidly and then decelerates somewhat before reaching its normal operating speed. As a result of such a motor pulse during operation in the mode illustrated in FIG. 38, gear 2238 may be accelerated to an orbital velocity which is slightly greater than the rotational velocity of gear 2236. As a result of this velocity difference, gear 2238, if otherwise unrestrained, will rotate slowly about its axis GG in direction 2224 as it moves orbitally along path 2242. This slight rotation in direction 2224 will result in forward movement of the engaging means. If the amount of gear 2236 rotation in direction 2224 is great enough, it will cause forward displacement of the plunger means sufficient to disengage it from member 2270 allowing member 2270 to move from the position of FIG. 36 to the position of FIG. 36-phantom. After the flipping means is stopped from rotating by the flip latch means, the gear 2236 will continue to rotate in direction 2240 causing gear 2238 to rotate in direction 2226 until the engaging means is returned to its forwardmost position. If the initial forward movement of the engaging means was sufficient to allow member 2270 to return to the position of FIG. 35, then the subsequent rearward motion of the engaging means will cause a premature release of the flip latch means, FIG. 37. In order to prevent such an occurrence, a detent means 2165 as shown in FIG. 31 may be provided which produces a detent engagement between the engaging means and flipping means when the engaging means is in its rearwardmost position. This detent engagement produces a detent force which resists forward displacement of the engaging means which is sufficiently great to maintain the engaging means in its forwardmost position during the transition from engaging means linear movement to flipping means rotational movement. This detent force is sufficiently small, however, such that it may be overcome by the torque provided by the first drive means during the period when the projection means is engaged by the flip latch means. Thus, the detent means prevents premature tripping of the flip latch means but does not otherwise effect the operation of the e.f.l. apparatus.

IV. COACTION OF CARTRIDGE ENGAGING MEANS AND FLIPPING MEANS

Specific features of the cartridge engaging means 22 and the flipping means 28 which enable passive actuation of the engaging means 22 will now be specifically described.

CARTRIDGE ENGAGING MEANS

As best illustrated in FIG. 45, the cartridge engaging means 22 comprises a central body member 3040 having a first lateral end portion 3042, a second lateral end portion 3044, a forward end portion 3046, a rear end portion 3048, a top end portion 3050, and a bottom end portion 3052. The central body member comprises a first outwardly opening lateral end interior cavity 3054 and a second outwardly opening lateral end interior cavity 3056 which are adapted to receive the latch members 3072, 3074 therein. FIG. 25 shows the central body member 3040 with a top panel portion thereof removed. A first pivot post 3058 is positioned in the first cavity 3054, and a second pivot post 3060 is positioned in the second cavity 3056. As illustrated in FIG. 45, a longitudinally extending guide rib 3062 is provided on an upper surface of the central body member 3040. An identical guide rib 3063 is positioned on the bottom portion of the central body member in mirror-image relationship with the top guide rib 3062, i.e. the bottom guide rib is positioned the same distance from the second lateral end portion 3044 that the top rib 3062 is positioned from the first lateral end portion 3042. The lower rib 3063 is adapted to be received in lower sleeve member channel portion 3148, and the upper rib 3062 is adapted to be received in a channel portion in the top sleeve member which corresponds to channel 3148, as described in further detail below. An attachment recess 3064 is provided on the top portion of central body member 3040 for facilitating attachment of a threaded nut member 2222, FIG. 25, by conventional attachment means such as heat welding or the like. The threaded nut portion 2222 is adapted to threadingly receive a worm drive screw 2220 for enabling longitudinal displacement of the central body member 3040 with respect to the guide means 3012 as described above. A cutout portion 3068 is provided in the top portion 3050 of central body member 3040 for enabling arcuate displacement of a latch stud portion 3090 as described in further detail below. An identical cutout portion is provided in the bottom portion 3052 of the central body member 3040 in the same relationship with the first lateral end portion 3044 as that which cutout 3068 occupies with respect to the second lateral end portion 3044. Rear plunger projections 2150, 2152 are adapted to be received in bores extending through a forward portion of the flipping means 28 as described above. In one preferred embodiment, the top end portion 3050 and the bottom end portion 3052 are identical is construction and are fixedly attached to one another as shown in FIG. 45 to form the central body member 3040.

The cartridge engaging means 22 comprises a pair of generally L-shaped latching finger members 3072, 3074, also referred to herein simply as latch members 3072, 3074. Each latch member has a generally laterally extending portion 3076 and a generally longitudinally extending portion 3078 integrally formed with the laterally extending portion. A generally laterally extending hook portion 3080 is provided at the end of the longitudinally extending portion 3078 and projects laterally inwardly therefrom. Each hook portion comprises an inwardly and rearwardly projecting beveled surface 3082 and a laterally inwardly projecting surface 3084. Each of the latch members is mounted on a associated post member 3058, 3060 by a post receiving bore 3086 provided through an inner end of the laterally extending portion 3076 thereof. Each latch member has a first stud portion 3088 projecting from the hook portion thereof and a second stud portion 3090 projecting from an inner end of the laterally extending portion 3076 thereof. On latch member 3072, the first stud portion 3088 projects upwardly and the second stud portion 3090 projects downwardly. On the second latching member 3074, the first stud portion 3088 projects downwardly and the second stud portion 3090 projects upwardly. In a preferred embodiment of the invention, the latch members 3072, 3074 are identical in construction. Biasing springs 3092, 3094 are provided which engage the latch members 3072, 3074, urging the hook portions 3080 thereof inwardly. The central body member cutouts 3068 (only one shown) enable arcuate displacement of the stud members 3090 associated with each latch member and also limit the total amount of pivotal movement of each latch member. Each latch member has a latching operating position, FIGS. 25 and 49, wherein the hook surface 3084 thereof is positioned in longitudinal alignment with a catch surface 3268, 3270 of an associated cartridge 24 which is aligned with the apparatus 3010. Each latching member has an inwardly deflected operating position, FIGS. 45, 46 and 47, wherein surface 3084 is positioned laterally inwardly of its location in the latching operating position. Each of the latch members also has at least one outwardly deflected operating position, FIGS. 49, 52 and 53, wherein surface 3084 is positioned laterally outwardly of an associated catch surface 3268, 3270 of an aligned cartridge. The spring biasing members 3092, 3094 bias the latch members toward the inwardly deflected operating position illustrated in FIGS. 45, 46 and 47.

LOWER GUIDE SLEEVE MEMBER

As discussed above, the flipping means 28 may comprise a sleeve assembly consisting of a yoke member 2120, a lower guide sleeve member 2122, and an upper guide sleeve member 2124 (which in one preferred embodiment is of identical construction to the lower guide sleeve member), FIG. 25.

FIGS. 41 and 42 show a top plan view and a front elevation view of lower guide sleeve member 2122. The lower guide sleeve member comprises a forward end 3134 and a rear end 3136. The lower guide sleeve member comprises a planar top surface 3138. A longitudinally extending cutout 3140 is provided in a central portion of the member 2122. A corresponding cutout 3141, FIG. 25, in the upper member 2124 enables longitudinal displacement of threaded nut portion 2222, as described in further detail elsewhere herein. The lower guide sleeve member 2122 comprises an upstanding lateral wall portion 3142 on the right side thereof and an upwardly projecting lateral rib portion 144 on the left side thereof. The wall portion may extend approximately 0.6 inches above surface 3138 and the rib portion may extend approximately 0.1 inches above top surface 3138. The member comprises a downwardly and forwardly beveled front lip portion 3145. The lower member top portion has a first longitudinally extending recessed channel 3146, a second longitudinally extending recessed channel 3148, and a third longitudinally extending recessed channel 3150 therein. Each of the channels 3146, 3148, 3150 has a bottom surface 3151 positioned parallel to planar surface 3138. Each of the bottom surfaces 3151 may be positioned approximately 0.1 inch below top planar surface 3138. The third channel 3150 comprises a first relatively broad rear portion 3152. A second and third portion 3154, 3156 branch from the first portion 3152. The third portion 3156 comprises a longitudinally extending cutout 3158 which extends entirely through the lower member 2122 and which is adapted to receive a head portion of a gate member therein, as described in further detail below. A fourth portion 3160 branches from the cutout region 3158 of the third portion 3156. The fourth portion terminates in a lateral side opening 3162. A fifth portion 3164 extends forwardly from the forward ends of the second portion 3154 and from the cutout region 3158 of the third portion 3156. The fifth portion 3164 terminates in a forward opening 3166. A plurality of vertically extending threaded bores 3172, 3174, etc., are provided about the periphery of the lower member 2122 for enabling attachment thereof to the upper guide sleeve member 2124 and yoke member 3114 by screws (not shown).

Upper guide sleeve member 2124, in one preferred embodiment of the invention, is identical in construction to lower guide sleeve member 2122.

FIG. 41 shows the relative position of the channel 3147 in the upper guide sleeve member 2124 which corresponds to channel 3146 in the lower guide sleeve member 2122. Upper guide sleeve member channel 3147 is adapted to receive engaging means latch member upwardly projecting stud 3090 therewithin, and lower guide member channel portion 3150 is adapted to receive latch member 3074 lower stud 3088 therein for producing lateral deflection of latch member 3074 in response to longitudinal displacement of the engaging means central body member 3040. Similarly, lower member recess 3146 is adapted to receive the downwardly projecting stud member 3090 of the latch member 3072 and a portion of the upper guide sleeve member 2124 corresponding to channel 3150 is adapted to receive upwardly projecting stud portion 3088 of the latch member 307 therein.

GATE MEMBERS

As best illustrated in FIG. 25, a pair of identical gate members 3182, 3184 are attached to upper and lower surfaces of the flipping means 28. Each gate member comprises an attachment portion 3186, an elastically resilient neck portion 3188 which may be integrally formed with the attachment portion, and a head portion 3190 which may be integrally formed with the neck portion 3188 The head portion 3190 is adapted to project into an associated guide sleeve member cutout portion 3158.

Each head portion comprises a beveled end surface 3192, a horizontal top surface 3194, a beveled side surface 3196, and a horizontal intermediate surface 3198. A horizontal lower abutment surface 3200 is provided on the neck portion for limiting the penetration of the head portion into the associated cutout 3158. Each member 3182, 3184 may be attached to an associated guide sleeve member as by attachment screws 3202.

The ordinary bias position of the gate members 3182, 3184 is illustrated in FIG. 25, in which abutment surface 3200 is positioned in abutting engaging with the outer surface of an associated sleeve member. In this position, the forward edge of beveled surface 3192 is positioned at the same elevation as the bottom surface 3151 of channel 3150. However, as illustrated in FIG. 44, when the engagement means 22 is moving rearwardly 3026, a stud portion 3088 of the associated latch member which engages gate beveled end surface 3192 will cause the gate head portion 3190 to be deflected downwardly, enabling the stud 3088 to ride over the horizontal top surface 3194 thereof. As soon as the stud 3088 passes out of engagement with surface 3194, the gate head portion again moves upwardly into its normal bias position. In this normal bias position, a stud portion 3088 of a forwardly 24 moving gate member moving through channel portion 3156 will ride over gate horizontal intermediate surface 3198 and will be laterally deflected by gate beveled side surface 3196, causing the stud 3088 to be moved from channel portion 3156 to channel portion 3160. In one preferred embodiment of the invention, the gate member is constructed from a high-strength, resilient plastic and has an overall length of approximately 3.7 inches. The head portion of the gate may have an overall length of approximately 0.7 inches.

PASSIVE ACTUATION OF LATCH MEMBERS OF ENGAGING MEANS

The cooperation between latch member 3072 and the channel portions associated therewith is identical to the cooperation between latch member 3074 and the channel portions associated therewith, therefore it will not be necessary to describe the operation of both latch members 3072, 3074 in detail, and FIGS. 46–52 depict the operation of only the right-hand portion of the cartridge engaging means 22 and flipping means 28.

Figure 50:
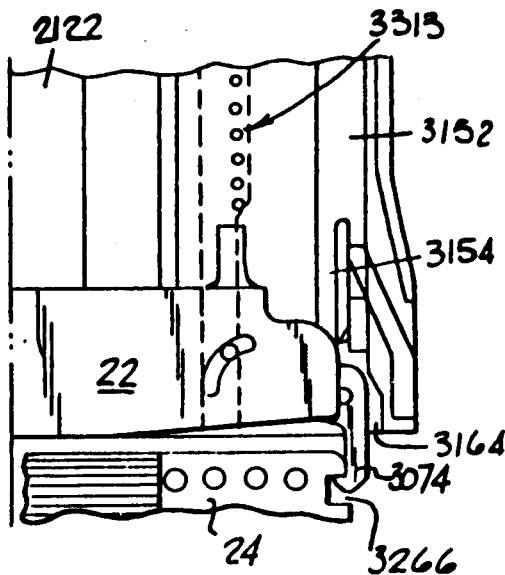

In a go-get operating mode, the engaging means 22 does not have a cartridge 24 in engagement therewith. The engaging means is moved from a rearmost position, as illustrated in FIG. 46, to a forwardmost position, as illustrated in FIG. 50. In one preferred embodiment, in the rearmost position, the threaded nut 2222 is in engagement with worm drive mounting member 2221 and the engaging means central body member 40 is in abutting engagement with the yoke member 2120. In the forwardmost position, the nut 2222 may be in engagement with the forward worm screw mounting member 2184, and the forward edge of the engaging means 22 may be in flush relationship with the forward edge of the flipping means 28. During the go-get operating mode, the lower stud portion 3088 of latch member 3074 moves along a first path 3310 comprising third channel channel portions 3152, 3154 and 3164. As best illustrated in FIGS. 49 and 50, during the go-get operating mode, the upper stud portion 3090 moves along an upper stud first path 3311 in upper guide member channel portion 3147. The engagement of the upper stud 3090 with the right edge surface of the narrow forward portion 3161 of channel 3147 prevents the latch member 3074 from pivoting inwardly from its latching position even after the lower stud 3088 moves forwardly beyond opening 3166, enabling the latch member forward beveled surface 3082, FIG. 49, to engage a rounded corner surface 3083 of the aligned cartridge 24 and to be deflected outwardly by a rounded corner surface 3083 thereof. Thereafter, further forward movement of the engaging means 22 and the biasing force exerted on the latching member 3074 by the biasing spring causes the latch member hook portion 3080 to move into associated cartridge notch 3266, FIG. 50.

Figure 51:
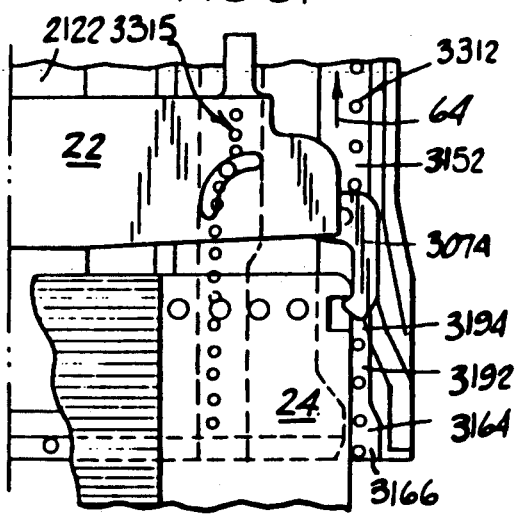

Next, as illustrated in FIG. 51, in the retrieve operating mode forward movement of the engaging means causes abutting engagement between the latch means hook surface 3084 and the cartridge notch surface 3270, resulting in rearward displacement of the cartridge 24 by the engaging means 22. During this rearward movement associated with the retrieve operating mode, the lower stud portion 3088 moves along a lower stud second path 3312 including channel portion 3164, gate surfaces 3192, 3194, channel portion 3156, and channel portion 3152 until the engaging means reaches the position illustrated in FIG. 25. The upper stud 3088 moves along a corresponding path 3313 in channel 3147.

Figure 52:
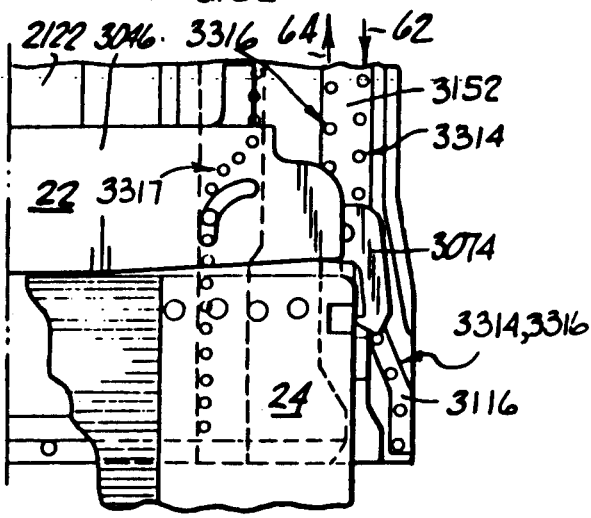
Figure 53:
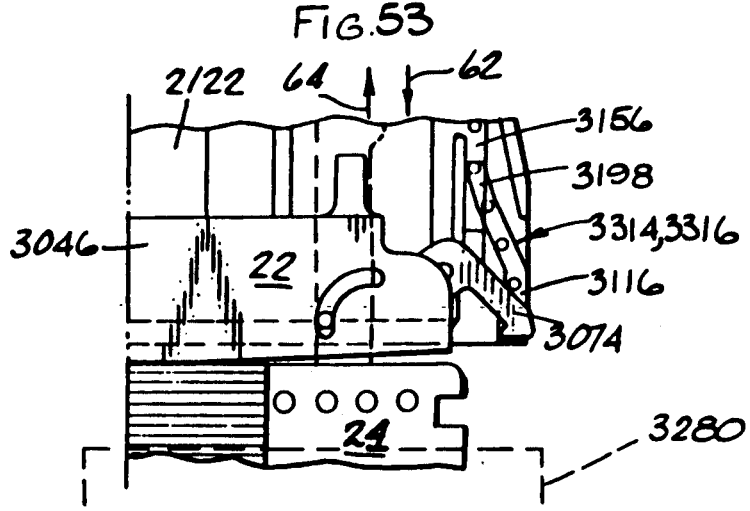

Next, in the put operating mode, the engaging means moves forwardly 62 with the lower stud 3088 following a lower stud third path 3314 including channel portion 3152, 3156, gate portion 3198, and channel portion 3160, and the upper stud follows a corresponding upper path 3315. Gate portion 3198 and channel portion 3160 cause the latch member 3074 to be displaced outwardly, releasing the cartridge as illustrated in FIGS. 52 and 53. After release of the cartridge as illustrated in FIG. 51, the cartridge continues to moved forwardly through abutting contact with the forward portion of the central body member 3040 until the engaging means 22 reaches its most forward position illustrated in FIG. 53. At the position illustrated in FIG. 53, the associated cartridge 24 has been fully inserted in its associated holding device 3280.

Next, as illustrated in FIGS. 52 and 51, the engaging means moves rearwardly 64, with the lower stud 3088 following a lower stud fourth path 3316 including channel portion 3160, gate surface portion 3196, channel portion 3156, and channel portion 3152, and the upper stud following a corresponding upper stud path 3317, until the engaging means 22 returns to its rearmost position illustrated in FIG. 46. Thus, a full operating cycle of the apparatus is completed and the engaging means 22 is positioned to begin a new cycle of operation.

V. LATERAL AND VERTICAL DISPLACEMENT ASSEMBLY

LATERAL AND VERTICAL DISPLACEMENT ASSEMBLY IN GENERAL

FIGS. 54-59 illustrate an assembly 4010 for providing controlled lateral and vertical displacement of a cartridge 4024 received in flipping means 28. FIG. 54 is a front elevation view of the assembly with flipping means 28, translation latch means 38, and lock means 48 removed for illustrative purposes. As illustrated by FIG. 54, the assembly 4010 includes a laterally extending track means 4012 which receives "base" or "carriage" means 30 thereon in laterally displaceable relationship therewith. The track means 4012 defines a laterally extending carriage movement path. The assembly 4010 includes a first and second lateral stop means 4016, 4018 for limiting lateral displacement of the carriage means 30 along the laterally extending carriage movement path in first and second lateral directions 4022, 4024, respectively. Carriage means 30 is adapted for rotatably supporting the flipping means as described above. The carriage means 30 is operatively mounted on the track means 4012 and is laterally displaceable along the carriage movement path in the first and second lateral directions 4022, 4024. The carriage means has a forward end portion 4030, a rear end portion 4032, a top end portion 4034, a bottom end portion 4036, first lateral side portion 4038, and a second lateral side portion 4039, FIGS. 54 and 56-59. The carriage means has a central longitudinal axis DD (coaxial with flipping means axis DD), a central lateral axis YY, and a central vertical axis ZZ, which all intersect at right angles at a common point (not shown). The carriage means central lateral axis YY extends parallel to the laterally extending carriage movement path.

The carriage means 30 has a latched operating state, FIGS. 57 and 59, wherein movement thereof along the laterally extending carriage movement path in both the first and second lateral directions 4022, 4024 is latchingly prevented. The carriage means has an unlatched operating state, FIGS. 56 and 58, wherein movement thereof along the laterally extending carriage movement path in both the first and second lateral directions 4022 4024 is unlatchingly enabled.

The assembly includes a translation latch means 38, FIGS. 56-59, which is operably associated with the carriage means 30 and the laterally extending track means 4012. The translation latch means is adapted for placing the carriage means in the latched operating state and in the unlatched operating state.

A shaft means 2030 is operably mounted on the carriage means 30 and projects forwardly therefrom. The shaft means has a central longitudinal axis EE extending coaxially with the carriage means central longitudinal axis DD and supports a driven gear 2230 thereon.

Driven gear 2230, as described above, is rotatable about the shaft means central longitudinal axis EE. The driven gear means is adapted for engaging a drive belt means 42. The driven gear 2230 has a locked operating state, FIGS. 56 and 58, wherein the driven gear means is lockingly restrained from rotating and wherein force applied to the gear means 2230 by the belt means 42 is transferred to the carriage means 30 for causing carriage means displacement. The driven gear 2230 also has an unlocked state, FIGS. 57 and 59, wherein the driven gear 2230 is unlockingly enabled to rotate.

The assembly includes a lock means 48 for lockingly engaging the driven gear 2230 for placing the driven gear means in the locked operating state and for unlockingly releasing the driven gear means for placing the driven gear means in the unlocked operating state.

Drive belt means 42 is continuously engaged with the driven gear means for transmitting force thereto. The drive belt means has a first portion 44 extending from the driven gear 2230 in the first lateral direction 4022 and has a second portion 46 extending from the driven gear 2230 in the second lateral direction 4024.

An actuator means 4066 is provided for displacing the translation latch means. In one embodiment, the translation latch means is brought into engagement with the actuator means 4066 by downward movement of a vertical displacement assembly 140, FIG. 54.

Force transmitted from the drive belt means 42 to the driven gear 2230 in the first lateral direction 4022 produces rotation of the driven gear means in a first rotation direction 4062 when the driven gear means is in the unlocked operating state, FIGS. 57 and 59, and when the carriage means is in the latched operating state, FIGS. 57 and 59. Force transmitted from the drive belt means to the driven gear means in the first lateral direction 4022 produces lateral displacement of the carriage means 30 in the first lateral direction 4022 when the driven gear 2230 is in the locked operating state, FIGS. 56 and 58, and when the carriage means is in the unlatched operating state, FIGS. 56 and 58, and when the carriage means is disengaged from the first lateral stop means 4016, FIG. 54.

The force transmitted from the drive belt means 42 to the driven gear 2230 in the second lateral direction 4024 produces rotation of the driven gear means in a second rotation direction 4064 when the driven gear 2230 is in the unlocked operating state, FIGS. 57 and 59, and when the carriage means is in the latched operating state, FIGS. 57 and 59. Force transmitted from the drive belt means 42 to the driven gear 2230 in the second lateral direction 4024 produces lateral displacement of the carriage means 30 in the second lateral direction 4024 when the driven gear 2230 is in the locked operating state, FIGS. 56 and 58, and when the carriage means 30 is in the unlatched operating state, FIGS. 56 and 58, and when the carriage means is disengaged from the second lateral stop means 4018, FIG. 54.

Having thus described the assembly 4010 in general, various features of the assembly will now be described in further detail.

STRUCTURAL COMPONENTS

As best illustrated in FIG. 54, the laterally extending track means 4012 may comprise an upper track member 4082 which may be a cylindrical shaft having a first end 4084 and a second end 4086. The track means 4012 may also comprise a lower track member 4088 which may comprise a tubular member having a polygonal cross-section, as illustrated in FIGS. 3-6. The lower track member 4088 has a first end 4090 and a second end 4092 and is positioned parallel to the upper track member 4082. The lower track member has a first recessed surface 4089 at the first end thereof and a second recessed surface 4091 at the second end thereof. Recessed surfaces 4089, 4091 are constructed and arranged to receive a portion of translation latch means 38 therein when the carriage means is in engaged relationship with an associated stop means 4016, 4018, as indicated at 30' and 30". The upper and lower track members 4082, 4088 are fixedly attached at the first ends 4084, 4090 thereof to a generally vertically extending block 4094 having a vertically extending, inwardly facing surface 4095 which may provide the first stop means 4016.

The upper and lower track member second ends 4086, 4092 are fixedly attached to a second generally vertically extending block member 4096 which may be identical in construction to the first block member 4094 and which is positioned in mirror-image relationship therewith. The second block member 4096 has a vertically extending, inwardly facing surface 4097 which may provide the second lateral stop means 4018. First vertically extending block member 4094 has vertically spaced-apart, belt-receiving idler gears 4098, 4100, mounted thereon. Gears 4098, 4100 may be conventional pulleys. The second block member 4096 has a single belt-receiving idler gear 4102 mounted thereon which may also comprise a conventional pulley. The lowermost surface of gear 4098 is laterally aligned with the uppermost surface of gear 4102, and the uppermost surface of gear 4100 is laterally aligned with the lowermost surface of gear 4102.

As illustrated in FIGS. 54 and 55, block member 4094 has a pair of vertically spaced forward bearings 4104, 4106 and a pair of vertically spaced rear bearings 4108, 4110 which are adapted to ride on surface portions of an associated vertical post member 4112. Post member 4112 may have a cross-sectional shape similar to that of lower track member 4088 described above. Second block member 4096 may have four bearings 4114, 4116 (only two shown) which are configured identically to those described for the first block member and which rollingly engage the surface of a second vertical post member 4118. Post member 4118 may be identical in construction to first post member 4112 and may be positioned in mirror-image relationship with post 4112. The vertical post members 4112, 4118 may be fixedly attached at lower ends thereof to a housing bottom wall member 29 and may be fixedly attached at upper ends thereof to a housing top wall member 27.

As further illustrated in FIGS. 54 and 55, a vertically extending screw 4124 is journaled at an upper end thereof to housing top wall 27 and is journaled at a lower end thereof to housing bottom wall 29. A reversible second rotatable drive means 52 which may comprise a conventional drive motor 4126 having a drive shaft 4128 and drive gear 4130 is drivingly linked by drive belt 4132 and gear 4134 to vertical drive screw 4124. Drive motor 4126 may be mounted rearwardly of a housing intermediate wall 4125 on a mounting bracket 4127. A threaded screw follower 4136 is received on the screw 4124 and is vertically displaceable therealong by rotation of the screw 4124. Thus, rotation of drive motor 4126 in a first direction causes screw follower 4136 to move upwardly and rotation of motor 4126 in the opposite direction causes screw follower 4136 to move downwardly. As best illustrated in FIGS. 55, 56, and 57, screw follower 4136 is fixedly associated with the track means as by attachment of the screw follower 4136 to lower track member 4088 by attachment bracket 4138. Thus, the upper and lower track members 4082, 4084 and the block members 4094, 4096 define a vertical displacement assembly 4140 which is vertically displaceable with respect to vertical post members 4112, 4118 through rotation of drive motor 4126.

As best illustrated in FIGS. 54 and 55, vertical post 4112 has an idler gear 4141 journaled to an upper portion thereof. A driven gear 4142 which is mounted on a drive shaft 2218 of first reversible drive motor 2051 is positioned directly below idler gear 4141.

The drive belt means 42 is a continuous belt which is looped around gears 4098, 4102, 4100, 4142, and 4141 in a generally T-shaped configuration. The trunk of this T-shaped belt configuration has an upper portion 4145 which is engaged by an upper set of gears including driven gear 2230 on the carriage means. The trunk of the belt means T-shaped configuration also comprises a lower portion 4146 which engages idler gears provided on a lower portion of the carriage means. The belt means may comprise a ribbed inner surface 4147, FIG. 56, which is adapted to engage a ribbed exterior surface of the driven gear 2230 to provide nonslipping engagement between the driven gear 2230 and the drive belt means 42.

As best illustrated in FIGS. 56-59, the carriage means may have an upper set of bearings 4154, 4156, 4158, FIG. 54, mounted thereon which are adapted to rollingly engage track upper member 4082. The carriage means may also comprise a set of four lower bearings 4160, 4162, 4164 (only three shown) which are adapted to rollingly engage the surface of lower track member 4088. The upper and lower sets of bearings thus enable relatively low friction lateral displacement of the carriage means along the upper and lower track members 4082, 4088.

The shaft means 2030 has driven gear 2230 rotatably mounted thereon. As best illustrated in FIGS. 54, 55 and 56, driven gear 2230 may comprise a first, generally cylindrical drive belt engaging portion 4170. The driven gear 2230 may also comprise a locking hub portion 4172, FIGS. 55 and 56, which is fixedly attached to the gear engaging portion 4170 as by connecting pins (not shown) or other conventional attachment means. The locking hub portion 4172 in the preferred embodiment is positioned axially forward of the drive belt engaging portion 4170. The driven gear 2230 is freely rotatable about shaft means 2030 and is positioned in axially fixed relationship therewith as through the use of conventional spacer devices such as washers or the like (not shown). Drive belt engaging portion 4170 may have a ribbed peripheral surface which is adapted to coact with a ribbed surface 4147 of drive belt means 42. Locking hub portion 4172 may comprise first and second lock engaging recessed surfaces 4174, 4176 therein which conform generally to the shape of an end portion of lock means 48 described in further detail below.

Lock means 48 may comprise a lock member 4180 having a generally boot-shaped configuration which is mounted on a longitudinally extending shaft 4182, FIGS. 56 and 58. The shaft 4182 is rotatably received within a bore in the forward face of the carriage means and lock member 4180 is thus pivotal about pivot axis MM defined by shaft 4182. Lock member 4180 occupies a longitudinal position in radial alignment with locking hub portion 4172. Lock member 4180 has a toe portion 4184 which is adapted to be received in either of the locking hub recessed surface portions 4174, 4176 to prevent rotation of the hub 4172 and associated belt receiving portion 4170. The lock member 4180 is biased as by biasing spring 4186 in a direction opposite the direction of extension of toe portion 4184, i.e. in a driven gear means clockwise direction 4188 as illustrated in FIG. 59. The lock member may be pivotally deflected in counterclockwise rotation direction 4189 by translation latch means 38 as described below.

Translation latch means 38 may comprise a pivot member 4190 having a central body portion 4192; a forward, downwardly extending wing portion 4194; and a rear, upwardly extending wing portion 4196, as illustrated in FIGS. 56 and 58. The central body portion 4192 is pivotally mounted on a laterally extending shaft 4198 which is, in turn, mounted in block 4150. Member 4190 is thus pivotable about a laterally extending pivot axis NN. Pivot member 4190 is received within a cavity 4200 of block 4150 having an upper cavity surface 4202 and a lower cavity surface 4204. Upper surface 4202 limits pivotal deflection of member 4190 in a first pivot direction 4206, and lower surface 4204 limits pivotal movement in a second pivot direction 4208. The pivot member 4190 has a head portion 4210 at the terminal end of the forward wing portion 4194. The head 4210 has a first post member 4212 projecting from a bottom portion thereof which is adapted to be received in recessed portions 4089 and 4091 provided on the lower guide member 4088 to hold the carriage means in releasable fixed relationship with the lower guide member 4088. A second post member 4214, which is adapted to be engaged by the latch actuator means 4066, is provided on an upper portion of the pivot member head 4210. The second post member 4214 is also adapted to slidingly engage a lower peripheral surface 4216 of the lock member 4180, FIGS. 56 and 57. As a result of this engagement between the lock member 4180 and post 4214, the lock member is caused to pivot in direction 4189 when the latching member 4190 pivots in direction 4208. In one embodiment of the invention, a third post member 4215 is provided which is also adapted to be engaged by the latch actuator means 4066. Member 4215 projects rearwardly from rear wing portion 4196 of the latching member. As illustrated in FIG. 56, a biasing means such as coil spring 4218 is positioned between the upper surface 4202 of cavity 4200 and the upper surface of the pivot member forward wing portion 4194. Thus, the pivot member 4190 is biased in pivotal rotation direction 4206. The lock pivot member 4180 and the latch pivot member 4190 are constructed and arranged such that the lock member is always engaged with one of the hub recesses 4174, 4176 when the latch member is disengaged from an associated recessed surface 4089 or 4091 and vice versa. There is never a condition in which the lock member is disengaged from an associated hub recess and the latch member is disengaged from an associated lower member recess 4089, 4091.

As best illustrated in FIG. 54, a pair of upper idler pulleys 4222, 4224 are journaled to an upper forward portion of the carriage means 30 and rollingly engage the exterior surface of the drive belt means 42 to maintain the drive belt means in engaging contact with the driven gear means drive belt engaging portion 4170. As also illustrated in FIG. 54, a pair of lower idler pulleys 4226, 4228 are journaled to a lower portion of the carriage means and rollingly, guidingly engage the exterior surface of the drive belt means 42.

Latch actuator means 4066 may comprise a horizontally extending bar 4240 which is fixedly attached as by post members 4242, 4244 to housing bottom wall 29. The horizontal bar 4240 is located directly below the lower post member 4214 of the translation latch means 38 and is adapted to engage the post member 4214 to produce relative upward movement thereof when the vertical displacement assembly 4140 is moved sufficiently far downwardly, e.g. FIG. 58. As shown in phantom in FIGS. 54 and 56, in one embodiment an upper actuator bar 4241 mounted on posts 4243, 4245 may be mounted on upper housing wall 27 directly above latch member third post 4215. Bar 4241 is adapted to engage post 4215 to actuate the latch pivot member 4190 when the vertical displacement assembly is moved sufficiently far upwardly Thus, the actuator means 4066 may comprise both an upper bar 4244 and a lower bar 4245 which provide identical actuating motion of the pivot member. The choice of which actuator bar is used may be determined by the proximity of the vertical displacement assembly to one bar or the other at the time actuation is desired.

OPERATION

The assembly 4010 has two different operating modes. In the first operating mode, FIGS. 56 and 58, the carriage means 30 is laterally displaceable along track means 4012 by the drive belt means 42 while the driven gear means 2230 is held rotationally stationary. In the second operating mode, FIGS. 57 and 59, the carriage means is held in stationary relationship with the track means and the driven gear means is rotatable by the drive belt means 42. Transition from one operating mode to the other is produced through combined operation of the translation latch means 38 and the lock means 48.

As illustrated in FIGS. 56 and 58, when the latch means 38 is rotated in direction 4208, it engages the lock means 48, urging the toe portion 4184 thereof upwardly. If the driven gear 2230 is rotating during the period when the lock means 48 is urged upwardly, the lock means toe portion will enter one of the hub recessed surface portions 4174, 4176, FIG. 58, thus locking the driven gear means against further rotation. As best illustrated by FIG. 56, the pivotal movement of the translation latch means which causes the lock means to engage the driven gear means also causes the latch means post 4212 to be displaced from an associated track recess, e.g. 4089, thus enabling lateral displacement of the carriage means. As illustrated by FIG. 58, the pivotal movement of the translation latch means which causes pivotal movement of the lock means is initiated by the engagement of the translation latch means upper post portion 4214 by the actuator means 4066. The actuator means is urged into engagement with post means 4214 through downward movement of the vertical displacement assembly 4140. The downward movement of the vertical displacement assembly is produced by rotation of screw 4124 by screw motor 4126, FIGS. 54 and 55.

Once the driven gear 2230 is locked against rotation, a portion of the drive belt means 42 which was in engagement with the gear means at the time it was locked is held in fixed, nonslipping relationship therewith by idlers 4222, 4224. As a result of this fixed relationship between the driven gear means and the engaged portion of the drive belt means, movement of the drive belt means causes the carriage means 30 to be pulled laterally along the track means 4012. Thus, for example, when the carriage means 30 is in position as illustrated in solid lines in FIG. 54, drive motor torque which tends to urge the driven belt means in belt direction 4147 causes the carriage means to be moved in lateral direction 4024. Motor torque urging the belt in belt direction 4148 causes the carriage means to be moved in lateral direction 4022.

Recessed surface 4089 in the guide means lower track member 4088 is located at a position which is in vertical alignment with the translation latch means lower post 4214 when the carriage means 30 is in an associated stop position indicated at 30' shown in phantom lines in FIG. 54. Similarly, recessed surface 4091 is located in vertical alignment with post 4214 when the carriage means is in engagement with lateral stop means 4018 as indicated at 30'' in FIG. 54. Once the carriage means 30 has travelled laterally to a stop position, e.g. the left stop position illustrated in FIG. 54, the translation latch means, in the absence of actuator means 4066, drops into an associated recess, e.g. 4089. Once the latch means has moved into this latching position, which is best illustrated in FIG. 57, the lock means 48 may temporarily remain in locking engagement with the locking hub 4150 due to pinching torque applied thereto by the hub means so long as torque is provided from motor 2051. However, after drive torque is terminated, the lock means 48 bias spring 4186 causes it to pivot in direction 4188 until contacting translation latch means post 4214, as illustrated in FIGS. 57 and 59. The translation latch means is now latched and prevents relative carriage movement and the lock means is unlocked and enables rotation of driven gear 2230. Thus, when torque is again applied by the motor 2051, the drive belt means causes the driven gear means to rotate about its axis EE while the carriage means 30 remains stationary.

In order to again enable carriage means displacement, the vertical displacement assembly 4140 is again moved down into engagement with actuator means 4066 until locking engagement of the driven gear 2230 is produced. Thereafter, the carriage means 30 may be displaced laterally through application of torque from motor 2051 in the appropriate direction, etc.

As best illustrated in FIG. 56, the latching member lower post 4214 is adapted to ride on a lower peripheral surface portion 4087 of a lower track member 4088 once the carriage means 30 is laterally displaced from the associated lower track member recess 4089 or 4091. Thus, after initial disengagement of the translation latch means 38 from recess, e.g. 4089, and a small amount of lateral displacement of the carriage means, e.g. 0.2 inches, the vertical displacement assembly 4140 may be moved out of engagement with the actuator means 4066 without causing the lock means 48 to become disengaged from the driven gear 2230, even if a power failure should cause the torque applied by the drive motor 2051 to be temporarily terminated. Thus, once the motor is restarted after such a power failure, the lateral movement of the carriage means 30 may continue in the initial lateral direction, e.g. 4024, until the carriage means reaches a stop means 4018, FIG. 54 in phantom. Once the carriage means engages a stop means and torque from the drive motor 2051 is terminated, the translation latch means 38 and lock means 48 will move into their latched and unlocked positions, respectively, preventing lateral displacement of the carriage means 30 in either direction and enabling rotation of the driven gear means in either direction.

In one preferred embodiment of the invention, the T-belt drive motor 2051 is provided with a control means 4250 which causes it to terminate its operation and to reverse its polarity each time the carriage means 30 reaches one of the stop locations indicated in phantom in FIG. 54 and also after a predetermined number of driven gear means rotations following each period of carriage movement. In one preferred embodiment, this function of terminating and reversing motor operation is initiated by a displacement sensing control assembly 4252 which senses the amount of motor displacement corresponding to the amount of drive belt displacement required to move the carriage means 30 between the two stop means 4016 and 4018 or required to rotate the driven gear means through the predetermined number of rotations. The assembly 4252 may comprise a conventional electronic motor encoder, which produces a predetermined number of encoder pulses per motor revolution, and a microcomputer equipped with a counter for counting encoder pulses and appropriate software for comparing the count to a first predetermined number associated with the carriage displacement distance between stops 4016 and 4018 and a second predetermined number associated with the predetermined amount of gear means rotation.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A cartridge handling system for use in association with a plurality of longitudinally extending rearwardly opening cartridge holding units arranged in a laterally and vertically extending array comprising:
   (a) cartridge engaging means for engaging an exposed end portion of a cartridge positioned in an aligned holding unit;
   (b) longitudinal displacement means operatively associated with said engaging means for longitudinally displacing a cartridge engaged by said engaging means;
   (c) flipping means operatively associated with said engaging means for invertingly rotating a cartridge engaged by said engaging means about a longitudinally extending flip axis;
   (d) lateral displacement means operatively associated with said engaging means for laterally displacing a cartridge engaged by said engaging means; and
   (e) unitary, rotatable drive means having a drive shaft rotatable in a first direction and a second direction opposite said first direction clutchlessly drivingly linked to said longitudinal displacement means, said flipping means, and said lateral displacement means for providing driving force thereto.

2. The invention of claim 1 comprising longitudinally extending track means operatively associated with said cartridge engaging means for guidingly laterally displacing portions of said engaging means in response to longitudinal movement of said cartridge engaging means for passively actuating said engaging means for enabling cartridge engagement and cartridge disengagement.

3. The invention of claim 1, one of said holding units comprising an optical disk reading device.

4. The invention of claim 1, one of said holding units comprising:
   insertion means for hand-insertingly receiving a cartridge from a human operator with a first end of the cartridge positioned forwardly and for longitudinally and rotationally displacing the cartridge for presenting the cartridge to said cartridge engaging means with said first end of the cartridge positioned rearwardly, said insertion means being actuatably by said longitudinal displacement means.

5. The invention of claim 1 comprising:
   (a) stop means stoppingly engageable with said longitudinal displacement means for limiting movement thereof;
   (b) flip latch means, having a latched state and an unlatched state, operatively associated with said flipping means for preventing rotation thereof during said flip latch means latched state; and
   (c) translation latch means, having a latched state and an unlatched state, operatively associated with said lateral displacement means for preventing lateral displacement thereof during said translation latch means latched state.

6. The invention of claim 5, said cartridge handling system comprising a longitudinally displacing operating state wherein:
   (a) said stop means is disengaged from said longitudinal displacement means;
   (b) said flip latch means is in said latched state; and
   (c) said translation latch means is in said latched state.

7. The invention of claim 6, said optical disk cartridge handling apparatus comprising a rotatably flipping operating state wherein:
   (a) said stop means is engaged with said longitudinal displacement means;
   (b) said flip latch means is in said unlatched state; and
   (c) said translation latch means is in said latched state.

8. The invention of claim 7, said cartridge handling system comprising a laterally displacing operating state wherein:
   said translation latch means is in said unlatched state.

9. The invention of claim 8 comprising:
   (a) first gear means mounted in rotationally displaceable relationship with said lateral displacement means and drivingly linked to said longitudinal displacement means and said flipping displacement means;
   (b) continuous drive belt means continuously non-slippingly engaged with said first gear means for drivingly linking said first gear means with said drive means; said continuous belt means comprising a first portion extending in a first lateral direction from said first gear means and a second portion extending in a second lateral direction from said first gear means whereby said lateral displacement means is laterally displaceable through movement of said belt means when said gear means is locked against rotation; and
   (c) gear lock means having a locked state and an unlocked state, operatively associated with said first gear means for preventing rotation of said first gear means during said locked state.

10. The invention of claim 9 wherein said gear lock means is in said locked state when said translation latch means is in said unlatched state; and wherein said gear lock means is in said unlocked state when said translation latch means is in said latched state.

11. The invention of claim 10 comprising:
    vertical displacement means for vertically displacing a cartridge engaged by said engaging means.

12. The invention of claim 11 further comprising second drive means operatively associated with said vertical displacement means for providing driving force thereto.

13. The invention of claim 12, said gear lock means means being displaced from said locked state to said unlocked state through displacement of said translation latch means from said unlatched state to said latched state occurring at a preset lateral position of said lateral displacement means.

14. The invention of claim 13, said translation latch means being displaceable from said latched state to said unlatched state through vertical displacement of said vertical displacement means.

15. The invention of claim 14, said flip latch means being displaceable from said latched state to said unlatched state through movement of said longitudinal displacement means.

16. The invention of claim 15 said longitudinal displacement means being displaceable from said stop means through reversal of the direction of drive means rotation.

17. A motion transmitting apparatus for alternately providing linear displacement and rotational displacement of a carriage member in response to torque applied from a single rotatable drive shaft, comprising:
    (a) base means for rotatably supporting a rotatable member means;

(b) rotatable member means, having a central axis of rotation, rotatably mounted on said base means for supporting said carriage member thereon in linearly displaceable relationship therewith;

(c) linear displacement means for linearly displacing said carriage member with respect to said rotatable member means;

(d) first gear means rotatably mounted on said rotatable member means and having a central axis of rotation positioned coaxially with said rotatable member means central axis of rotation, said first gear means being drivingly coupled to said rotatable drive shaft;

(e) second gear means rotatably mounted on said rotatable member means and having a central axis of rotation positioned in parallel radially offset relationship with said rotatable member means central axis of rotation; said second gear means being drivingly connected to said linear displacement means; said second gear means having a circumferential portion thereof engaged with a circumferential portion of said first gear means;

(f) latch means, having a latched operating state and an unlatched operating state, operatively associated with said rotatable member means for preventing rotation of said rotatable member means during said latched operating state; and (g) stop means, having an engaged state and a disengaged state, operatively associated with said linear displacement means for preventing movement of said linear displacement means during said engaged operating state.

18. The invention of claim 17, said apparatus having a linear operating state wherein said latch means is in said latched state and said stop means is in said disengaged state and wherein rotation of said drive shaft produces linear displacement of said carriage member; said apparatus having a rotating operating state wherein said latch means is in said unlatched state and wherein said stop means is in said engaged state wherein rotation of said drive shaft produces rotational displacement of said carriage member about said rotatable member central axis of rotation.

19. A motion transmitting apparatus comprising:
(a) base means for supporting various components of said apparatus thereon;
(b) guide means for guiding the movement of a guided member, said guide means comprising a forward end, a rear end, and a central longitudinal axis extending between said forward end and said rear end, and being rotatable in at least a first direction about said central longitudinal axis;
(c) shaft means for rotatably mounting said guide means on said base means, said shaft means comprising a first end fixedly attached to said rear end of said guide means, a second end rotatably received in said base means, and a central longitudinal axis extending in coaxial relationship with said central longitudinal axis of said guide means whereby said guide means is rotatable about said central longitudinal axis thereof through rotation of said shaft means;
(d) a guided member received on said guide means and being displaceable relative to said guide means in a predetermined manner;
(e) drive means for providing driving torque in at least a first torque direction to a transmission means;

(f) first shaft gear means rotatably mounted on said shaft means in coaxial, independently rotatable relationship therewith and being coupled to said drive means for transmitting torque therefrom to a second gear means;

(g) second shaft gear means rotatably mounted on said shaft means in coaxial, independently rotatable relationship therewith; said second gear means being coupled with said first gear means whereby rotation of said first gear means about said shaft means produces corresponding rotation of said second gear means about said shaft means;

(h) guide gear means rotatably mounted on said guide means about a guide gear central axis of rotation positioned in parallel, radially displaced relationship relative said guide means central longitudinal axis; said guide gear means comprising a first operating mode in which it is rotatable about said central axis of rotation thereof and a second operating mode in which it is non-rotatable about said central axis of rotation thereof; said guide gear means being continuously peripherally engaged by said second shaft gear means during said first and second operating modes; said guide gear means being rotatable about said guide gear central axis of rotation in response to application of torque thereto by said second shaft gear means in said first operating mode; said guide gear means being orbitally displaceable about the periphery of said second shaft gear means during rotation of said guide means about said guide means central longitudinal axis in said second operating mode of said guide gear means;

(i) guided member displacement means coupled to said guide gear means for producing displacement of said guided member relative said guide means in response to rotation of said guide gear means about said guide gear central axis of rotation; and (j) whereby said guided member is displaced relative said guide means in said first operating mode and whereby said guide means is rotated about said central longitudinal axis thereof in said second operating mode.

20. The invention of claim 19 further comprising:
(a) first restraining means for restraining the rotation of said guide means about said central longitudinal axis thereof for enabling operation of said guide gear means in said first operating mode; and
(b) second restraining means for restraining motion of said guided member relative said guide means for enabling operating of said guide gear means in said second operating mode.

21. A cartridge handling system for use in association with a plurality of longitudinally extending rearwardly opening cartridge holding units arranged in a laterally and vertically extending array comprising:
(a) cartridge engaging means for engaging an exposed end portion of a cartridge positioned in an aligned holding unit;
(b) longitudinal displacement means operatively associated with said engaging means for longitudinally displacing a cartridge engaged by said engaging means;
(c) flipping means operatively associated with said engaging means for invertingly rotating a cartridge engaged by said engaging means about a longitudinally extending flip axis;

(d) lateral displacement means operatively associated with said engaging means for laterally displacing a cartridge engaged by said engaging means; and (e) unitary, rotatable drive means drivingly linked to said longitudinal displacement means, said flipping means, and said lateral displacement means for providing driving force thereto;

(f) wherein the cartridge handling system contains no sensors mounted on moving system components and contains no motors mounted on moving machine components.

* * * * *